(12) United States Patent
Moranta et al.

(10) Patent No.: US 7,860,898 B1
(45) Date of Patent: Dec. 28, 2010

(54) TECHNIQUES FOR NOTIFICATION IN A DATA STORAGE SYSTEM

(75) Inventors: Vicente Moranta, Raleigh, NC (US); Mark A. Parenti, Milford, NH (US); Brian R. Tetreault, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 368 days.

(21) Appl. No.: 12/002,945

(22) Filed: Dec. 19, 2007

(51) Int. Cl.
*G06F 17/30* (2006.01)

(52) U.S. Cl. .................. 707/803; 707/640; 707/705; 715/201

(58) Field of Classification Search ........... 707/803, 707/640, 705; 715/201; 709/223
See application file for complete search history.

(56) References Cited

U.S. PATENT DOCUMENTS

| | | | |
|---|---|---|---|
| 7,127,328 B2 * | 10/2006 | Ransom | 700/286 |
| 7,428,524 B2 * | 9/2008 | Burrows et al. | 707/640 |
| 7,548,928 B1 * | 6/2009 | Dean et al. | 707/705 |
| 7,581,166 B2 * | 8/2009 | Renger et al. | 715/201 |
| 7,584,208 B2 * | 9/2009 | Spivack et al. | 707/999.103 |
| 2006/0073812 A1 * | 4/2006 | Punaganti et al. | 455/412.1 |
| 2006/0074980 A1 * | 4/2006 | Sarkar | 707/104.1 |
| 2006/0173985 A1 * | 8/2006 | Moore | 709/223 |
| 2007/0033354 A1 * | 2/2007 | Burrows et al. | 711/156 |
| 2007/0061487 A1 * | 3/2007 | Moore et al. | 709/246 |
| 2007/0083536 A1 * | 4/2007 | Darnell et al. | 707/101 |

OTHER PUBLICATIONS

U.S. Appl. No. 11/824,578, Gupta et al.
U.S. Appl. No. 11/906,127, Wood et al.
U.S. Appl. No. 11/906,149, Wood et al.
U.S. Appl. No. 11/906,134, Wood et al.
U.S. Appl. No. 11/906,127, filed Sep. 28, 2007, Wood, et al.
U.S. Appl. No. 11/906,149, filed Sep. 28, 2007, Wood, et al.
U.S. Appl. No. 11/906,134, filed Sep. 28, 2007, Wood, et al.
U.S. Appl. No. 12/002,431, filed Dec. 17, 2007, Moranta, et al.

* cited by examiner

*Primary Examiner*—Shahid A Alam
(74) *Attorney, Agent, or Firm*—Muirhead and Saturnelli, LLC

(57) ABSTRACT

Described are techniques for providing a publication notification in a data storage system. An active element manager component is used to perform data storage management operations for the data storage system. A feed aggregator in the data storage system aggregates feed items from one or more feeds. Each of the one or more feed items are associated with one of said feeds and indicates a publication notification for data associated with said one feed.

16 Claims, 35 Drawing Sheets

| |
|---|
| User ID 622 |
| User Contact Information 624 |
| License Information 626 |
| Support and Service Contract Information 628 |
| Service Call and Problem History 630 |
| Data Storage Information 632 (Hardware and/or software; Configuration, Capacity) |
| Website Activity Information 634 (download paper, website query) |
| Live Chat Support 636 |
| Phone Support 638 |
| User Community Information 640 |
| . . . . . |

VAR SUPPORT PAGE at website for VAR XYZ

It appears that your data storage system is running low on available storage. It is recommended that you add additional storage to avoid disruption to your hosted application data. Click HERE for more information or contact support for additional help.

Click here to visit VENDOR online store!

Click here to visit VAR online store!

Chat Support: Click here to chat live with VENDOR Tech Support Agent.

User Community for Email App on VENDOR System PQR- Get insights from other users.

Top Users:  J. Smith (1099 postings)
A. Brown (908 postings)
J. Lee (800 postings)

Support Call Back: Click here to have VENDOR Tech Support Agent call you back via phone.

Self Help Portal: Contains resources that will help you research issues on your own. Resources include: FAQs- About VENDOR and VAR products Knowledge Base: Search the VENDOR and VAR Tech Support Database Solution Finder: Step by step solutions to common questions and problems.

Access latest VAR software updates. Downloads available by clicking here.

FIGURE 10

TECHNIQUES FOR NOTIFICATION IN A DATA STORAGE SYSTEM

BACKGROUND

1. Technical Field

This application generally relates to data storage, and more particularly to techniques used for data storage management.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Different tasks may be performed in connection with a data storage system. For example, software may be executed on the data storage system in connection with performing data storage administration tasks such as for data storage configuration, management, and/or monitoring. In connection with performing administrative tasks, help facilities may be integrated with software used for performing the administrative tasks. The help facilities may be available locally on the data storage system, for example, using help files statically included on a CD-ROM. If there is insufficient information included in the help facilities on the data storage system, the customer may invoke a web browser in a different session and manually enter information to navigate and search different websites on the Internet in efforts to obtain additional relevant information for performing the data storage administrative tasks. The foregoing has drawbacks in that such searches can be time consuming and cumbersome, the customer may lack sufficient knowledge to perform accurate searches, and the customer may obtain incorrect information from unreliable sources. In connection with performing the first task, the user may perform the data storage administration in a first session connected to the data storage system. In connection with performing the second task of searching for additional information about the problems encountered in the first task, the user may start a second session by invoking the web browser to navigate and search websites on the Internet. There is no information shared between the two tasks performed other than that which the user enters manually.

Thus, it may be desirable to utilize techniques in connection with data storage system management, configuration, and/or monitoring which provide for connections to other external locations and environments outside of the data storage system. It may also be desirable that such techniques provide for transfer of information between the data storage system and the environments external to the data storage system to assist the user in connection with performing different data storage system management tasks.

SUMMARY OF THE INVENTION

In accordance with one aspect of the invention is a data storage system comprising: an active element manager component used to perform data storage management operations for a data storage system; and a feed aggregator for aggregating feed items from one or more feeds, each of said one or more feed items being associated with one of said feeds and indicating a publication notification for data associated with said one feed. The data storage system may be connected to one or more workstations each including code stored on a computer readable medium for retrieving and processing feed items for a user session having a user identifier, said user identifier being associated with one or more feed subscriptions for one or more feeds including said feed items. At least one of said feeds may be provided from a source external to said data storage system and at least one of said feeds may be provided by the data storage system. A feed item of a first feed provided by the data storage system may be sent to the feed aggregator from another location in the data storage system without a request for the first feed from the feed aggregator, and wherein a feed item of a second feed provided for a source external to said data storage system may be sent to the feed aggregator in response to a request from the feed aggregator for new feed items from the second feed. The first feed may include feed items corresponding to data storage system events. One of said feeds may include a feed item for a notification, said feed item indicating instructions to be executed in connection with said notification. The instructions may be included in the feed item and executed by a component on the data storage system. The feed item may be processed by said data storage system in accordance with one or more criteria when said data storage system obtains said feed item, said criteria including a condition indicating whether said data storage system is configured to automatically process said feed item. The criteria may be included in one or more filters. Each of said one or more filters may be one of a plurality of filer types, said filter types including an override filter, a user-specified filter, a default filter. The one or more feeds may be indicated in a feed source filter defining allowable feeds and feed providers for access by the feed aggregator. The feed item may provide for notification regarding one or more of: a software upgrade, processing to perform data collection and reporting for the data storage system, and an online documentation update, and a help file update. One of said filters may be a user-specified filter including one or more of user-defined keywords or selected predefined keywords. The criteria may include a condition requiring a configuration of the data storage system to indicate a specified service level in accordance with a service level requirement of said feed item in order for said feed item to be processed by the data storage system.

In accordance with another aspect of the invention is a method for providing a publication notification in a data storage system comprising: providing an active element manager component used to perform data storage management operations for the data storage system; and providing a feed aggregator in the data storage system for aggregating feed items from one or more feeds, each of said one or more feed items being associated with one of said feeds and indicating a publication notification for data associated with said one feed. At least one of said feeds may be provided from a source external to said data storage system and at least one of said feeds is provided by the data storage system, and wherein a feed item of a first feed provided by the data storage system may be sent to the feed aggregator from another location in the data storage system without a request for the first feed from the feed aggregator, and wherein a feed item of a second feed provided for a source external to said data storage system may be sent to the feed aggregator in response to a request from the feed aggregator for new feed items from the second feed. The first feed may include feed items corresponding to data storage system events. One of said feeds may include a feed item for a notification, said feed item indicating instructions to be executed in connection with said notification. The feed item may be processed by said data storage system in accordance with one or more criteria when said data storage system obtains said feed item, said criteria may include a condition indicating whether said data storage system is configured to automatically process said feed item. The criteria may be included in one or more filters. Each of the one or more filters may be one of a plurality of filer types including an override filter, a user-specified filter including one or more of user-defined keywords or selected predefined keywords, and a default filter. The criteria may include a condition requiring a configuration of the data storage system to indicate a specified service level in accordance with a service level requirement of said feed item in order for said feed item to be processed by the data storage system. The feed item may include instructions to be executed by a component of the data storage system in connection with said notification and said feed item may provide for notification regarding one or more of: a software upgrade, processing to perform data collection and reporting for the data storage system, and an online documentation update, and a help file update.

BRIEF DESCRIPTION OF THE DRAWINGS

Features and advantages of the present invention will become more apparent from the following detailed description of exemplary embodiments thereof taken in conjunction with the accompanying drawings in which:

FIG. 7A is an example representation of user profile information;

FIG. 10 is an example of a screenshot that may be displayed as a webpage for a partner website;

DETAILED DESCRIPTION OF EMBODIMENT(S)

Figure 1:
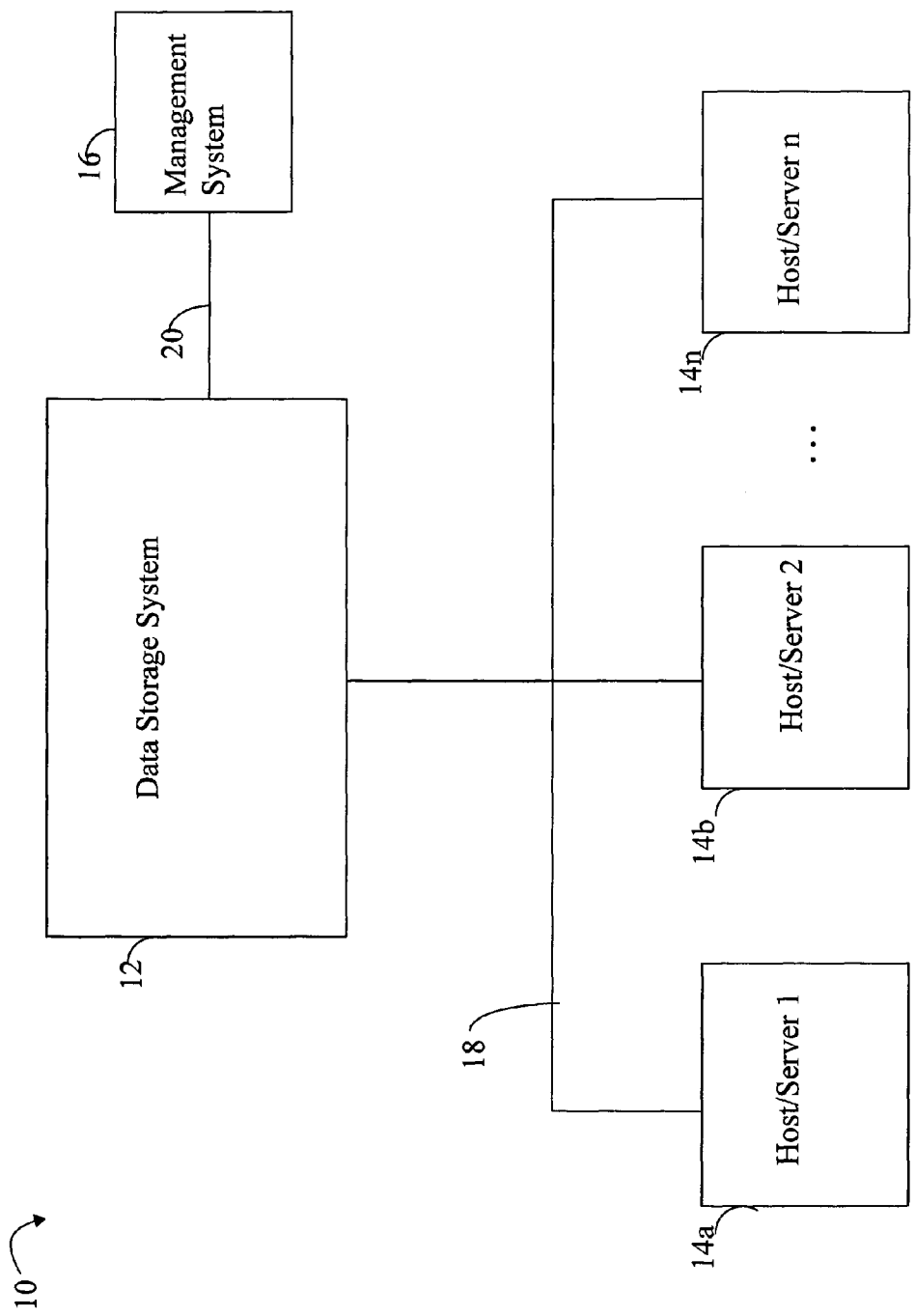
FIG. 1 is an example of an embodiment of a system that may utilize the techniques described herein.

Referring to FIG. 1, shown is an example of an embodiment of a computer system that may be used in connection with performing the techniques described herein. The computer system 10 includes one or more data storage systems 12 connected to server or host systems 14*a*-14*n* through communication medium 18. The system 10 also includes a management system 16 connected to one or more data storage systems 12 through communication medium 20. In this embodiment of the computer system 10, the management system 16, and the N servers or hosts 14*a*-14*n* may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with storing the data of the hosts on the appliance and also software used in connection with configuring the data storage for use by the hosts in connection with techniques described herein. As an example in connection with an email application server component that may executed on the hosts 14a-14n, the data storage configuration tasks may include allocating storage for user accounts or mailboxes, specifying the devices (logical and/or physical) used to store the email data, specifying whether data replication is performed for disaster recovery, and the like. Techniques that may be used in connection with performing data storage configuration and configuration tasks are described in more detail in following paragraphs in order to provide ease of use to customers of the data storage system(s) 12.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems such as one or more of the data storage systems offered by EMC Corporation of Hopkinton, Mass. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing the techniques as described herein for processing a data storage configuration request.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the techniques herein.

Figure 2:
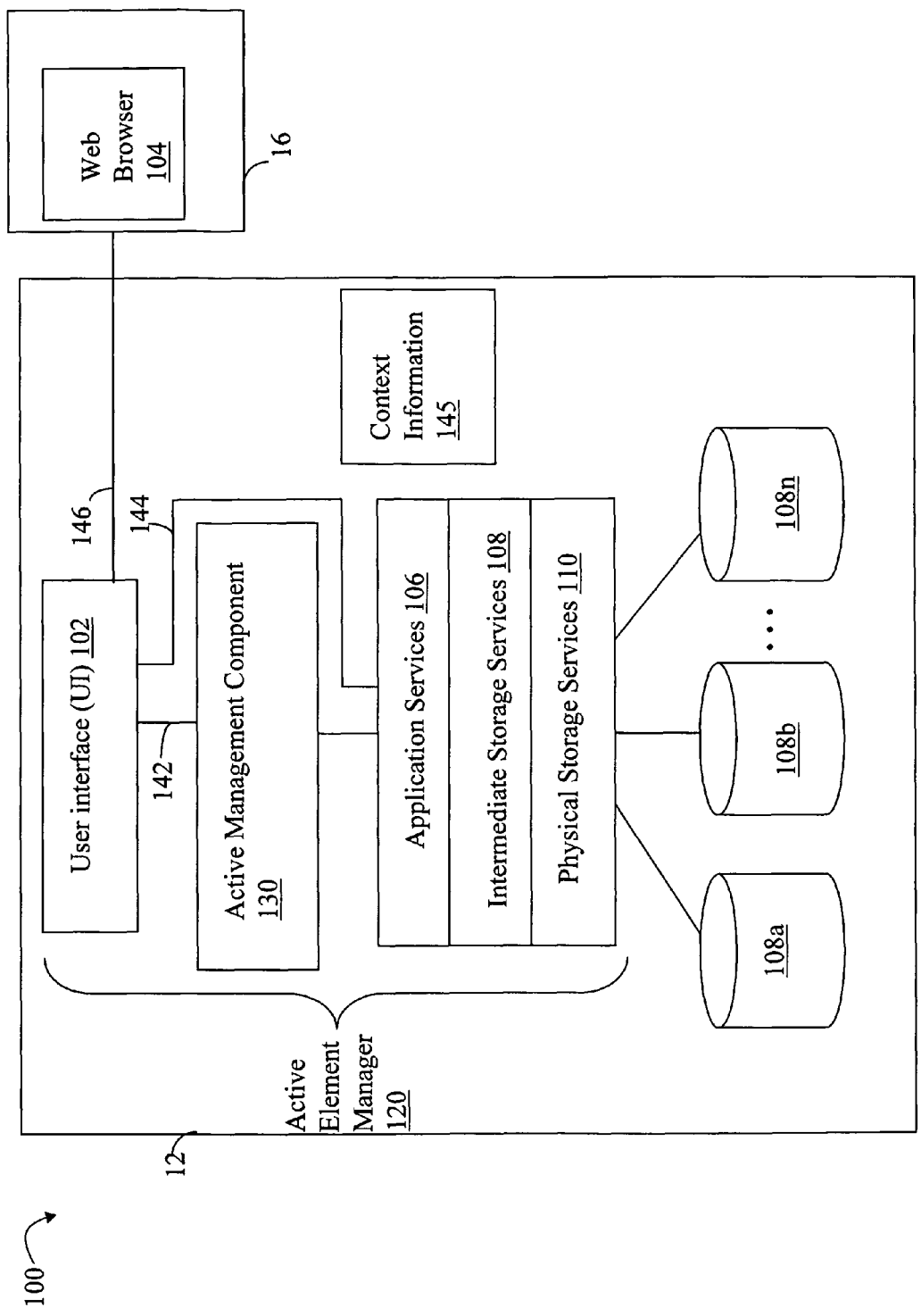
FIG. 2 is an example of components that may be included on the data storage system for use in performing the techniques herein.

Referring to FIG. 2, shown is an example of components that may be included on the data storage system 12 and the management system 16. The management system 16 may include a web browser 104 which is used when communicating with the active element manager (AEM) 120 of the data storage system 12. The AEM 120 may be used to perform operations in connection with management, configuration, monitoring, and the like, of the data storage system. For example, the AEM 120 may be used to provision storage used by any one or more different applications such as an email application, a database application, and file server, and the like. As described herein, the AEM 120 may also be used to facilitate interactions with environments and locations external to the data storage system 12 and management system 16, such as other computer network locations. In other words, the AEM 120 may be used to facilitate communications with other locations and environments external with respect to the data storage system environment in which the data storage system environment may include, for example, one or more data storage systems 12, the management system 16, a SAN, and the like.

The AEM 120 includes a user interface (UI) 102, an active management component 130, and one or more layers or levels of services, such as 106, 108 and 110, in connection with implementing a data storage request such as a data storage configuration request.

The user interface (UI) 102 may provide for one or more different types of user interfaces and associated data. For example, the UI 102 may provide support for a graphical user interface (GUI), command line interface (CLI), and the like, to support interactions between the data storage system 12 and the hosts 14a-14n of FIG. 1. The UI 102 may interact with other components on the data storage system in connection with communicating with a user. For example, the UI 102 may provide UI data (e.g., content or data used to populate the UI menus), and UI presentation or structure information (e.g., command organization or particular hierarchical menu structure) to another component such as the web browser 104 in connection with interacting with the user.

The active management component 130 may be used in connection with facilitating communications between the UI 102 and the different service layers 106, 108 and 110 when performing active element management operations. Active element management operations may be characterized as those involving interactions with environments and locations external to the data storage system environment. Such external environments and locations may include, for example, other network locations and websites as described elsewhere herein. The active management component 130 may facilitate a two-way communication flow of information to and/or from the external environments. The active management component 130 may gather context information 145 describing the current context and state of the data storage system with respect to the current user and operation being performed. The component 130 may gather such information included in 145 by communicating with other components on the data storage system 12, such as one or more of the service layers 106, 108 and 110. The component 130 may communicate the context information 145 to a target location in an external environment such as a target network location on the Internet. The component 130 may facilitate selecting, in accordance with the context information 145 of the data storage system, a target location in the external environment, such as an Internet website, and communicating the context information directly to the target location. The component 130 may also be used to facilitate communicating information received from the target location to the user.

In the example 100, the component 130 is represented as a single logical component. However, an embodiment may integrate the operations and functionality of the component 130 in the UI 102 and/or other components included in the AEM 120.

It should be noted that there are two paths 142 and 144 illustrated in FIG. 2. The path 142 may be used in connection with those operations involving interactions with environments external to the data storage system. The path 144 may be used when performing operations that do not involve such interactions with environments external to the data storage system 12 and management system 16. For example, the path 144 may be used in connection with performing a data storage configuration request issued by a user from the management system 16. The path 142 may be utilized if an operation or condition occurs involving the active management component 130 such as when the user requests connection to a website on the Internet for additional information and assistance with respect to an error that occurred as a result of the data storage configuration request.

In the example 100, the AEM 120 may include application services 106, intermediate or generic storage services 108, and physical storage services 110. In one embodiment, the user may interact with the UI communicating directly with any one of the different services 106, 108 and 110. In other words, a user may communicate directly with layer 106, 108 or 110. If a user provides an input request and/or data by directly communicating with one of the upper service layers, such as 106, the user request and/or data may be mapped to one or more lower service requests, such as by services of 106 communicating with services of 108 and/or 110 to implement the original input request. By connecting to the different service layers 106, 108 and 110, the UI may provide the user with exposure to different levels of abstraction in connection with performing data storage system management tasks. In one embodiment as described in more detail below, the different service layers may be in accordance with different levels of proficiency and knowledge with respect to performing data storage system management tasks for different applications.

The application services 106 may have an application-specific focus and provide a level of abstraction customized for an application such as, for example, a particular email application, law office application or medical office application, as well as a class of related applications, such as multiple email applications. The application services layer 106 may map the user provided inputs for use by the intermediate storage services 108. When a user interacts with the application services 106 for a particular application, the interface language may vary with the application. For example, if the application is a law office application, the interface language, menu options, and the like, may be tailored to the law profession. Similarly, a medical office application may utilize an interface language, menu options, and the like, familiar to the medical office. As such, the application services 106 may use one set of rules or mappings for each application to implement the application specific best practices for the user level. A first set of rules for the medical office application may be used to map the user input parameters using medical office terminology to parameters for the appropriate API calls for other services included in 108 and/or 110. A second set of rules for the law office application may be used to map the user input parameters using law office terminology to parameters for the appropriate API calls for other services 108 and/or 110. The user connecting to the data storage system at the application services 106 may be provided with a user interface customized for the selected level and application to perform a requested data storage configuration.

The intermediate storage services 108 may be an intermediate level. The application services 106 may communicate with the intermediate storage services 108 when implementing a request for data storage configuration. In one embodiment, a user connecting to the intermediate storage services 108 may be provided with a generic level of interaction which may not be tailored for the particular application. In other words, the same language and user interface may be presented to a user for multiple applications such as the medical application or law office application. As a variation to the foregoing, the intermediate storage services 108 may be customized for each application and provide for a more detailed level of exposure that varies per application.

The physical storage services 110 provide the most detailed or greatest level of exposure of the underlying data storage system. The physical storage services 110 may be customized for the particular storage vendor and associated options. The user interface for a user connected at to the physical storage services may include menu options and terms particular to the underlying storage vendor and the more knowledgeable user. For example, the user may specify particular devices, RAID levels and techniques, file types, SCSI and iSCSI terminology, and the like.

As an example in connection with a user making a data storage configuration request and communicating with the application services 106, the user may input data in connection with the request in an application specific context. For example, a user may make a data storage configuration request to configure data storage for a file system or email application. The data input by the user may be in the context of the particular application (e.g., a number of mailboxes, size of mailbox, storage group, and the like). The application-specific data received by the application services 106 may be mapped to one or more application-neutral or generic requests to the intermediate storage services 108. The intermediate storage services 108 may then make one or more calls to the physical storage services 110 to implement requests in the context of the physical storage devices 108a-108n, for example, for the particular data storage vendor and underlying hardware.

Software executed on the data storage system may provide for implementation of best practices for data storage configuration and data services in accordance with each particular application whose data is hosted on the data storage system. Such software may be included in the different service layers, such as 106, 108 and 110, of the AEM and are described in more detail in U.S. patent application Ser. No. 11/824,578, filed: Jun. 29, 2007, APPLICATION AWARE STORAGE, which is incorporated by reference herein. In such an embodiment using the different service layers, such as 106, 108 and 110 having an application-specific focus with each layer providing a different level of abstraction customized for each application, the UI may provide a user with different levels of exposure to information and requests when performing data storage system configuration tasks.

It will be appreciated by those skilled in the art that an embodiment may include different service layers in connection with performing the techniques described herein. For example, an embodiment of the AEM 120 may not incorporate services which have an application-specific focus and may not be characterized as application aware.

It should be noted that the example 100 is one possible embodiment of the components used in connection with the techniques herein. As illustrated in FIG. 2, the AEM 120 is included in the data storage system. In another embodiment using the techniques herein, the AEM 120 may be installed and execute on a host or other component connected to the data storage system. In yet another embodiment portions of the AEM 120, such as the UI 102 and/or one or more of the services 106, 108, 110 may be installed and execute on a host or other component connected to the data storage system.

Figure 3:
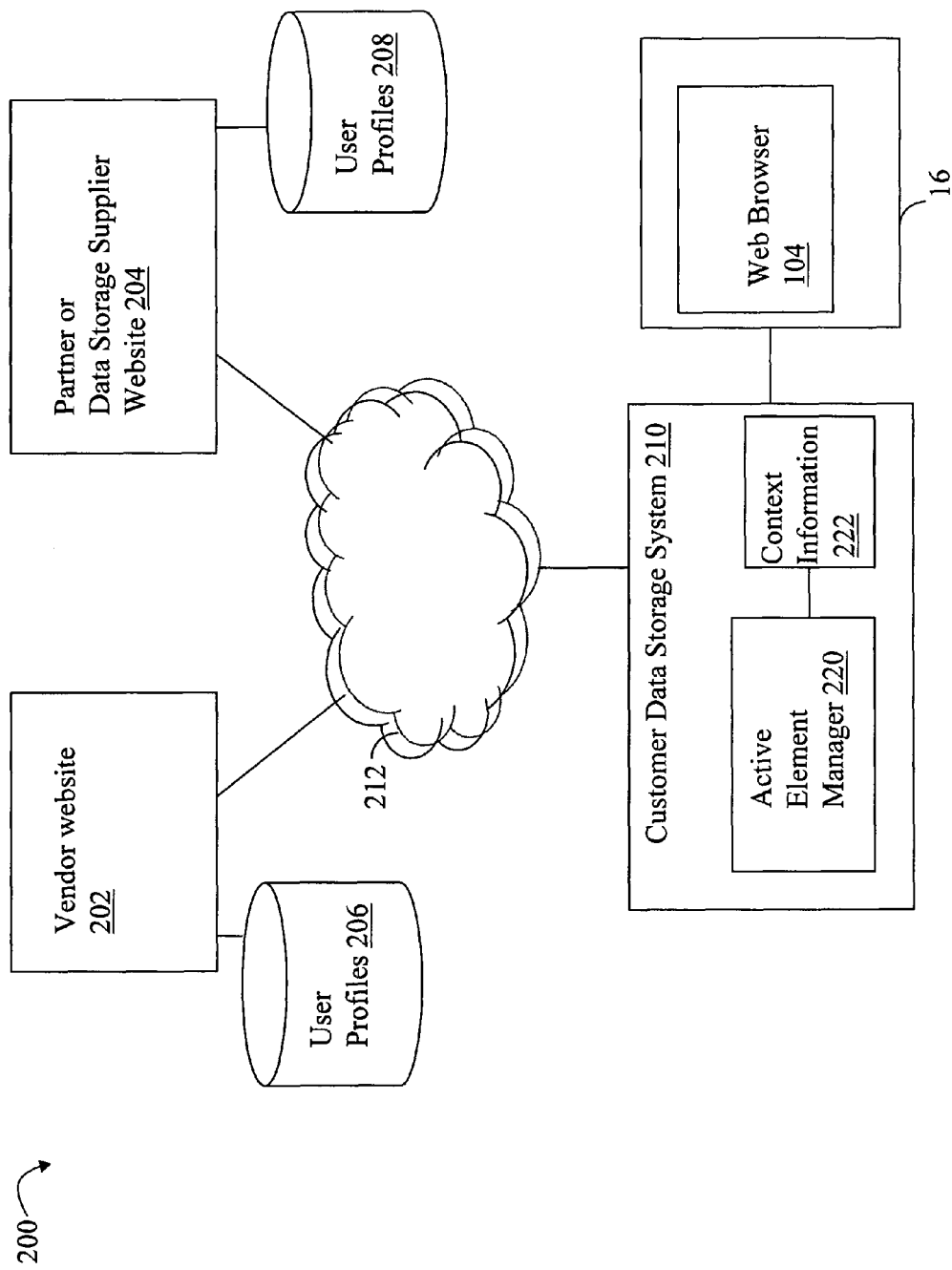
FIG. 3 is an example of a network that may include the data storage system utilizing the techniques herein.

Referring to FIG. 3, shown is an example 200 of a network in which the techniques herein may be performed. The example 200 includes a customer data storage system 210 connected to a network 212, such as the Internet, a vendor website 202 and a partner or data storage supplier website 204. The customer data storage system 210 may be a data storage system 12 as described elsewhere herein. The system 210 may include the AEM 220 which may generate the context information 222. A user may connect to the AEM 220 by logging in using a web browser 104 on the management system 16. As described herein, the data storage system 210 and management system 16 may be included in a data storage system environment. The data storage system 210 may be connected standalone to the network 212, may be included in a SAN, or other arrangement. The AEM 220 may be used in connection with producing the context information 222 and facilitating communication of the context information 222 to an external environment, such as one or more of the websites 202 and 204. Additionally, the AEM 220 may be used in connection with receiving information from the external environment and communicating the received information to the user, such as via the web browser 104.

The vendor website 202 may be a website of a data storage vendor or manufacturer, such as EMC Corporation. The partner or data storage supplier website 204 may be a website provided by a partner or data storage supplier. As an example, a partner or data storage supplier may be a distributor, reseller or VAR (Value added reseller) of the data storage systems of the vendor. In connection with examples provided herein, a particular partner or data storage supplier, such as a VAR, may be described for purposes of illustration and should not be construed as a limitation. As an example, a VAR may add additional hardware and/or software for use with the data storage system of a particular vendor and the VAR may sell the combination of the data storage system with VAR-added hardware and/or software to the customer. Each partner or data storage supplier may have a business relationship with the vendor or manufacturer of the data storage system. A customer may purchase a data storage system from one of the partners or data storage suppliers. As an example with respect to FIG. 3, the customer may purchase the data storage system 210 from a VAR. The VAR may provide an environment, such as a VAR website. The VAR website may be an illustrative example of website 204. The VAR website may include, for example, information on VAR hardware and software products, services, training and educational courses offered by the VAR, support for VAR-related products, VAR online store, VAR-sponsored user communities (e.g., using a particular application on a data storage system including VAR products), and the like. The website 204 may be provided by, and under the control of, the VAR or other partner. The vendor website 202 may be provided by, and under the control of, the data storage vendor or manufacturer. The vendor may provide website 202 for use by the vendor's partners. The vendor website 202 may include information regarding vendor supplied products, services, training, user communities, and the like, as may be included in the partner website 204 but, in contrast, may be vendor specific if included in 202. As will be described herein, the data storage system 210 may communicate, directly or indirectly, with the websites 202 and 204.

As described herein, the AEM 220 may be used in connection with configuring and management of the data storage system in the data storage system environment. The AEM may also be used to facilitate connecting the AEM on the data storage system with external environments along with context information from the data storage system.

As an example in connection with existing data storage systems not utilizing the AEM, a user may perform a data storage configuration operation, such as provision data storage for mailboxes in connection with an email application hosting data on the data storage system 210. An error may occur in connection with performing the data storage provisioning and the user may open up a new window or another web browser session. The user may manually enter a URL of a website which the user knows has additional information relevant to the provisioning task for the email application. If the user does not know the URL, the user may first perform a search, such as using an Internet search engine, to determine the correct URL. Once the user has the correct URL, the user may navigate to the URL for the website and perform queries at the website to gain additional information about how to handle the error encountered. In the foregoing, two tasks are performed: a first task in connection with the provisioning operation and a second task in connection with the subsequent search for additional information in connection with the error from the provisioning operation.

In connection with the AEM, the AEM may be used to automate the foregoing process and automatically connect the user to the correct website. Furthermore, the user may be connected to a particular page on the website. The context information of the data storage system on which the user encountered the error may be communicated to the target location, such as the website. The AEM may be used to obtain the relevant context information for use in connection with subsequent interactions between the user and the website to which the user is being connected. Additionally, the user may receive through the AEM additional information from the external environment of the target location. Thus, the AEM serves to facilitate automatically connecting the user to the appropriate external environment, providing the relevant context information to the target location of the external environment, and facilitating further communications between the data storage system 210 and the external environment.

The AEM 220 may be configured by the VAR or other partner selling the data storage system 210 to connect the user to the appropriate target location and external environment. For example, for errors occurring with VAR hardware and/or software, a customer may be automatically connected to the website 204 with the appropriate context information 222 for the data storage system as well as VAR hardware and/or software. If an error occurs with the data storage system having nothing to do with the VAR products, the customer may alternatively be connected to the vendor website 202. The customer may be directed to any one or more target locations at the external environment such as, for example, a virtual or online user community, a customer support agent, online store, and the like. As described herein, the user community may be characterized as a virtual community having a common interest. In connection with the techniques herein, there may be user communities focused on a particular vendor's hardware, combination of data storage system and application hosting storage therein, and the like. Members of the user community may exchange information regarding the common area of interest, for example, via a user community hosted at a website location. The user community may include user forums, blogs, various sources of technical information, and the like.

Included at each of the websites 202 and 204 may be, respectively, user profile data 206 and 208. The user profile data 206, 208 may be data gathered about the user, such as customer-related information about data storage systems purchased, license information, and data regarding current and previous interactions with the websites. In one embodiment, the set of user profile data 208 may be a master or aggregate copy of user profile data. The user profile data 206 may be collected for a time period, such as in connection with user interactions during the time period, and then provided to the website 204 for incorporation into the master user profile 208. A vendor providing the website 202 may perform such data gathering and forwarding of user profile data 206 as a service to its partners or suppliers having a website such as 204.

The context information 222 may describe, for example, an error received, the recent operations performed by the user leading up to the error, information about the current data storage configuration, the user ID (e.g., the user login identifier as provided in connection with authentication), and the like. The user profile 208 may include, for example, current licensing information, and a variety of different types of historical user data such as service calls, previous problems reported to an interactive customer support agent, previous purchases (via online or other), and the like.

The AEM 220 may collect and provide selected context information 222 in accordance with the particular problem or other current context related to the user's data storage system environment. The AEM 220 may be characterized as the launching point or connection point to the external environments and target locations (e.g., such as over a computer network) in which the AEM 220 facilitates the two-way flow of information between the data storage system and the external environment(s). The two-way information flow facilitated by the AEM may be used to enrich the data storage system customer's experience in a variety of different interactions such as, for example, related to support, e-commerce, virtual or online user communities, and the like, at one or more external environments, such as websites 202 and/or 204 as will be described in more detail elsewhere herein.

As one example, the data storage system 210 may directly communicate and interact with the partner website 204. In turn, the partner website 204 may communicate with the vendor website 202, for example, to retrieve information which is then provided to the customer. The website 204 may communicate with the website 202 to indirectly expose the customer to selected filtered portions of the website 204. For example, the data storage system 210 may communicate directly with the website 204 and the website 204 may expose particular portions of the website 202 to the customer. As another example, the data storage system 210 may directly communicate with both the websites 202 and 204 in accordance with the configuration of the AEM 220.

Figure 4:
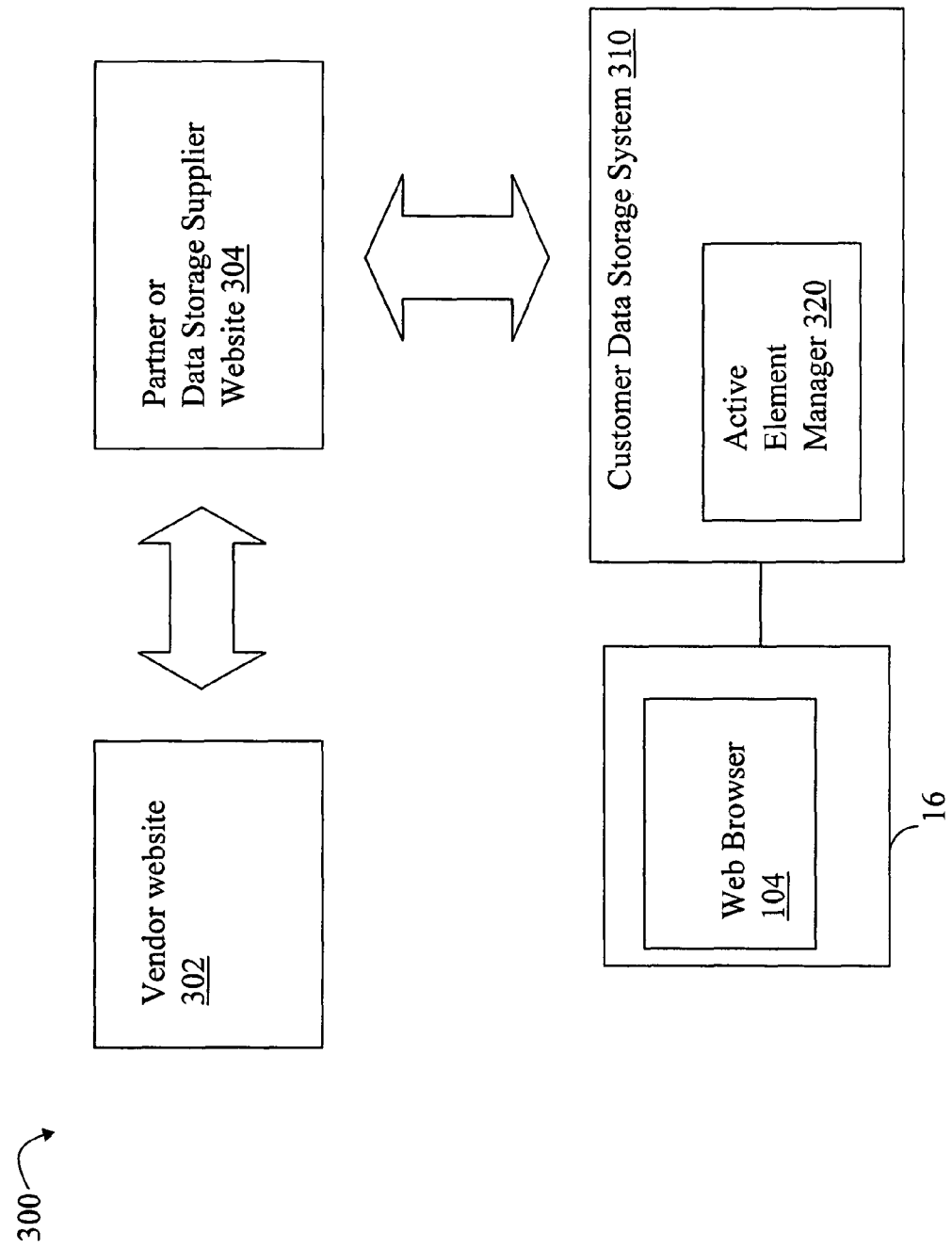
FIGS. 4 and 5 are examples illustrating data flow between the data storage system and external websites in connection with the techniques herein.

Referring to FIG. 4, shown is an example illustrating how information may flow in connection with the techniques herein. The example 300 illustrates a customer data storage system 310 which communicates directly with the partner or data storage supplier website 304, such as that under the control of a VAR. The website 304, in turn, may communicate with the vendor website 302, such as under the control of a data storage vendor or manufacturer having the VAR as a business partner. Information from the websites 302 and/or 304 may be communicated through website 304 to the data storage system 310. The data storage system 310 may include the AEM 320. A data storage system environment may include a management system 16 with a web browser 104 through which a customer uses to invoke and utilize the AEM 320 of the customer data storage system 310.

As an example, a VAR website may obtain selected technical information from different vendor websites dependent on the customer's data storage system. The VAR website may communicate with the appropriate vendor website to obtain the information which is then displayed to the customer via the AEM and web browser connected thereto. The customer may not be aware of the indirect communication between the VAR and vendor website.

Figure 5:
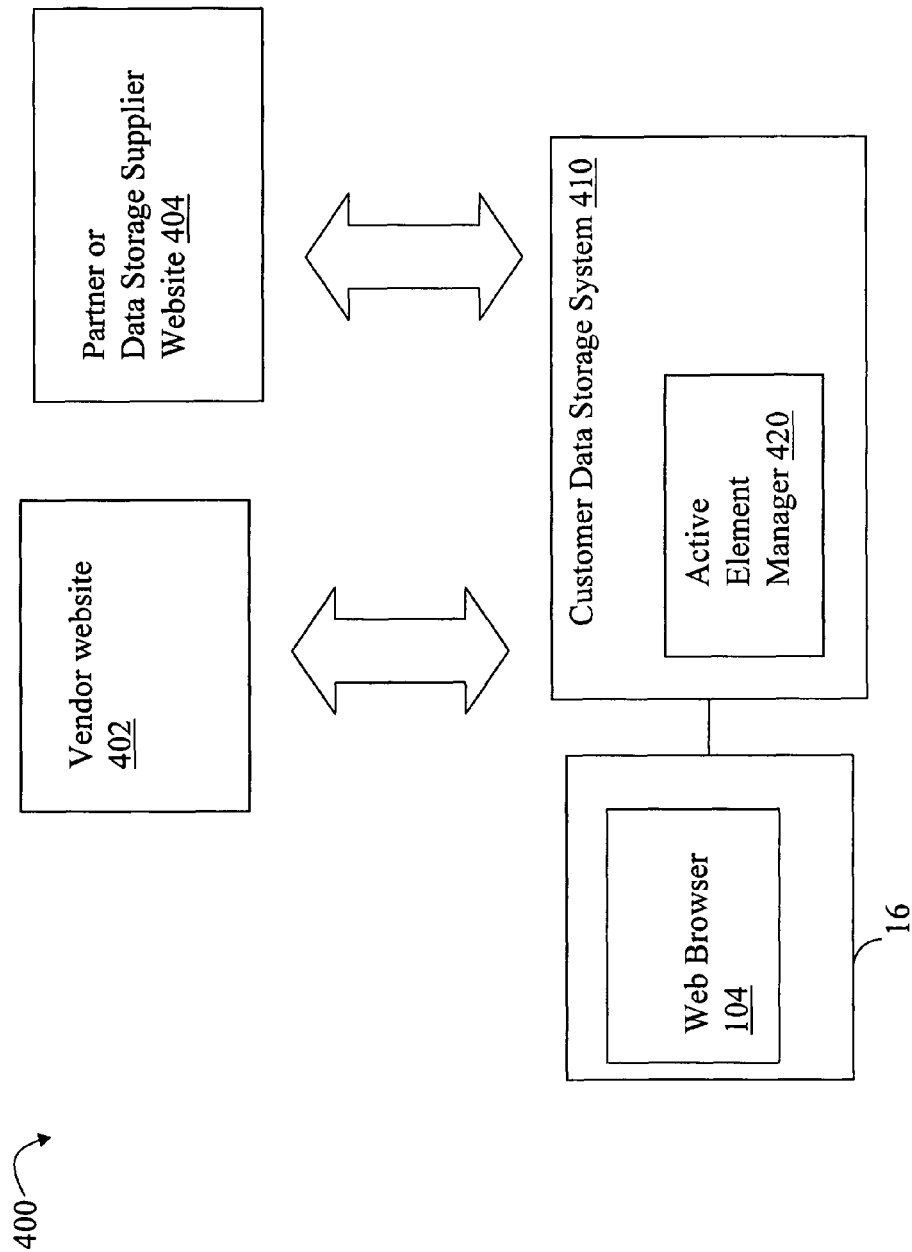

Referring to FIG. 5, shown is another example illustrating how information may flow in connection with the techniques herein. The example 400 illustrates a customer data storage system 410 which communicates directly with the partner or data storage supplier website 404, such as that under the control of a VAR. The data storage system 410 may also communicate directly with the vendor website 402, such as under the control of a data storage vendor or manufacturer having the VAR as a business partner. Information from the websites 402 and/or 404 may be communicated directly to the data storage system 410. The data storage system 410 may include the AEM 420. A data storage system environment may include a management system 16 with a web browser 104 through which a customer uses to invoke and utilize the AEM 420 of the customer data storage system 410.

It should be noted that information flow in connection with the customer data storage system as facilitated by the AEM may be a combination of that which is illustrated in FIGS. 4 and 5 as well as other variations. For example, the partner and/or vendor may each have one or more websites to which the customer data storage system may communicate depending on the particular context information and configuration of the AEM. The AEM may be configured by the partner to control the external environments and target locations therein to which the customer data storage system communicates. As illustrated elsewhere herein, the particular external environment and target location with which the data storage system communicates may vary with context information.

In connection with the techniques herein, context information may be information that is transmitted from the data storage system to a target location in an external environment. Information that is received by the data storage system may include user-relevant information determined, for example, by code executing on one of the partner and/or vendor websites. Other information that may be communicated between the data storage system and external environments may vary with particular user interactions. The foregoing is described in more detail in following paragraphs.

Figure 6:
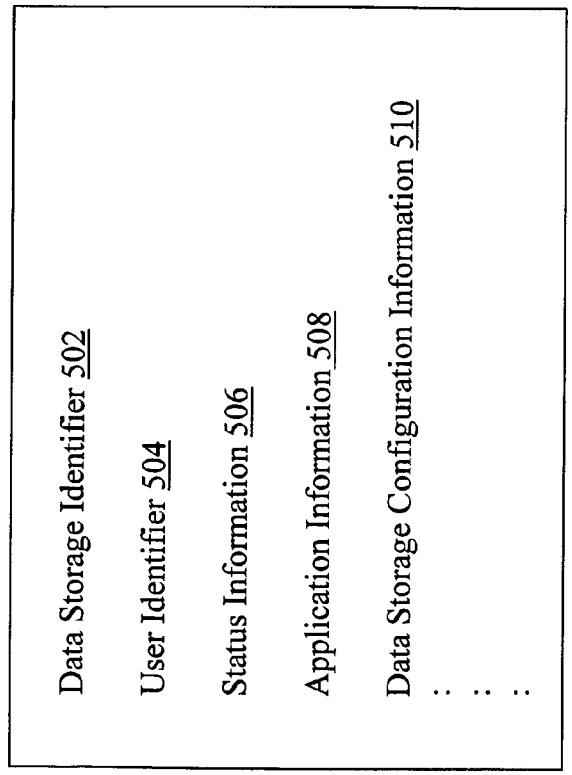
FIGS. 6 and 7 are examples of context information.

Referring to FIG. 6, shown an example representation of context information as may be collected by the AEM and transmitted to an external environment. The example 500 includes a data storage identifier 502, a user identifier 504, status information 506, application information 508 and data storage configuration information 510. The context information supplied by the AEM may be different than as described herein and vary with the particular AEM as well as the particular context to which the AEM is responding. For example, as described in FIG. 2, the AEM may have information regarding the particular applications which are hosting data on the data storage system. However, another embodiment may include an AEM which does not have information regarding the particular applications hosting data on the data storage system and, as such, application information 508 may be omitted in such an embodiment. As another example, the AEM may be installed on a data storage system supplied by a VAR. The data storage system may also include VAR-specific hardware and/or software. An error or other user action may occur involving VAR-specific hardware and/or software. As a result, additional information may be included in the context information related to the VAR-specific hardware and/or software. Such additional context information may include the name, version number, settings, options, and the like, for the VAR-specific products. The user may be directed to the VAR website all the time, or conditionally, such as when a VAR-specific component is involved in connection with the user inquiry, error, and the like, to which the AEM is responding. If there is an error which is not related to a VAR product, the AEM may omit any VAR-particular information and may connect the user to the vendor website directly, or indirectly through the VAR website.

Figure 7:
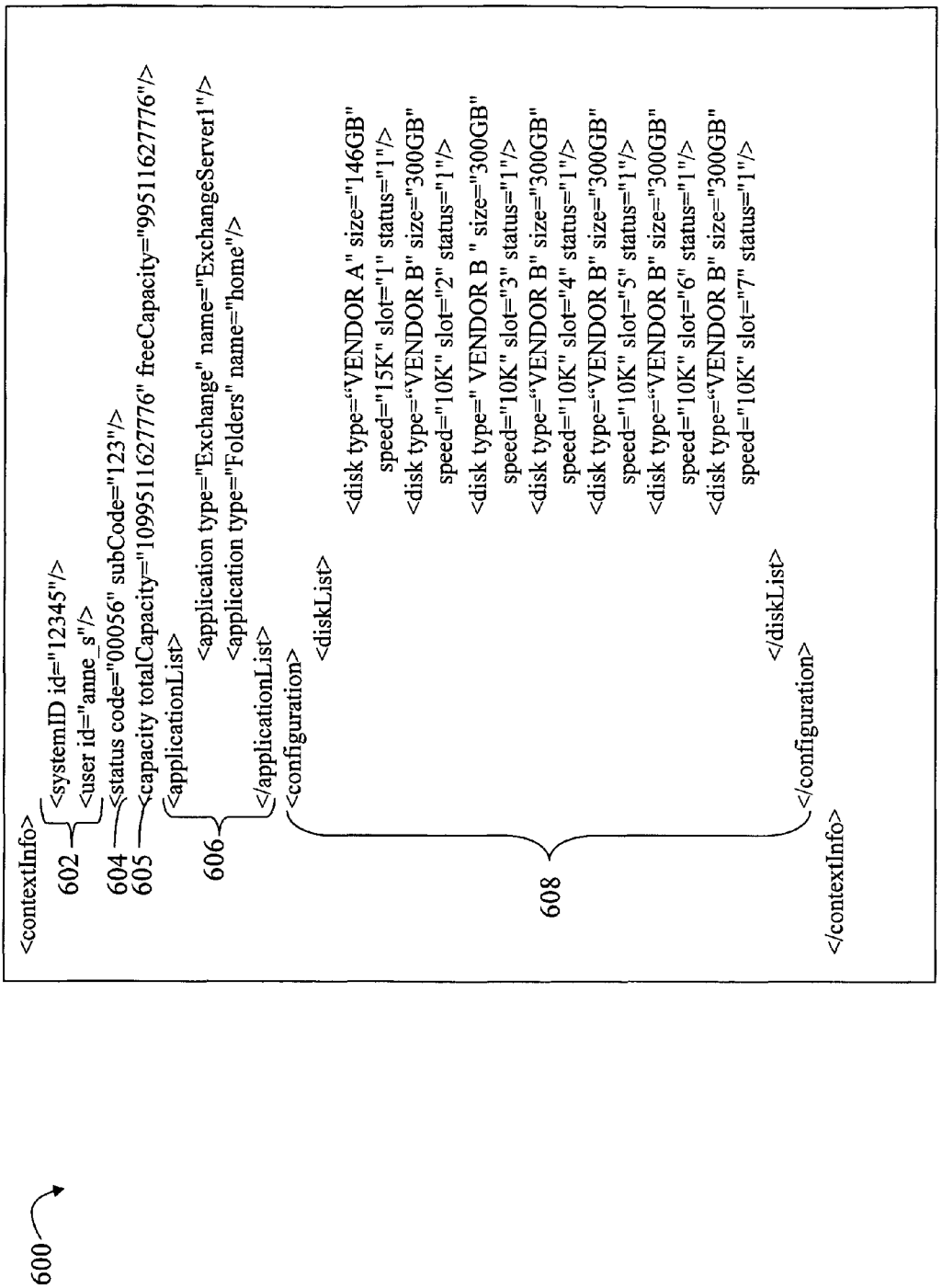

Referring to FIG. 7, shown is a more detailed example of context information that may be transmitted from the AEM. The example 600 illustrates context information which is communicated in XML format. Element 602 includes a system identifier and user identifier. The system identifier of "12345" may be an identifier of the particular data storage system on which the AEM is included. The system identifier may identify the data storage system model as well as a particular instance of a data storage system manufactured or supplied. The user identifier "anne_s" may identify the user as logged onto the AEM. The user identifier may be used as an index into the user profile data, for example, as illustrated in FIG. 3 on the websites 202 and 204. Data may be stored per user as identified by each user identifier. The user identifier, along with other authentication information, may also be used to allow the data storage system including the AEM to connect to the external environment.

The field 604 may include status information, such as in the form of a status code and subcode, indicating the status of the data storage system. The field 604 may include a numeric encoding of an error condition or state of the data storage system, for example, resulting from the most recent user operations. In one embodiment, the data storage system including the AEM as well as the different external environments with which the AEM communicates may utilize a common message catalogue. The AEM may provide information in 604 which is also commonly understood by other external environments with which the AEM can communicate.

The field 605 may include information regarding the storage capacity of the data storage system and also the amount of available or free data storage. Such information may relate generally to the state of the data storage system and can be useful for a variety of different purposes as described herein, such as, for example, support and problem diagnostics and e-commerce.

The field 606 may identify the particular applications for which storage is being hosted on the data storage system identified by 602. The field 606 may identify, for example, the type of application, such as a general category as email applications, as well as name the application instance, such as Microsoft® Exchange Server.

The field 608 may include other data storage configuration information such as, for example, identifying the particular disk drive vendor, size, speed, location (e.g., slot number), status, and the like.

The information in various fields of FIG. 7 may describe the current configuration and associated state thereof. For example, field 605 conveys information regarding the data storage configuration (e.g., maximum capacity) as well the current state (e.g., amount of storage which is used or free). Similarly information of field 608 includes information about the data storage configuration (e.g., the disk types indicating vendor) as well as the current state of the data storage configuration (e.g., status of each disk).

Referring to FIG. 7A, shown is an example representation of the types of data that may be included in the user profile as maintained for each user identifier. User profiles are illustrated, for example, in FIG. 3 as elements 206 and 208. User profile information may include the user identifier 622, user contact information 624, license information 626, support and service contract information 628, service call and problem history 630, data storage information 632, website activity information 634, live chat support information 636, phone support information 638, and user community information 640. It should be noted that any portion of the information included in FIG. 7A as stored in connection with the user profile may be included in context information provided by the AEM. The particular portions included may vary with the particular connection, transaction and/or operation being performed by the AEM.

The user identifier 622 may be used as an index or identifier into the user profile information for each user. The user identifier 622 may be, for example, the identifier of 504 of FIGS. 6 and 602 of FIG. 7 as described elsewhere herein. The user contact information 624 may include complete name, address, phone, email, and other information used to contact the user identified by 622. The information in 624 may be used, for example, to customize and personalize interactions between the user and customer support personnel in interactions facilitated by the AEM via the partner and/or vendor website.

The license information 626 may describe the one or more licenses that the user has, for example, for the VAR or vendor software thereon. The license information may describe the license terms and provisions of the one or more licenses. For example, the license information 626 may indicate an expiration date, if any, for different software installed on the data storage system. The information in 626 may be useful, for example, in connection with facilitating e-commerce transactions to remind the user that a current license will expire, offer better or different license terms, and the like.

The support and service contract information 628 may include the level of support being provided to the user, such as by the partner. For example, the user may have purchased a contract for unlimited help support, a fixed fee for each problem inquiry, and the like. Information in 628 may be useful, for example, when the AEM is facilitating interactions between the user and online or telephone customer support interactions to indicate to the customer support personnel information on the relationship with the particular user.

The service call and problem history 630 may indicate a history of previous problems this user has had, the number of technician service calls dispatched to the customer's site by the partner and/or vendor, and the like. Such information may be useful in connection with subsequent interactions since the user may be experiencing the same or related problems.

The data storage information 632 may identify the particular hardware and/or software of the vendor and/or supplier. Such information may identify the hardware and/or software component name, version information, options and settings for configurations, storage capacity, and the like. The information in 632 may be useful, for example, in providing customer support, directing the user to information of interest, and in e-commerce transactions to notify the user regarding discounts on hardware/software of interest.

The website activity information 634 may identify recent user interactions and activities such as, for example, different electronic paper publications downloaded, different queries performed at the vendor and/or partner websites, and the like. The information in 634 may be useful, for example, in notifying the user of other information that may be of interest, indicating a level of proficiency of the user, and the like. For example, based on particular electronic publications downloaded or queries may at the vendor and/or partner website, it may be inferred that a user is a novice, or other level of proficiency with respect to a particular application and/or data storage system for data storage system management.

The live chat support information 636 may include a record of user interactions with online interactive help support. This may be useful in a manner similar as described in connection with 630 to provide a context for a current interaction since the current interaction for help may be a follow-up on a previous interaction for support assistance.

The phone support information 638 may include a record of user interactions with phone support. This may be useful in a manner similar as described in connection with 630 and 636 to provide a context for a current phone support interaction since the current phone support call may be a follow-up on a previous interaction for support assistance.

The user community information 640 may describe the membership and/or activities of the user identified in 622 for different online virtual user communities. For example, there may be virtual user communities for provisioning and management of data storage for a particular application on a particular vendor's data storage system. Examples of data that may be included in 640 are described elsewhere herein. Different virtual user communities focus on particular areas of interest, such as products of a vendor and/or VAR used with a particular application, Information included in the user profile may be used in connection with providing selected user-relevant information to the AEM from the partner and/or vendor website. The user-relevant information may be targeted or customized for the particular user in accordance with the user's profile information. The customized information may take a variety of different form using a variety of different technologies. For example, customized information may be pushed from the vendor and/or partner websites to the AEM in the form of notices, alerts, emails, and the like, notifying the user about the existence of different products, services, papers, virtual user communities, sales events, discounts, upgrades, new software and/or hardware, and the like, that may be of interest to the user. This is described in more detail in following paragraphs.

Figure 8:
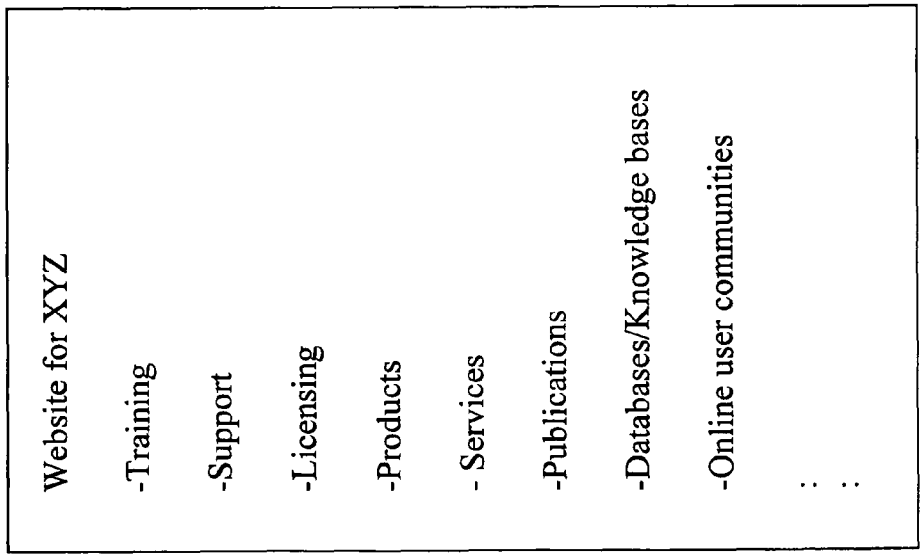
FIG. 8 is an example representing information that may be included at a vendor or partner website.

Referring to FIG. 8, shown is an example of information that may be included on a website of a vendor or partner. In the example 680, the website for vendor or partner XYZ may include information specific to the particular vendor or partner. For example, the website may include information related to training, support, licensing, products, services, publications, databases or knowledge bases, and virtual user communities provided by the party XYZ. The example 680 generally represents the types of information that may be included on a main web page of the website, such as 202 or 204 of FIG. 2. The main web page may include links to other web pages hosted on the website providing additional detail on each item in the example 680.

The user may be notified regarding relevant portions of the information 680 available at the website as selected in accordance with a user's profile.

Figure 9:
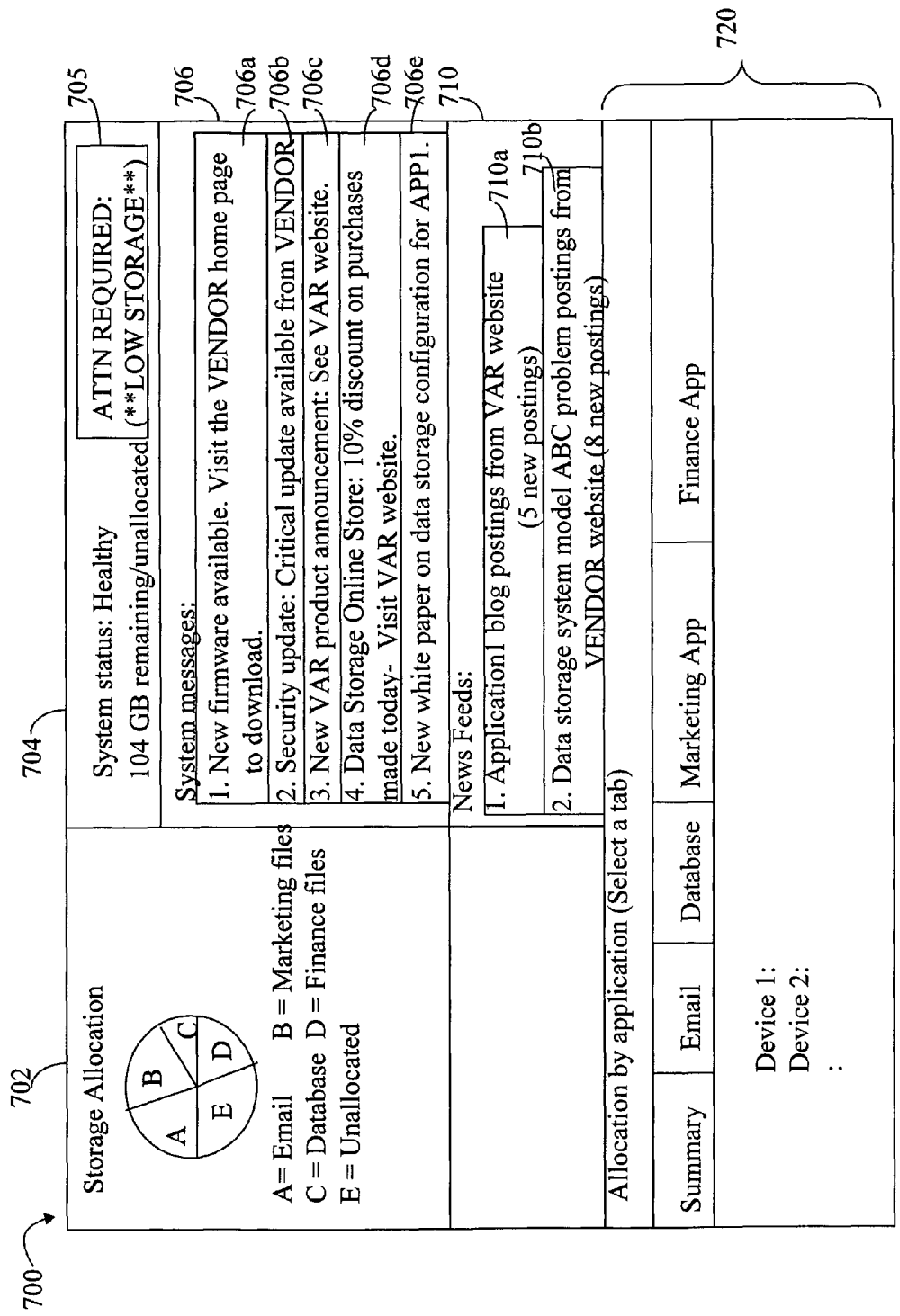
FIG. 9 is an example of a screenshot that may be displayed for use with the active element manager.

Referring to FIG. 9, shown is an example of a screenshot that may be displayed on a web browser when a user is connected to the AEM of the data storage system. Area 702 may illustrate the current storage allocation in a graphical display for the different applications having their data hosted on the data storage system. Area 704 may include a first portion of notifications or system messages. The area 704 may include an overall system status indicator (e.g., healthy), amount of remaining/unallocated storage and other system notifications requiring attention. In this example, area 704 includes a notification 705 that the amount of available storage is low and requires attention. Selection of 705 may result in the AEM connecting to a target location in an external environment, such as at a partner or vendor website, to assist in connection with the low storage notification. The notifications in area 704 may relate to the data storage system. Area 706 may include other system messages or notifications using information provided by the vendor and/or partner website. Some of the information included in 706 may be selected in accordance with the user's profile and provided to the AEM so that it is included for display such as in the example 700. In this example, the area 706 includes five (5) notifications. Each notification 706a-706e may include a hyperlink which, when selected, connects the user to a target location in an external environment, such as a webpage at the partner and/or vendor website. Element 706a is a notification regarding new firmware available at the VENDOR homepage. Selection of 706a may connect the AEM to the VENDOR homepage or location at the VENDOR website. Element 706b is a notification regarding a critical security update available from the VENDOR. Selection of 706b may connect the AEM to the VENDOR homepage or location on the VENDOR website where information about the update is available and the update may be available for download from the VENDOR website. Element 706c is a notification regarding a new VAR product. Selection of 706c may connect the AEM to a location on the VAR website which may describe the new VAR product and/or provide the VAR product for download if the VAR product is a software product. If the VAR product is a hardware product, selection of 706c may connect the AEM to an online store location at the VAR website where the user may purchase the new VAR product. Element 706d is a notice regarding a sale of data storage systems and/or devices through the VAR's online store. Selection of 706d may connect the AEM to a location at the VAR's online store where the products on sale may be purchased. Element 706e includes a notification regarding a new electronic publication regarding APP1, an application that may be hosting its data on the data storage system. Selection of 706e may connect the AEM to a location at a partner or vendor website from which the paper may be downloaded, purchased, and the like.

Included in area 710 are various messages that may be displayed when a particular user logs into the AEM. The information included in 710 may be customized and vary with the particular user. Notifications in area 710 may be provided from the vendor and/or partner website as described in connection with area 706. The area 710 may include new or additional postings in connection with various virtual user communities, such as blogs or user forums, that a user may belong to. In this example, element 710a indicates 5 new postings to a blog on Application 1 at the VAR website. The user currently logged into the AEM may participate in this blog at the VAR website and may have signed up to receive notification in connection with any new postings. Selection of 710a may connect the AEM to the location at the VAR website where the new postings can be found for the blog. Element 710b indicates that there are 8 new postings at the VENDOR website regarding a particular data storage system model. Selection of 710b may connect the AEM to the location at the VENDOR website for the indicated 8 new postings.

Area 720 may include a display of information used in connection with allocating storage for a particular application.

In one embodiment, the elements 705, 706a-e, and 710a-710b may be UI indicators having associated hyperlinks which, when selected, navigate to a target location in an external environment, such as an appropriate web page of a website in accordance with the selection. The web page may be located at a website such as the partner and/or vendor website. Additionally, the AEM may provide context information as described elsewhere herein to the target location. Examples of the types of data that may be included in the context information are illustrated, for example, in FIGS. 6 and 7.

With reference to the display 700, a user may be logged in and performing a data storage management operation, such as provisioning data storage for use by one of the applications using the interface area 720. In response to allocating additional storage for use by the application, the message or indicator 705 may appear on the display indicating low storage. In other words, the last operation of provisioning data storage for use by the application caused the amount of available or free storage to fall below some predefined threshold. By selecting 705, the AEM may be used to provide a connection between the current data storage management session, such as in connection with provisioning data storage for use by an application, and an external environment, such as another website, which may provide additional information, customer support, purchase of additional storage, and the like, related to the low storage condition or state of the data storage system. Additionally, the AEM may automatically collect and transmit to the target location context information regarding the current state of the data storage system including, for example, the amount of currently available free storage on the data storage system, the error message status code indicating the low storage condition indicated by 705, the current devices and associated storage capacities currently included in the data storage system, and the like.

In connection with the foregoing or other selection of a UI indicator from the display 700, another browser window may be opened and the AEM may provide for navigation to the external website including the appropriate page of the website for the blog, knowledge base/database, or other source of information for the selected UI indicator. As another example, if the UI indicator provides a connection to a database for information about a particular problem, selection of the UI indicator may navigate to the appropriate external website location, supply query terms to the database and query the database. The results of the query may be displayed to the user in a browser window.

As yet another example, selection of a UI indicator in 700 for a problem or error may connect the AEM to a chat room at a partner or vendor website where the user logged into the AEM may interact directly with a customer service representative or agent to schedule service, provide interactive customer assistance, and the like. The context information may be provided by the AEM to the agent at the partner or vendor website so the agent can examine the current context of the data storage system. This may assist the agent in diagnosing a problem and providing recommendations for solutions to the problem. Additionally, the agent may utilize the user profile information stored on the partner and/or vendor website in connection with providing additional context information about the user. In one embodiment, the context information transmitted by the AEM to the agent may include the user identifier. The agent may access the records from the user profile information for the user identifier. In this manner, the agent may be able to examine any existing problem histories and solutions to see, for example, what solutions for the same problem did/did not work previously for the same or similar problem. Using context information provided from the AEM, the agent may be able to detect the version of software on the data storage system and the particular problem the user encountered.

The error may be related to a correction included in a later version of the software so the agent may recommend that the user install the updated software including the correction or patch. If a problem is recurring, the agent may recommend replacing a hardware component, providing a particular service for the component, and the like.

In the foregoing examples, the customer logged into the AEM does not have to provide the context information that may be useful to the customer service representative in problem analysis, service scheduling, providing recommended actions/next steps, and the like. Such context information is automatically collected and transmitted to the selected target location in the external environment.

With reference to the example 700 of FIG. 9, selection of the UI indicator 705 indicating low storage may result in opening another browser window and a connection is made to the VAR website resulting in display of a web page of the VAR website as illustrated in FIG. 10.

Referring to FIG. 10, shown is a screenshot that may be displayed as result of selecting 705 from the example 700. The example 800 represents information that may be displayed for a VAR website page. Area 802 indicates that the displayed information is in connection with support web page at website for VAR XYZ. Area 804 includes information related to the low storage indicator 705 in that the data storage system whose context information was transmitted to the VAR website is running low on storage. Selection of the word "HERE" from area 804 may result in additional information being displayed regarding the error condition. The message displayed in 804 may be customized, for example, in connection with the status or error code provided in the context information from the AEM. On the web page 800, the user may select an operation to be performed in accordance with the context information pushed from the AEM to the VAR website. The user may select to purchase additional storage from the VENDOR or VAR online store via selection of the appropriate UI indicator in 806. Selection of one of the indicators of 806 may navigate the user to one of the indicated online stores. Additionally, the context information as supplied by the AEM may also be used to populate the display with data storage products compatible with the current data storage configuration of the user's data storage system as indicated in the context information and/or user profile data.

The user may select 820 to navigate to a location on the VAR website providing live online/interactive support with a support agent. Selection of 820 provides for automatic connection to a subsequent web page and also propagates the context information to the support agent. As an alternative to online interactive support, the user may select 822 to have a support agent call the user back on the telephone. Selection of 822 may result in the context information being transmitted to a support agent and accessing contact information for the user from the user profile. The agent may then use the contact information to call back the user.

Selection of 824 may result in navigation to a web page where the latest VAR software updates are available.

Selection of 808 may result in navigation to a user community. The user community selected and displayed in 808 may be in accordance with the context information and/or user profile. The user may be a registered or active member of the user community as indicated in the user's profile data. If the user is not a member, the user community indicated in 808 may be selected based on the vendor and application indicated in the context information provided by the AEM. The user community may be used to provide insights from other users, for example, using the same vendor's data storage system for the same application. Another user may be able to make a recommendation regarding what next steps may be appropriate based on similar experiences, errors, and the like.

Selection of 810 may result in automatic navigation to a web page including databases that may be provide additional information about the low storage condition or state indicated in 804. Selection of 810 may result in navigation to a page of resources from which the user may make a further selection. The sources of information may include a database of frequently asked questions (FAQs) about the VENDOR and/or VAR products, a knowledge base which is a technical support database, and a database of solutions to common questions and problems. Query terms may be automatically provided in accordance with the context information transmitted from the AEM, such as query terms in connection with the status of low available storage. It should be noted that information included in 810 may also be a portion of information associated with one or more virtual user communities. Alternatively, the information included in 810 may not be associated with any virtual community but may rather be generally available data sources on a website provided by a vendor and/or partner.

In connection with the foregoing the AEM automatically selects and navigates to a location based on current context information indicating the state of the data storage system at the time the AEM is connecting to the external environment and target location. The AEM automatically communicates the context information from the data storage system to the VAR website, or other external environment, so that the context information may be used in connection with subsequent user interactions.

Figure 10A:
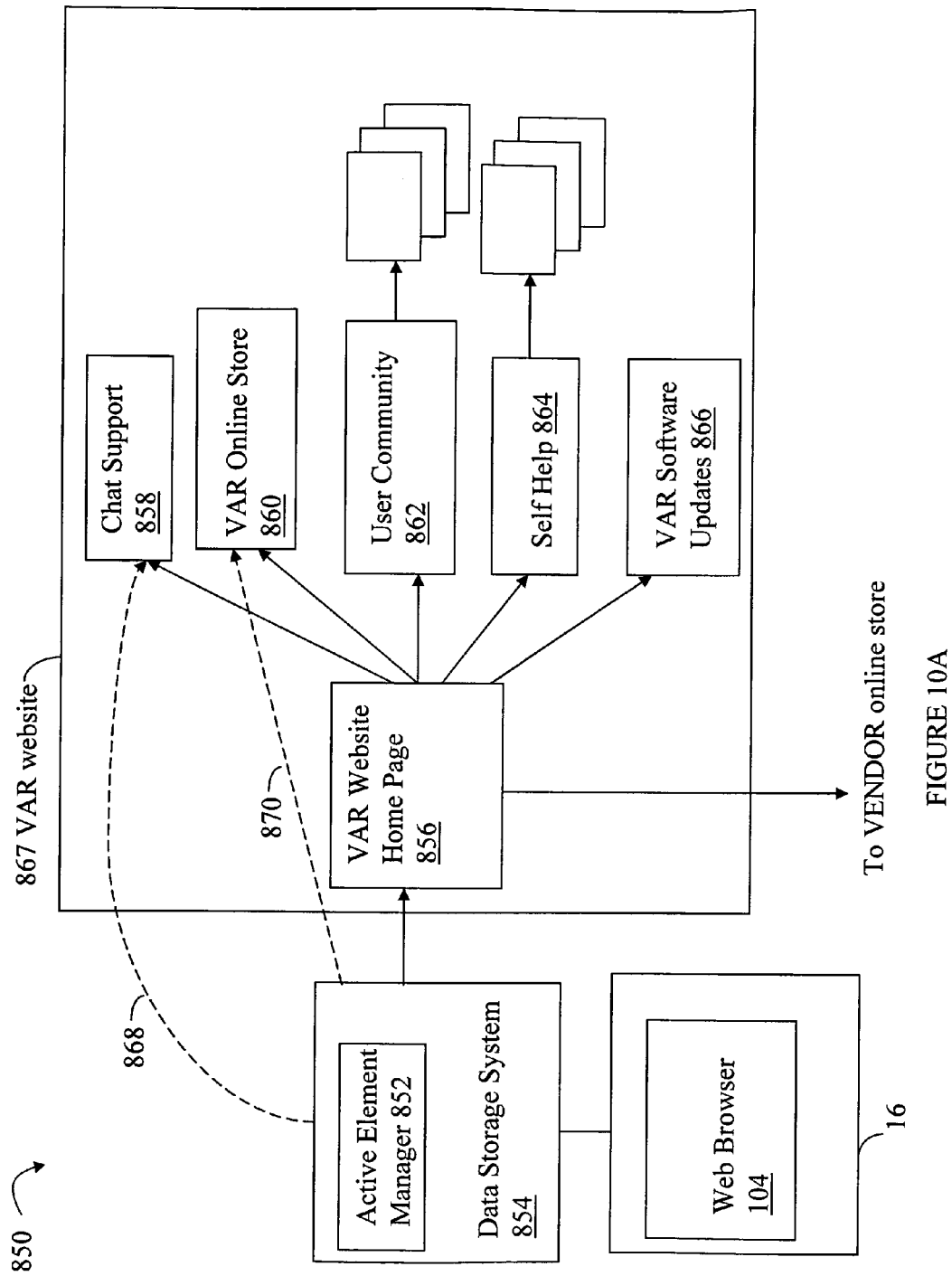
FIG. 10A is an example illustrating navigation from the data storage system to various web pages at external websites.

Referring to FIG. 10A, shown is an example illustrating the various connections and information flow from the data storage system including the AEM. In other words, the example 850 illustrates the various launch or connection points that can be made from the AEM and the customer's data storage system 854. The example 850 illustrates the connections made in accordance with a VAR web site and web pages as described in connection with FIG. 10. Selection of the UI indicator 705 results in a connection to the main or home web page 856 of the VAR website. From this main page 856, a user may make another selection navigating to a different web page for the VAR website 867. For example, selection of one of the links from area 806 of FIG. 10 results in navigation to one of the VAR online store 860 or the VENDOR online store. Selection of 820 from FIG. 10 results in navigation to chat support web page 858. Selection of 808 from FIG. 10 results in navigation to a user community web page 862, which may be further connected to one or more other web pages that a user may traverse. Selection of 810 from FIG. 10 results in navigation to a self help web page 864 which may be further connected to one or more other web pages that a user may traverse for the different sources of self help. Selection of 824 from FIG. 10 results in navigation to a VAR software updates page 866.

In the example described in connection with FIGS. 9 and 10, selection of 705 from FIG. 9 may result in navigation to the main or home web page of the VAR 856 of FIG. 10A. However, rather than have selection of 705 result in a connection to 856, the AEM may be configured by the partner, such as the VAR, which supplied the data storage system 854 to connect directly to chat support 858 (as illustrated by connection 868), or connect directly to the VAR online store (as illustrated by connection 870) where the user may be presented with relevant data storage devices that can be purchased in accordance with the current data storage system configuration of 854 as indicated in the supplied context information and/or user profile information.

Figure 10B:
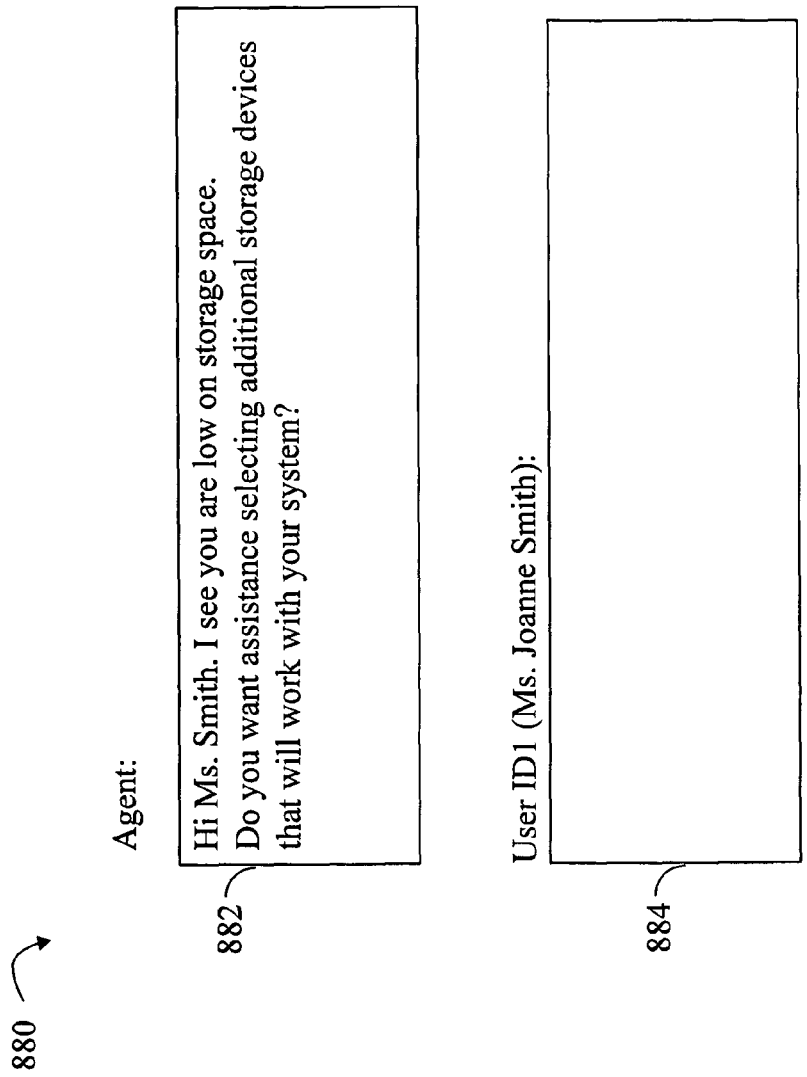
FIG. 10B is an example of a display for use in connection with interactive customer support.

Referring to FIG. 10B, shown is an example of a screenshot as may be displayed to the user logged on to the AEM in response to selecting 820 of FIG. 10, or otherwise configuring the AEM to directly connect to the chat support location 858 of FIG. 10A. The example 880 includes a dialogue box 882 for the agent. The agent may personalize the dialogue for the particular user by accessing information about the user in the user profile in accordance with the user identifier communicated in the context information supplied by the AEM. In this example, the user ID1 may have corresponding user profile information including contact information for Ms. Joanne Smith. The agent may inquire in 882 whether the user is connecting to the chat support for assistance with the current state and message regarding low available storage on the data storage system. The foregoing may be accomplished using the context information indicating the low storage state to the agent. The user may interact with the agent by inputting data in the dialogue box 884.

With reference to FIG. 10A, in one embodiment, the AEM may be configured to connect to the home or main page 856 for certain types of error or status conditions. For errors of a particular type or severity level, or recurring errors, the user may be directly connected to the chat support page. The AEM may make a determination to conditionally connect the user to one of a variety of different locations based on context information collected by the AEM on the data storage information. The AEM may examine the current error or status code (e.g., 506 of FIG. 6) indicating a state of the data storage system and connect to one of multiple locations depending on the error code and/or severity. The context information provided by the AEM may include a recent history of status codes, for example, status codes for the last n operations performed by the user within a time period that resulted in an error, status codes associated with the last n times that the user requested connection to the VAR website, and the like. If the user has experienced the same error within a defined time period, the AEM may connect the user directly with chat support.

As described herein, regardless of the target location in the external environment to which the AEM connects, the AEM automatically collects and provides context information when communicating with the target location. As also described herein, providing the context information from the customer's data storage system including the AEM to the target location is only one way in which information can flow. Communication between the customer's data storage system and the external environment including the target location is bi-directional so that information may also be pushed from the target location to the data storage system. Information from external environments, such as the partner and/or vendor websites, may be provided to the AEM automatically or as part of the interactive dialogues. The information from the partner and/or vendor websites may be provided automatically resulting in notifications to a user when the user logs onto the AEM. Examples of such notifications are described above, for example in connection with the information used to populate sections 706 and 710 of FIG. 9.

Information can be pushed to the AEM from a partner website and/or vendor website, directly or indirectly. Such information may include user-relevant information. Examples may include a new VAR service that is available, a recently discovered problem or security update that a user may want to know about, and the like. The information pushed to the AEM may be user-relevant information determined in accordance with the user profile data. The user profile data may be collected based on user interactions at the vendor and/or partner websites, data included in context information transmitted from various interactions with the AEM, data initially provided when the user makes a first purchase or acquires a first license with the partner or vendor. The user profile may include context-related history information for each user. Based on a user's profile, relevant information may be selected from the vendor and/or partner websites and the user may be provided notifications or alerts regarding the existence of the relevant information. For example, a user may perform operations on the vendor and/or partner website related to provisioning data storage system for an application. Subsequently, as new relevant information about provisioning data storage for the application on the vendor's data storage system becomes available, the user may be notified by pushing relevant notifications to the AEM which are presented to the user when the user logs into the AEM. For example, there may be new offerings regarding services, training, versions or updates of software for use with the particular application, online publications on the application or usage of features, known or serious problems related to the application, and the like. When such information becomes available on the vendor and/or partner website, the information relevant for the particular user may be pushed to the AEM. Thus, in accordance with one aspect of the techniques herein, targeted or selected information may be provided to the AEM which is customized for the particular users based on a previous history of user information as may be included in the user profile information for the users. The selection of information pushed to the AEM may be based on previously observed patterns of usage at the vendor and/or partner website and previous context information provided by the AEM.

In one embodiment, RSS technology may be used to provide information to the AEM from the one or more external websites or other environments. For example, RSS technology may be used to supply news, new product updates, new services, critical support information, and the like, as illustrated in providing notifications of 706 and 710 of FIG. 9. RSS may be characterized as a family of web feeds used to publish frequently updated contents such as blogs and news feeds. An RSS document may include summary or full text information from the website providing the content, such as the website hosting the blog, news service, and the like. A feed reader or aggregator program may be included in the data storage system or the management system (16 of FIG. 1) which receives published information from the content provider. The feed reader may then obtain the updated information from the one or more content providers, for example, by periodically polling the content providers for any new content. As an example, a user may register with a user community on a VAR website. In connection with the registration, the user may select to receive information on new postings in an online user forum or blog, new electronic paper publications, and the like. When the user logs into AEM, the user may receive notifications regarding the new postings in the blog and new electronic paper publications. Using an RSS-based implementation, a web feed, such as in the form of an XML document, may be transmitted from the VAR to the data storage system including the AEM. The web feed document may include hyperlinks to the full content of the paper, blog entries, and the like, on the VAR website. The hyperlinks may be initially displayed such as in areas 706 and 710 of FIG. 9 and used to provide connection to the complete content when a user makes a selection from the notification displayed.

The techniques herein of the bidirectional information flow between the data storage system and one or more external environments may be used to facilitate and enrich the customer's experience using the data storage system by automatically connecting to the one or more external environments in connection with various operations and tasks, such as when an error occurs on the data storage system when the user is performing data storage administration tasks. The AEM may be used to automatically connect to the appropriate target location based on the current context of the data storage system, such as the particular error experienced or other status of the data storage system. The AEM may automatically provide context information describing the current context of the data storage system to the external environment and target location therein to which the AEM connects. Additional context-related information as may be included in user profile information for the particular user may also be utilized by the external environment, such as website of the partner and/or vendor. The techniques herein may be used in connection with facilitating support operations, such as by providing context information and automatic connection to chat or interactive support, relevant knowledge or data bases and relevant online or virtual user communities. In connection with providing support for vendor and/or partner products and services, various alerts or notifications may be provided to the AEM regarding new service and training offerings, product updates or upgrades, relevant technical tips, new postings in user communities, security alerts or problems as well as relevant solutions (e.g., patches), electronic paper publications, and the like. The techniques herein may also be used to facilitate electronic commerce transactions. For example, in connection with resource consumption alerts, such as the low amount of available storage alert included in 705 of FIG. 9, the user may be connected to one or more appropriate target locations, such as customer support or the vendor or partner online store, to facilitate the purchase of additional data storage. A user may also be notified regarding relevant upgrades, new products, new services and other offerings as may be available for purchase in connection with facilitating electronic commerce. Such notifications may be selected in accordance with the user profile information and pushed to the AEM for display, for example as illustrated in area 706 of FIG. 9, when the user logs into the AEM.

What will now be described in more detail is utilizing the techniques herein of the bidirectional flow of information from the customer data storage system to external environments in connection with virtual user communities. This is described in some detail above as one aspect of providing user support. The AEM captures context information about the data storage system and current user and provides this context information to an external environment, such as a vendor or partner website, hosting a user community. The techniques herein may be used in providing a bidirectional flow of information between the external environments hosting the user communities and the data storage system including the AEM that is customized for the particular user. As an example, a user community may exist on a partner or vendor website for customers provisioning data storage for a Microsoft® Exchange server. The user community may include blogs, FAQs, knowledge bases, solutions, electronically published papers, and the like as described elsewhere herein relevant to provisioning data storage for this particular email application server. Different users may be ranked within the user communities based on a favorable number or postings. The foregoing and other activities may be made available to a user on the data storage system and facilitated using the techniques herein with the AEM.

Figure 11:
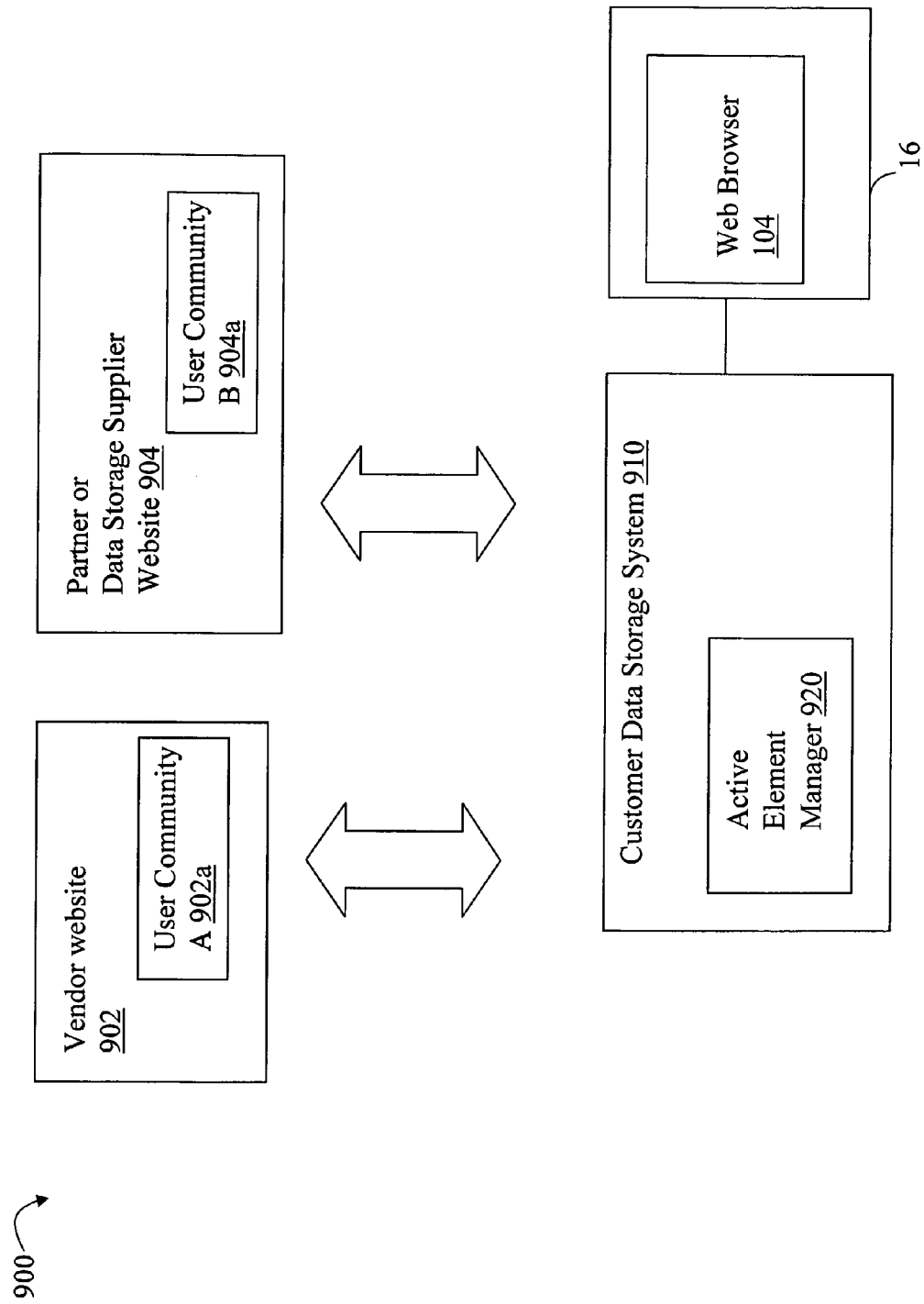
FIGS. 11 and 12 are examples of data flow in connection with the data storage system and navigation to virtual user communities at websites.

Referring to FIG. 11, shown is an example of the data flow that may occur between the customer data storage system 910 and the vendor and/or partner websites. The data flow of FIG. 11 is similar to that as generally described in connection with FIG. 5. The example 900 illustrates the flow of information with respect to the user communities that may be hosted on the websites 902 and 904 in that the user logged into the AEM on the system 910 may communicate directly with user communities on the vendor website 902 and/or the partner website 904. The AEM 920 may be used to automatically launch and provide a connection to a user community 902*a* or 904*a*. The AEM 920 may provide the context information as described elsewhere herein in connection with user interactions with the user communities. The context information provided when connecting with the user communities may include, for example, a user identifier for the current AEM user, license information, data storage configuration information, recently viewed or selected items (e.g., based on recent user community activity, items selected in accordance with notifications provided as illustrated in 706 and 710 of FIG. 9), applications which are currently hosting storage on the data storage system to indicate how the storage is being used to direct user to potentially relevant user communities (e.g., how to configure storage for use with a particular email application, database application), and the like.

Figure 12:
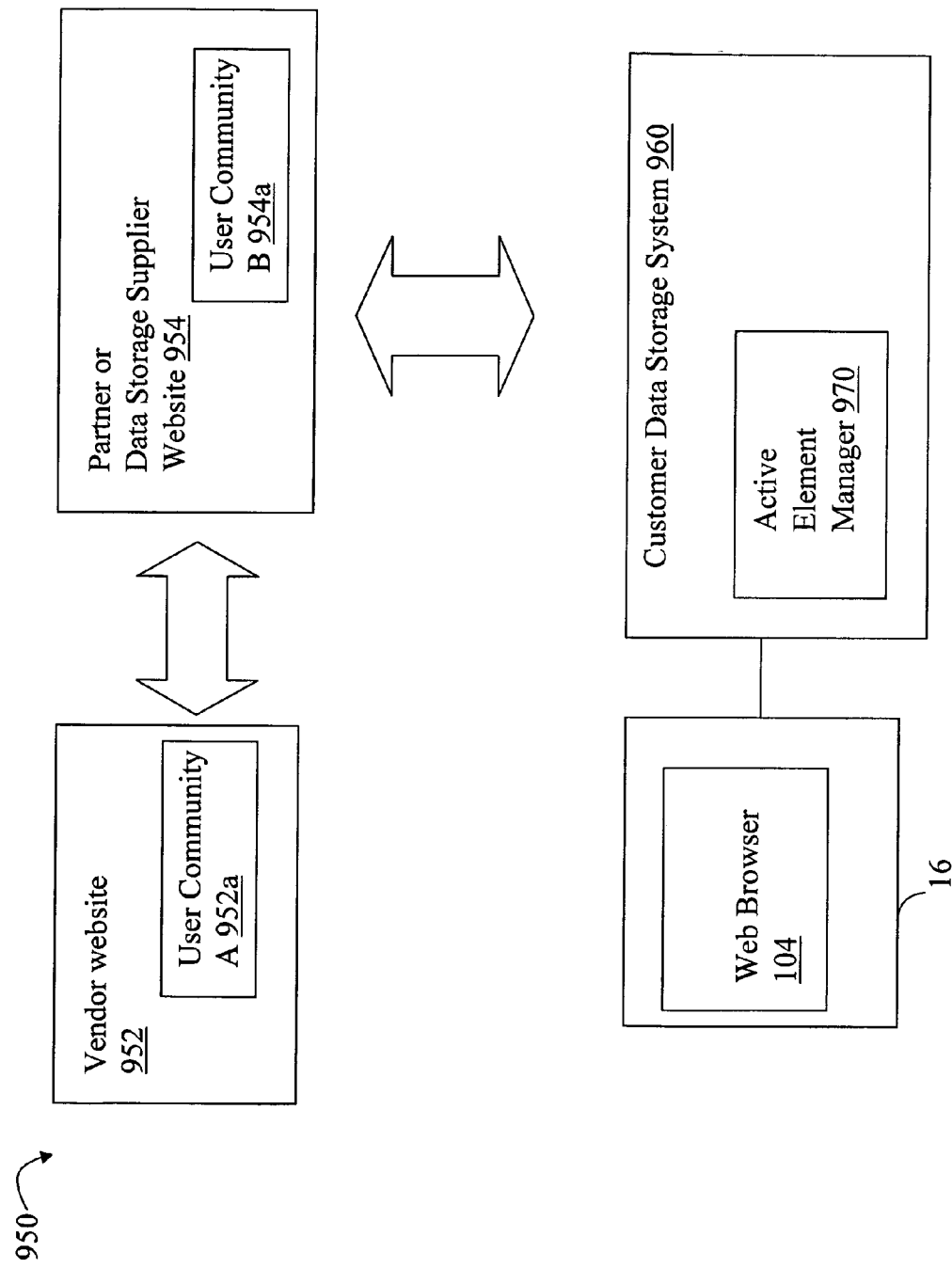

Referring to FIG. 12, shown is an example of the data flow that may occur between the customer data storage system 960 and the vendor and/or partner websites. The data flow of FIG. 12 is similar to that as generally described in connection with FIG. 4 in which the data storage system 960 may communicate with partner website 954. In turn, the partner website may be used to facilitate communications with a user community located on the vendor website 952. The foregoing illustrates how the user may be indirectly connected to a user community 952*a* through the partner website 954.

In connection with the bidirectional data flow described herein, the AEM may be used to provide information from user communities to the user and to allow a user to interact with the user communities. The user may interact with the AEM as the active launching point and communication point between the data storage system and the user communities hosted in the vendor and/or partner websites, and information related to the particular user and user community may be communicated using the bidirectional communication path as described herein.

As illustrated in connection with FIG. 9 described above, a user may received selected or targeted information from user communities of interest to the user. The particular user communities of interest to the user may include those which the user has expressly indicated as being interested such as through user community registration or participation. Particular user communities that may be of interest may be determined indirectly or inferred, for example, using context information (e.g., application information 508 of FIG. 6), by observing user interactions and web surfing activities at the vendor and/or partner website (e.g., as may be recorded in the user profile information for the user), and the like. The information regarding user communities of interest may be in the form of alerts or notifications as included in 706 and/or 710 of FIG. 9. For example, a user may log onto the AEM and receive a message or UI notification that a new topic is posted in user forum X that the user is registered for, regarding commonly received errors or problems (e.g., when performing particular data storage management operations for an application) and associated corrections (e.g., manual correction or via a particular upgrade, software patch, etc.), or regarding how to obtain better performance for a particular application hosting data on a vendor's data storage system (e.g., by performing an operation at a low level such as 110 of FIG. 2 for a particular vendor's data storage system), and the like. If the user selects the displayed UI notification, the user may be automatically launched from the AEM and connected into the user community. The context information provided by the AEM may include any user authentication information needed to log into the user forum. Activities regarding the user's participation in the forum and other offerings of the user community may be monitored and data collected and stored in the user profile information for the user.

A user may also navigate directly into the user community from a web browser on another computer system without utilizing the AEM. In other words, the user may connect to the user community using the techniques herein with the AEM as well as without utilizing the AEM. In such instances where the user interacts with the user community without going through the AEM, activities of the user while logged into the user community may be monitored and additional data added to the user profile information as may be stored on the partner and/or vendor website.

Figure 13:
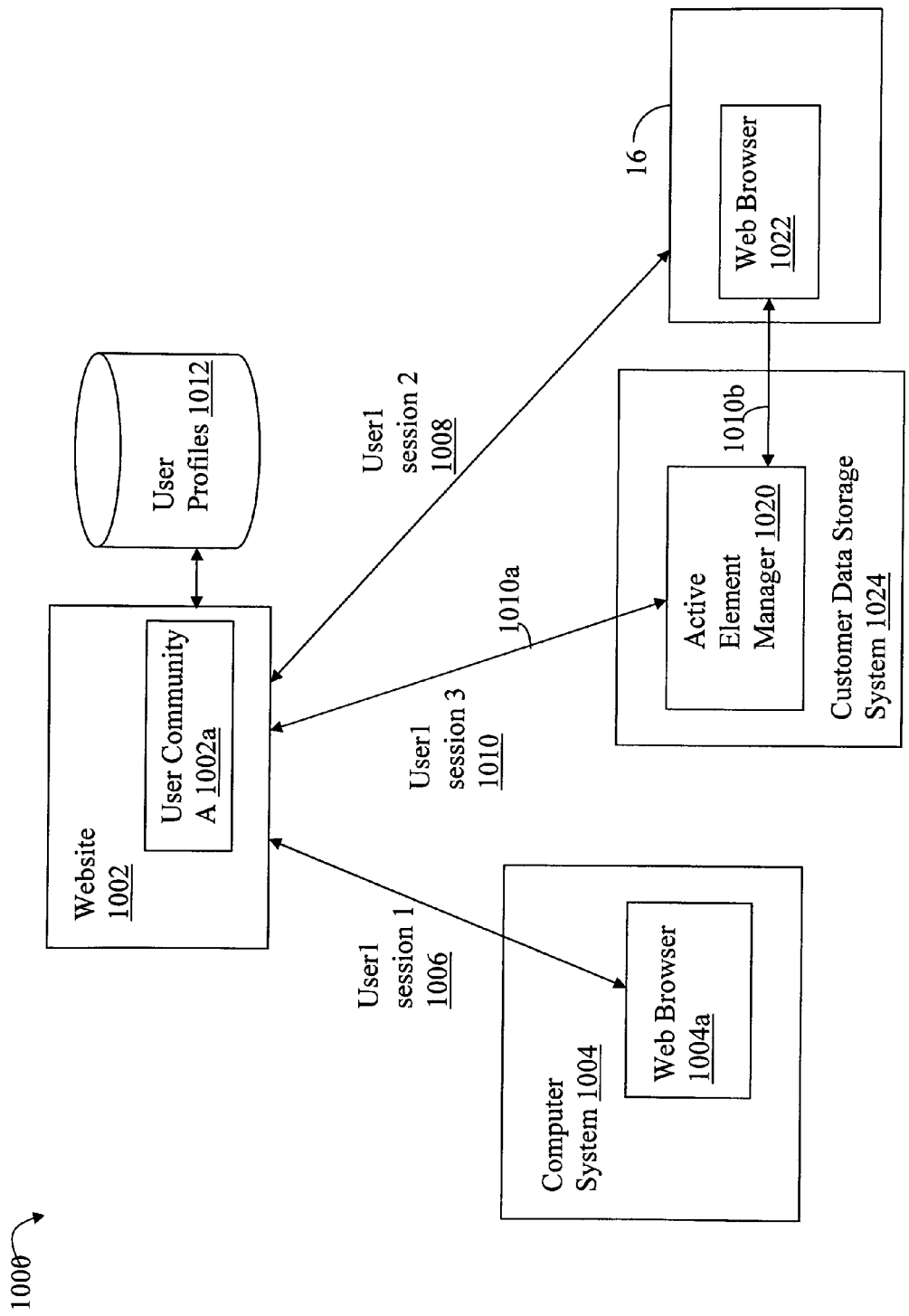
FIG. 13 is an example illustrating various sessions of user interaction with the user community.

Referring to FIG. 13, shown is an example illustrating the various ways in which a user may connect and interact with a user community. In the example 1000, a user, user1, may connect in a first session 1006 from a computer system 1004 via web browser 1004a to the user community 1002a of the website 1002. The website 1002 may be a partner or vendor website. User profile information 1012 may be recorded regarding the user 1's activities in community 1002a for the first session 1006. At a second point in time, user1 may connect to user community 1002a in second session 1008 directly from the management system 16 without going through the AEM 1020. User profile information 1012 may be recorded regarding the user 1's activities in community 1002a for the second session 1008. At a third point in time, the same user1 may connect to the user community 1002a in a third session 1010 utilizing the AEM 1020 of the data storage system 1024 and the web browser 1022. User profile information 1012 may be recorded regarding the user 1's activities in community 1002a for the third session 1010. As such, the user profile 1012 for the user1 may include aggregated information regarding the user community activity in all three session both with and without utilizing the AEM 1020. When the user connects to the user community 1002a through the AEM, authentication information allowing user access to the website 1002 and user community may be entered automatically on behalf of the user (e.g., stored on AEM and automatically supplied when accessing website 1002). When connecting from the computer system 1004 without using the AEM, the user may MANUALLY enter authentication information when accessing the website 1002. The website 1002 may store historical use information regarding user community activities independent of how a user connects to the website. When on the AEM, the user may navigate directly to the user community 1002a through links and UI indicators (e.g., in area 710 of FIG. 9). Using the techniques herein, a determination that a user community may be of interest to a user may be determined in accordance with one of more of the following types of information: context information provided by the AEM such as the application information 508 of FIG. 6, user activity on the partner and/or vendor website (e.g., website query, selection of particular electronic paper publications, etc.), and express registration in user communities. The first type of information may be used to provide a user with an initial list of what user communities may be of interest pushing relevant notification information to the AEM without the user ever having participated or registered for a user community. Once a user registers and/or participates in a user community, the user may be notified about new information related to the user community as it becomes available. The notifications may selectively notify the user of new information based on user community participation. For example, if a user selects an electronic paper for download, the user may be notified of related electronic publications, technical tips, new postings in relevant user forums, and the like. A user may explicitly sign up to receive notifications regarding new postings in selected blogs, user forums, and the like, as may be included in a user community. Alternatively, a user may receive such notifications based on information inferred from previous activities as recorded in the user profile and/or communicated in the context information from the AEM.

Figure 14:
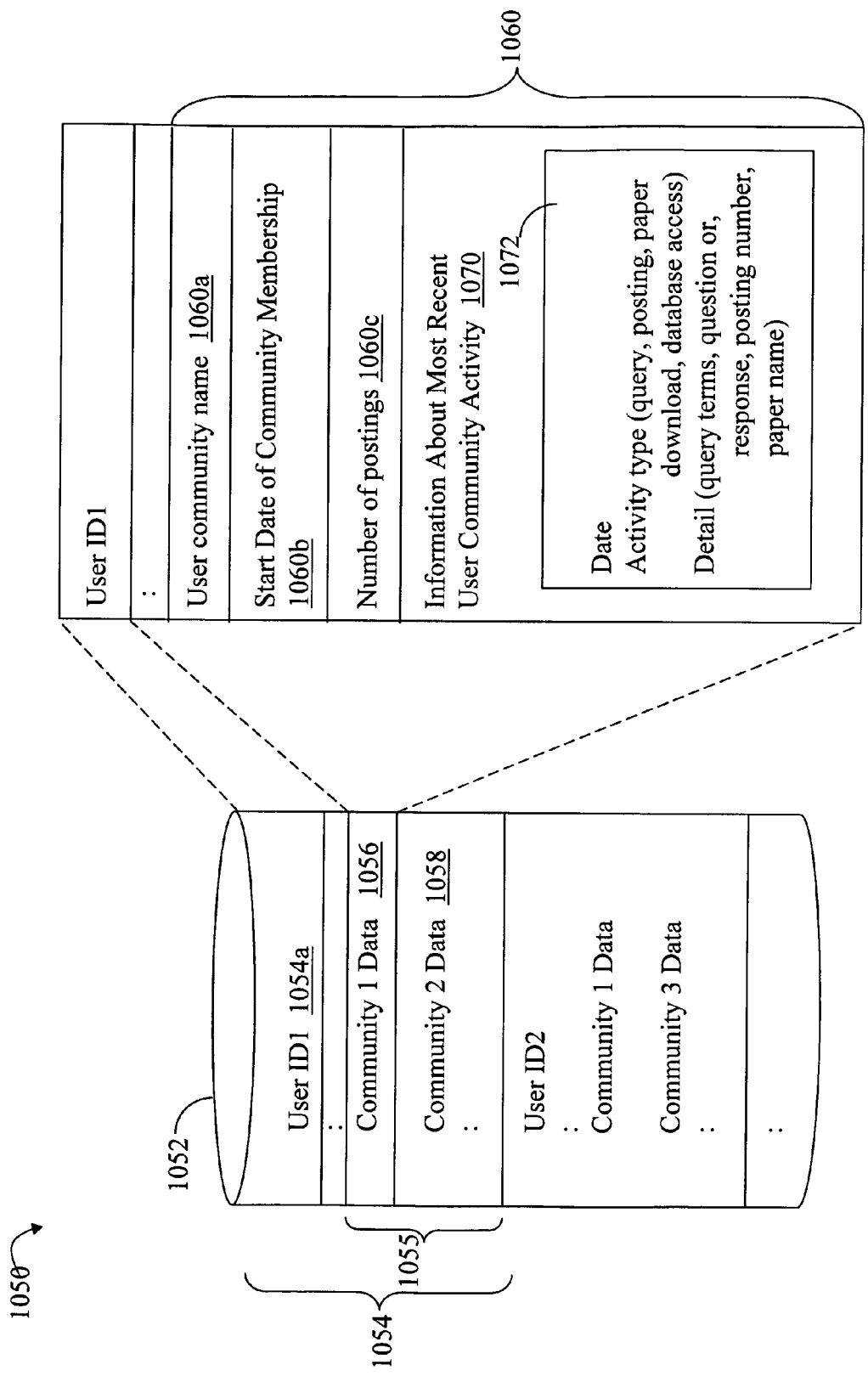
FIG. 14 is an example illustrating in more detail user community information.

Referring to FIG. 14, shown is an example of user community information as may be included in the user profile information. With reference to FIG. 7A, exemplary types of user profile information are illustrated including user community information 640. The example 1050 illustrates in more detail what may comprise the user community information 640 in one embodiment. The element 1052 may represent the user profile information for all users as may be stored on the partner website. The user profile information 1052 may include a portion 1054 of user profile information for each user. In this example, the element 1054 represents the user profile data for user ID1. The user community information for user ID1 is indicated by 1055. Data is recorded in 1055 for each community that user ID1 is registered for. In this example, user ID1 may be registered with two user communities 1056 and 1058. Element 1060 illustrates in more detail what may comprise the data recorded in the user profile for each user community data set 1056 and 1058. For each user community, the following may be recorded as indicated in 1060: user community name 1060a, start date of community membership 1060b, number of postings 1060c, and information regarding most recent user community activity 1070. Element 1070 may include a set of information 1072 for each user community activity recorded. The set of information 1072 may include the date, activity type, and details regarding the activity. The activity type may indicate whether the user activity was a query, posting, paper download, database access, such as to the FAQ or technical tips database. Details regarding the activity may vary depending on the activity and may include query terms, an indicator as to whether a posting was a question or response, a posting number in the blog or user forum, a name of a paper downloaded, and the like. The information included in 1060 may also include any ranking a user may have in the community, such as in connection with a number of correct or favorable responses entered by the user ID1. Such a ranking may be an indication regarding the technical proficiency of the user ID1. Information such as the technical proficiency may be used in connection with determining relevant information or notifications pushed by the website to the data storage system for presentation to the user when logged onto the AEM. For example, if the user is ranked as a novice user, one set of new electronic publications may be relevant. In contrast, if the user has a high level of proficiency, a different set of electronic publications may be relevant to the user. The user may be provided by the website with notifications regarding new user community information in accordance with the level of proficiency as well as other information included in the user profile. As another example, user ID1 may be ranked as a novice user based on user community participation. Based on the proficiency ranking and other activity information (e.g., query terms, previous white papers downloaded, and the like), the user ID1 may be provided with notifications regarding additional user community postings and newly acquired information to direct the user to the appropriate resources.

The AEM and bidirectional information flow may be used herein for user communities in which the information flow is customized for the particular user. The AEM may facilitate communications with the user communities located in external environments, such as vendor and/or partner website, in an automated fashion.

Figure 15:
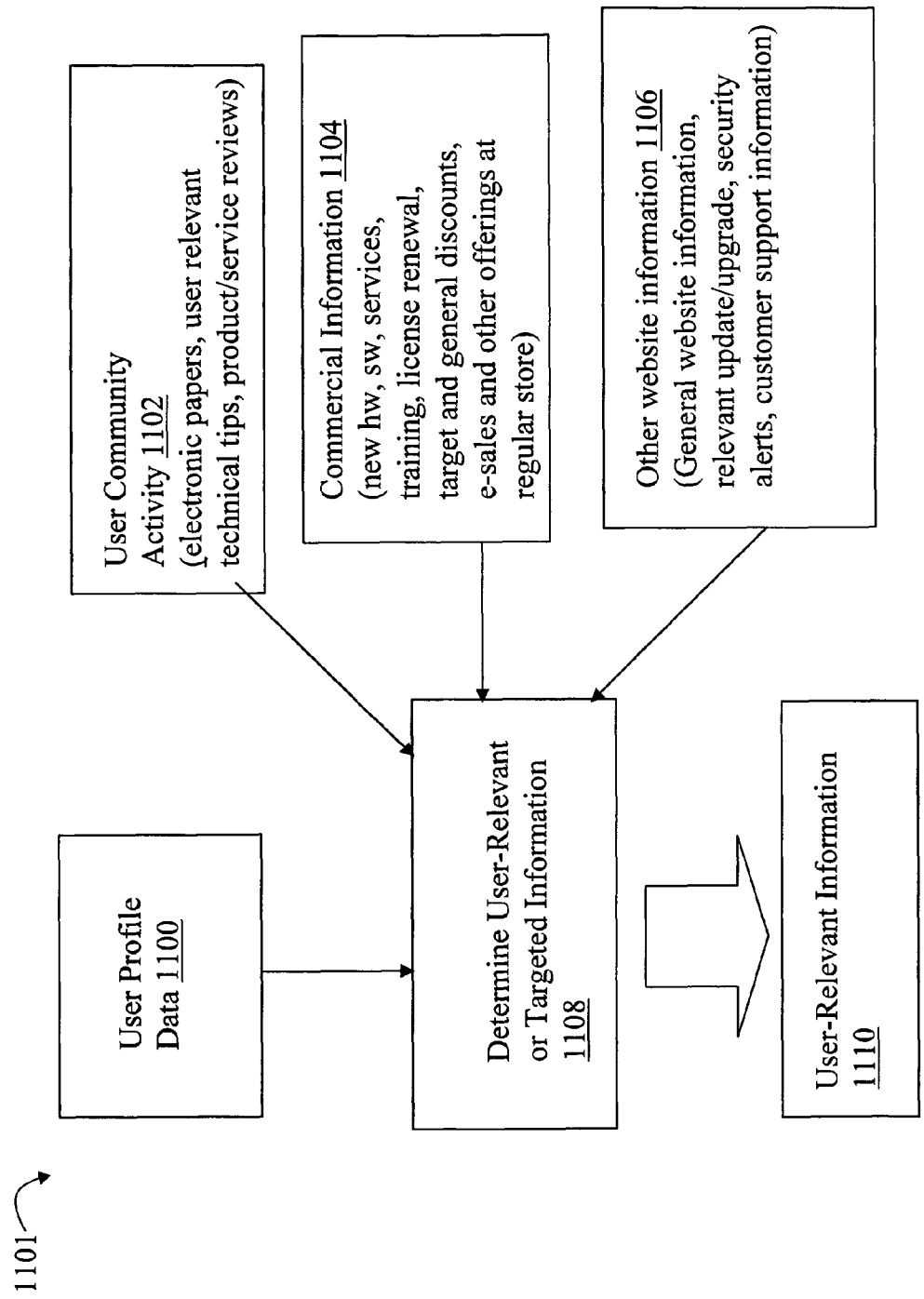
FIG. 15 is an example illustrating data flow processing performed to determine user-relevant information that may be transmitted from an external environment to the active element manager on the data storage system.

Referring to FIG. 15, shown is an example 1101 illustrating the data flow as may be used to determine user-relevant information 1110 pushed from the external environment, such as the vendor and/or partner website, to the customer's data storage system. The user profile data 1100 may be used in connection with selecting current information on the vendor and/or partner websites about which the user is notified via the AEM. The elements 1102, 1104 and 1106 may represent collectively or in the aggregate the different types of information that may be available regarding the vendor and/or partner website. The data in 1100 may be used to select relevant portions of 1102, 1104 and 1106 about which a user is notified. As described herein, the notifications may be pushed to the AEM and displayed to the user when logged into the AEM. The user community activity 1102 may include information about different user communities on the website (s) such as electronic papers, relevant technical tips, product/ service reviews, and the like. Commercial information 1104 may include new product and/or service offerings such as new hardware, software, services, training, license renewals, support contract renewal, support services such as telephone and interactive chat, upgrades available for purchase, targeted and general discounts on any of the foregoing, electronic sales offerings at an online or regular store, and the like. Other website information 1106 may include general website information such as the different categories of information as described in FIG. 8, relevant update/upgrade information, security alerts, alerts regarding new problems and/or solutions of a general nature, and the like. Processing may be performed as indicated by 1108 to select relevant portions of 1102, 1104 and 1106 in accordance with the user profile data 1100 about which the user is notified. The user-relevant information 1110 may represent the selected relevant portions from 1102, 1104 and 1106.

Figure 16:
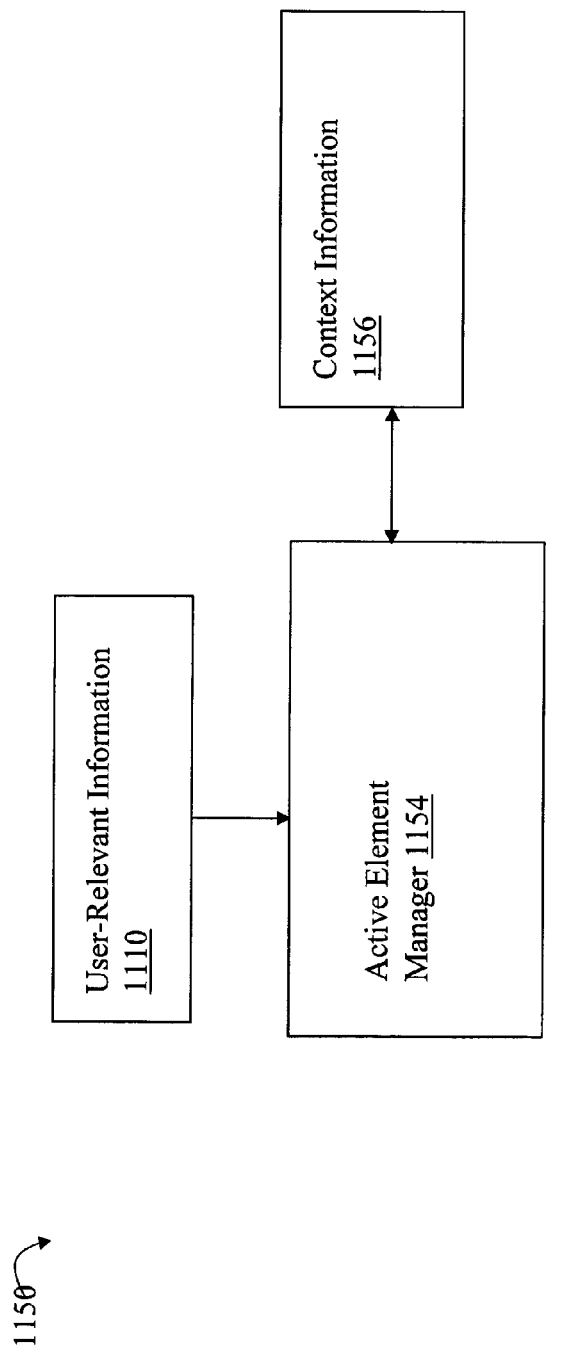
FIG. 16 is an example illustrating data flow in connection with the user-relevant information used by the active element manager.

Referring to FIG. 16, shown is an example of how the user-relevant information pushed to the AEM may be used by the AEM. In the example 1150, the user relevant information 1110 may be read by the AEM 1154 to provide notifications to the user as described elsewhere herein (e.g., as illustrated in FIG. 9). In connection with operations and activities on the data storage system including the AEM 1154, the AEM may facilitate communications with external environments, such as partner and/or vendor websites, and provide relevant context information 1156.

Figure 17:
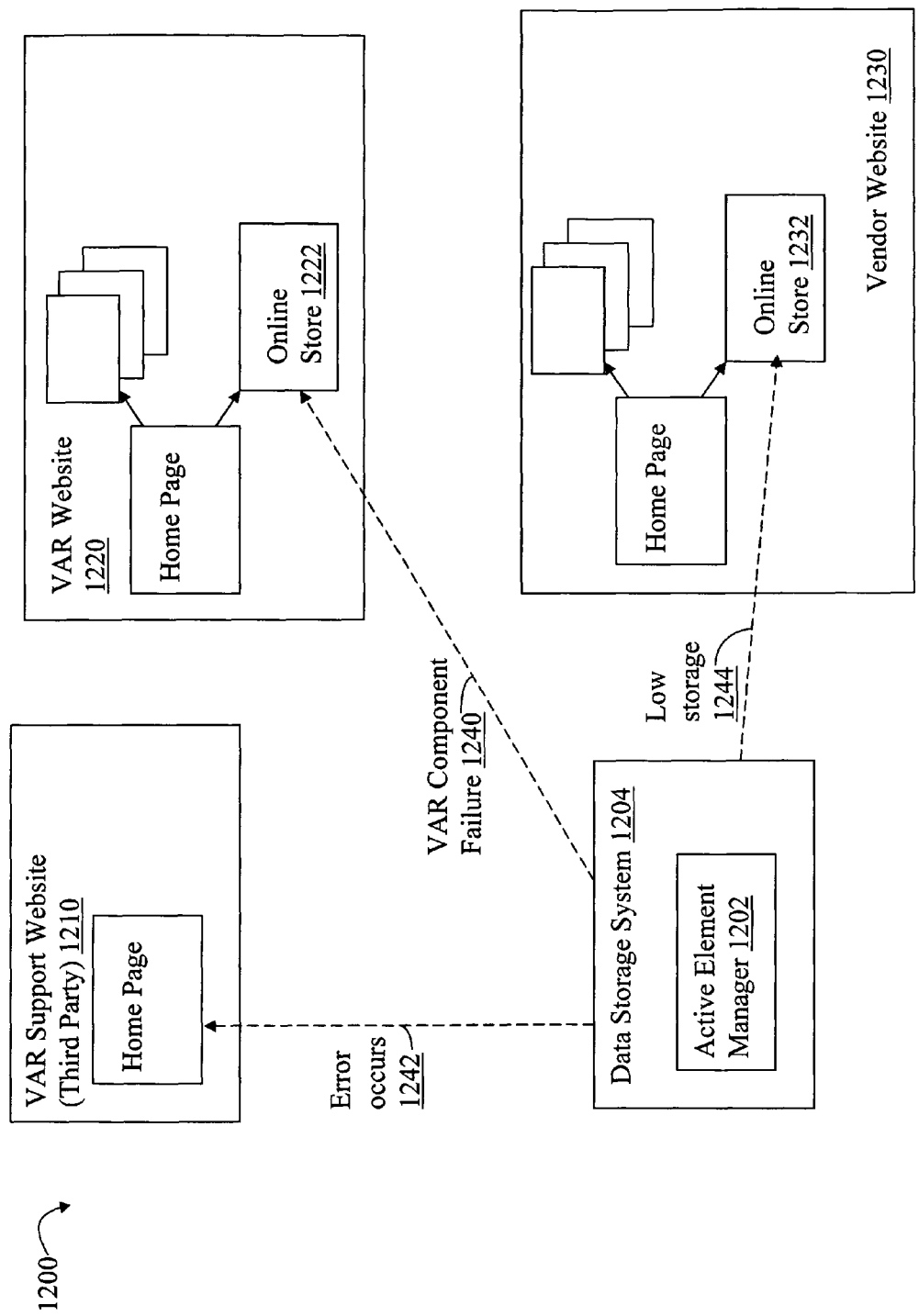
FIGS. 17 and 18 are examples illustrating how the active element manager may be configured to connect to different external environments.

Referring to FIG. 17, shown is an example illustrating how the AEM may be configured to connect to a variety of different locations in accordance with the context information of the data storage system and provide such context information to the target locations. In this example, the management system is omitted for simplicity of illustration. The example 1200 illustrates the data flow from the data storage system 1204 to various target locations although information may also flow from the target locations and their external environments to the data storage system as described elsewhere herein in connection with providing user-relevant information 1110 and subsequent user interactions.

In the example 1200, the AEM may be configured to connect to one of a variety of different target locations and environments depending on the current context information. This example illustrates the AEM connecting to different target locations in accordance with the error or status value, for example, as included in 506 of FIG. 6. It should be noted that this example illustrates a partner that is a VAR. Support related to VAR products and services may be provided online through website 1210. In this example, the VAR may contract with a third party to provide online support services for the VAR. If an error occurs on the data storage system related to VAR hardware and/or software products, the data storage system 1204 may display a UI indicator. Upon selection of the UI indicator, the user logged into the AEM of the data storage system 1204 may be connected to the website 1210 as indicated by 1242. If an error or status condition occurs the indicates a VAR component failure for selected components, such as power supply, the data storage system 1204 may display a UI indicator. Upon selection of the UI indicator, the user logged into the AEM of the data storage system 1204 may be connected to the VAR website 1220. In particular, the user logged into the AEM of the data storage system 1204 may be directly connected to the online store 1222 within the VAR website 1220. If a resource consumption alert occurs indicating low available storage as illustrated elsewhere herein, a UI indicator may be accordingly displayed. Upon selection of the UI indicator, the user logged into the AEM of the data storage system 1204 may be connected to the vendor website 1230. In particular, the user logged into the AEM of the data storage system 1204 may be directly connected to the online store 1232 within the vendor website 1230. The AEM 1202 may provide context information relevant for use by the target locations. The target locations may also utilize the user profile information as described herein for the user currently logged into the AEM 1202 for the particular data storage system 1204. For example, user profile information may indicate the previous data storage purchases in the past year. Such information may be used by the vendor website 1230, for example, in presenting or recommending particular storage devices to the user. If the user has been adding a lot of small capacity devices in the recent few months, this activity may be noted and the user may be presented with larger capacity storage device options along with a message indicating the recent purchase of small capacity devices which seems to have been utilized at a rapid rate. At the current rate of storage usage, the larger capacity devices, along with any discounts or deals, may be presented to the user.

The foregoing example 1200 illustrates how the techniques herein may be used to facilitate different types of transactions and operations ranging from electronic commerce to support.

Figure 18:
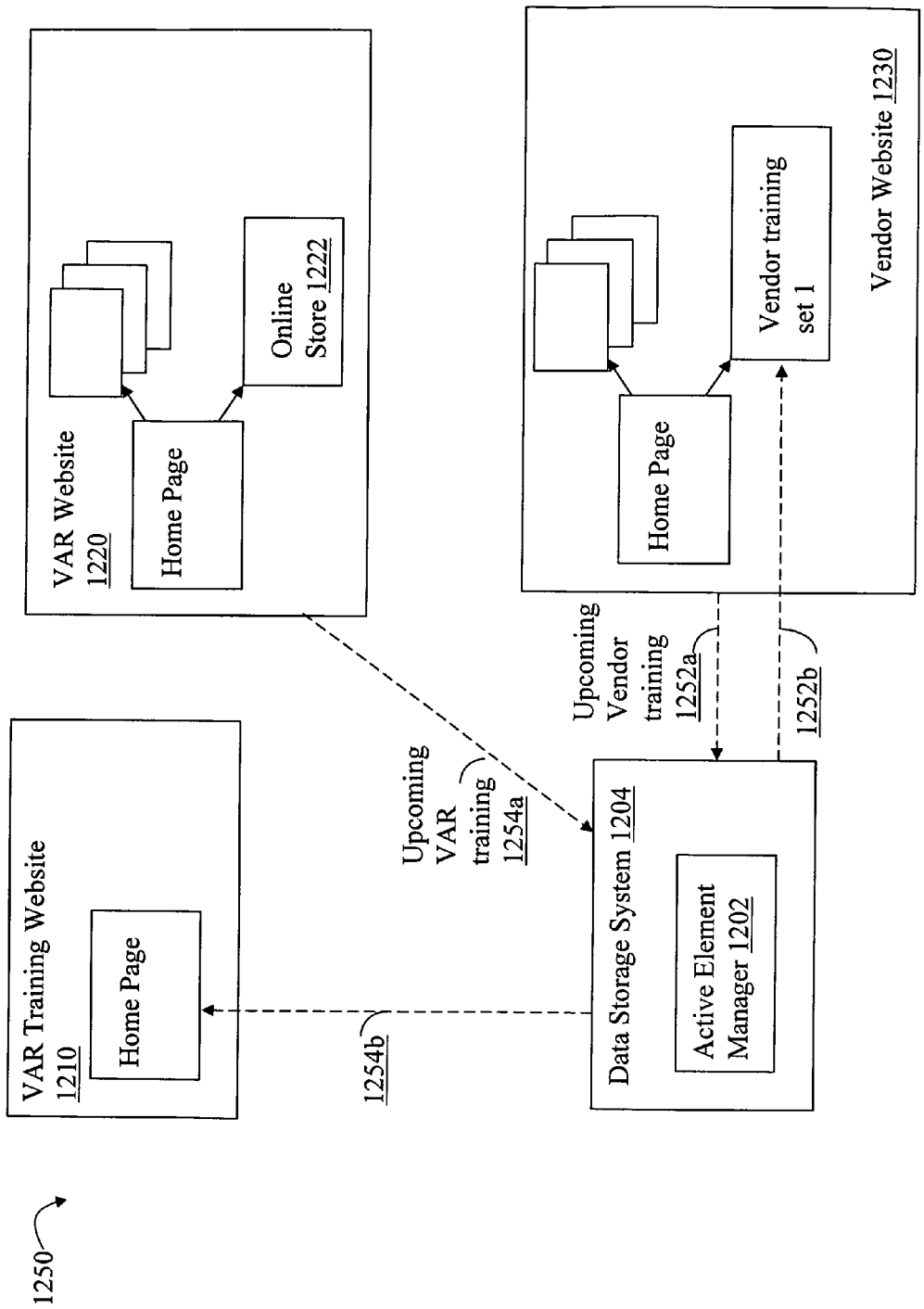

Referring to FIG. 18, shown is another example illustrating use of the techniques herein. In this example, the management system is omitted for simplicity of illustration. In the example 1250, user-relevant information may be pushed from the VAR website 1220 and vendor website 1230 to the data storage system 1204. The information pushed from the website 1220 may be represented by 1254a regarding upcoming relevant VAR training offerings. The user may be presented with notifications regarding the information of 1254a as illustrated in FIG. 9 with a UI indicator that may be selected. When selected, the UI indicator may provide a direct connection to the VAR training website 1210 as indicated by 1254b along with relevant context information.

The information pushed from the website 1230 may be represented by 1252a regarding upcoming relevant vendor training offerings. The user may be presented with notifications regarding the information of 1252a as illustrated in FIG. 9 with a UI indicator that may be selected. When selected, the UI indicator may provide a direct connection to the vendor website 1230 as indicated by 1252b along with relevant context information In one embodiment in connection with various training offerings as illustrated in FIG. 18, the context information pushed from the AEM to the websites 1210 and 1230 may include a user identifier of the AEM user, applications hosting data on the data storage system, error information (e.g., regarding the rate and/or types of errors received when performing particular data storage configuration or provisioning operations for an application), license information regarding licensed products to assist in directing a user to appropriate courses based on installed products, user community information to assist in directing a user to relevant training, and the like. The website receiving the context information may use one or more of the foregoing portions of context information and/or user profile information to provide relevant offerings for display to the user. When the AEM is facilitating connection to a website regarding relevant training, the context information provided may also omit one or more types of information. In connection with this and other operations, the context information may include relevant vendor-specific and/or partner-specific information. For example, the context information provided to one or more of the websites illustrated in FIG. 18 may include vendor-specific installed features or products. If the vendor-specific information is not relevant to the VAR training offerings, such information may be omitted from the context information provided to 1210 but included in the context information provided to 1230. Similarly, if VAR-specific product information regarding hardware and/or software licensed and/or installed on 1204 is relevant only for VAR training, then the VAR-specific information may be included in the context information provided by the AEM 1202 to 1210, but may not be included in the context information provided by the AEM 1202 to 1230.

As another example, the UI indicator regarding low storage previously described in connection with FIG. 17 may connect to one of the websites and provide a list of relevant training such as, for example, to learn how to add additional storage devices, modify a current configuration to obtain better performance as available storage capacity is consumed, and the like.

In connection with a state of the data storage system as may be indicated by context information, the techniques herein may be used to facilitate electronic commercial transactions. FIG. 17 illustrates one exemplary use for resource consumption alerts and FIG. 18 illustrates another exemplary use for additional offerings regarding training. The same techniques, for example as illustrated in FIG. 18, may be used in connection with selecting and presenting to the user in accordance with user profile information, relevant user information for services, additional hardware and/or software, enabling additional features of existing software (e.g., by modifying licensing terms and provisions), and the like.

As illustrated in FIG. 17, different resources, such as available storage as well as other resources (e.g., current battery or backup power supply charge), may be monitored and the user may be provided with notification (e.g. resource consumption alert) when the resource availability falls below a threshold amount. Different alerts may be generated for different threshold levels associated with the same resource. In connection with the resource consumption alert related to available or free disk storage as illustrated in FIG. 17, a user may be presented with a UI indicator which, when selected, directly connects to an online store 1232 and presents the user with a list of disks that can be purchased for use with customer's current data storage system based on user's context information and user profile (e.g., current usage patterns—how much new storage added in last n months or other time period, what is compatible with current customer data storage system and configuration). In connection with monitoring the data storage system and providing notifications or alerts, other examples include watching for soft errors or other conditions typically indicative of pending failure and prompting the user with a UI notification. The UI notification may notify the user regarding the observed behavior and inquire as to whether the user wants to order a replacement part.

In connection with the techniques herein, the context information regarding the data storage system and particular user as recorded in the user profile may be used to leverage sales of particular services, products, and the like, that may relevant to the user. Any purchases made online may be recorded in the user profile information.

The techniques herein may be used to facilitate a variety of different operations and interactions. The user is interacting with the AEM which, in connection with the techniques herein, as connectivity to external environments and provides for a bidirectional communication path between the AEM and external environments.

As described herein, the AEM may be customized by the partner selling the data storage system. Such customization may include directing the AEM to particular websites in accordance with different status or error conditions, collecting additional information for use in connection with VAR or other partner-provided components associated with an error or status condition and the like. The AEM may be customized in accordance with the particular business practices and arrangements of the partner with third parties and the vendor. For example, the AEM may collect a first set of generic data which may be characterized as vendor-specific. The AEM may be customized to collect additional data for use in connection with user communities, support services, e-commerce, and the like as described herein, with VAR-specific products and services. The VAR or other partner may control and regulate the flow of information in a variety of different ways. For example, for one particular status or error, the AEM may connect to one particular website supported by the VAR. If VAR is contracting or outsourcing support services to a third party, the VAR may direct the AEM to contact (e.g., navigate to) a third party website for support issues and otherwise navigate to the VAR website.

Figure 19:
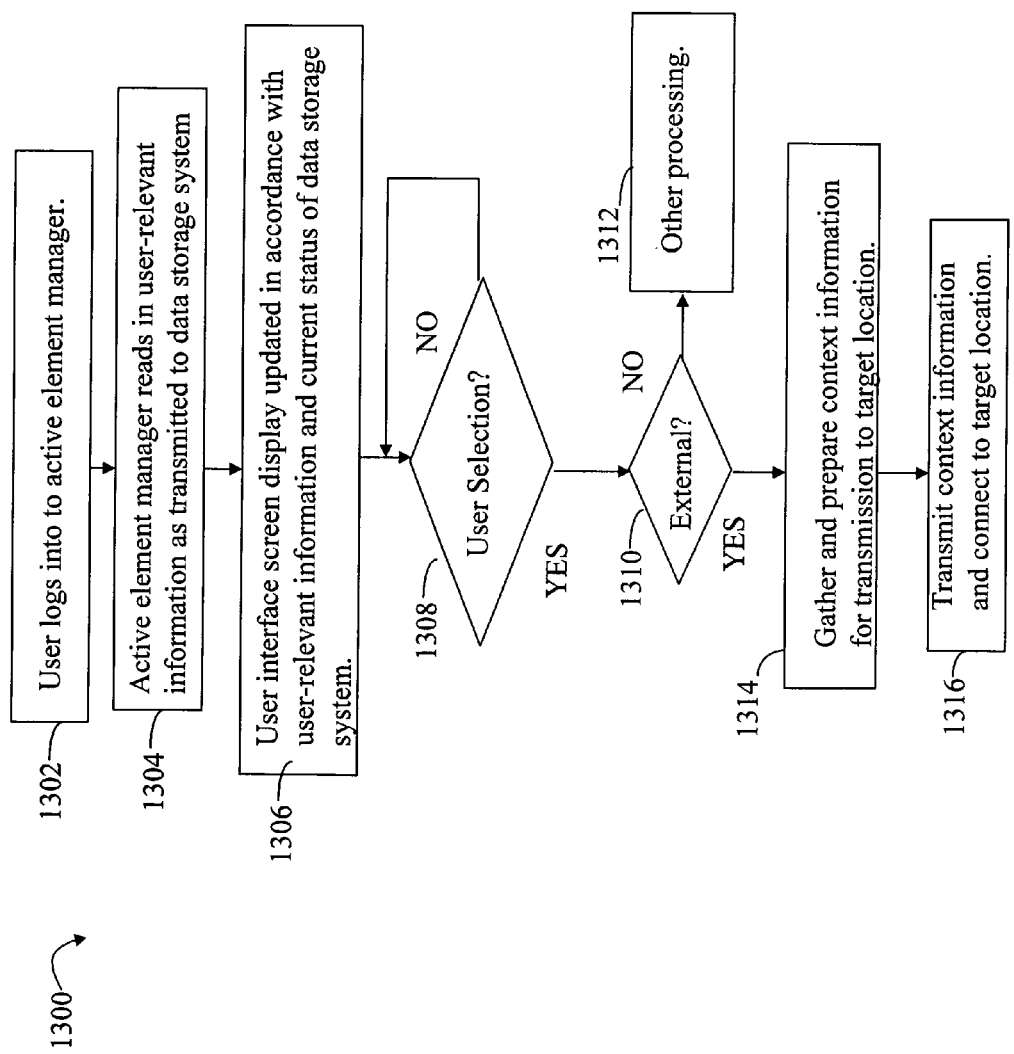
FIGS. 19 and 20 are flowcharts of processing steps that may be performed in an using the techniques herein.
Figure 20:
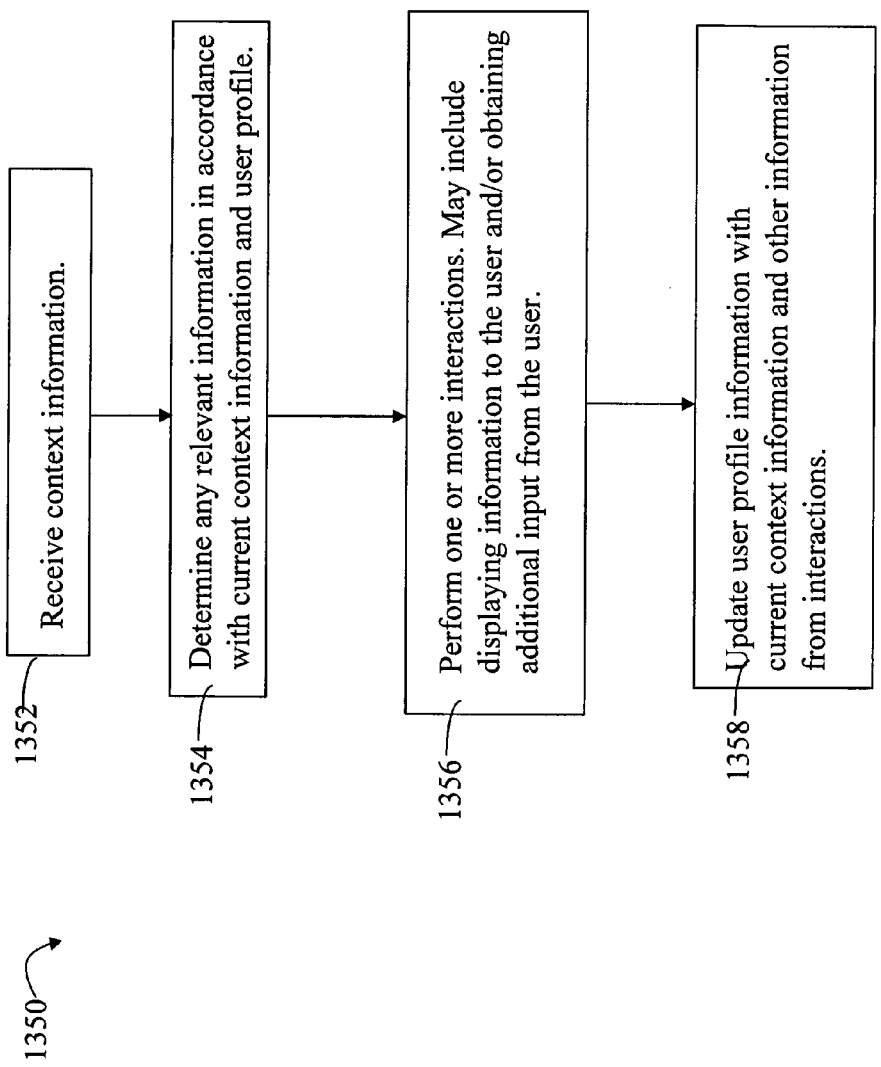

Referring to FIGS. 19 and 20, shown are flowcharts summarizing processing as may be performed in connection with the techniques herein as described above. At step 1302, a user logs into the AEM. In step 1304, the AEM may read in user-relevant information as selected and transmitted from one or more external environments to the data storage system. In one embodiment, step 1304 may include reading notifications as provided by the vendor and/or partner websites related to products, services, user communities, and the like. FIG. 9 provides some examples of the types of notifications as may be provided and displayed to the user in step 1306. Additionally, as part of step 1306, other status information regarding the data storage system may be obtained and included in the displayed information (e.g., general data storage system health, resource consumption alerts, and the like). At step 1308, the AEM waits for a user selection or operation. Once a user makes a selection to perform an operation from the displayed interface, control proceeds to step 1310. At step 1310 a determination is made as to whether the user selection involves making a connection to an external environment, such as a website of a vendor and/or partner. If not, control proceeds to step 1312 such as when performing a data storage provisioning operation. If step 1310 evaluates to yes, control proceeds to step 1314 where processing is performed by the active management component 130 of FIG. 2 to facilitate communications with the external environment. At step 1314, the context information is collected and prepared for transmission to the target location in the external environment. In step 1316, the context information is transmitted to the target location and the user is connected to the target location. In step 1352, the context data is received at the target location. Additional information may be extracted from the user profile. Information may be displayed to the user in accordance with the transmitted context information and/or user profile information. For example, as illustrated in FIG. 10, a message may be displayed to the user in 804 regarding the resource consumption alert indicated in the transmitted context information. As another example, a query may be performed of the available data storage devices to display to the user selected ones in a relevance ordering determined in accordance with the context information and user profile information (e.g., storage capacity and types compatible with the customer's current configuration). At step 1356, one or more other interactions may be performed with the user. This may include, for example, navigating to other web pages, displaying additional information to the user and/or obtaining additional input from the user. At step 1358, the user profile information is updated in accordance with the transmitted context data and interactions of steps 1356.

The user-relevant information that may be pushed to the data storage system for use by the AEM is described above, for example, in connection with FIG. 15.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

The techniques herein may be used in connection with any operation performed by the AEM 120 of FIG. 2. As described herein, exemplary operations may include performing data storage system management operations including data storage configuration requests such as data storage provisioning as well as monitoring and other operations associated with management of the devices of the data storage system.

It should be noted that as described herein, the AEM may facilitate automatically connecting to an external environment, and even a particular target location in the external environment. As part of this process, the AEM may provide the user identifier as part of the context information. The user identifier may be used, for example, as part of user authentication for the user of the AEM to connect to the external environment. For example, the user may be prompted to enter additional information as part of the authentication process to connect to a virtual user community, gain access to a partner or vendor site, and the like. In connection with a target location, a password may not be required, for example, if connecting to a public website without restricting access to particular users. In such instances, the user identifier included in the context information pushed to the website from the AEM may be used to track additional activities incorporated into the user profile information associated with the user identifier. Connecting to an external environment, such as a website provided by one of the vendors or data storage suppliers, may provide connection to one or more server computer system located at the particular website. Code may be executed on the one or more server computer systems in connection with performing the techniques described herein such as, for example, determining the user relevant information in accordance with the user profile information stored on a data storage device accessible to the server systems.

The techniques herein may be used to facilitate communication between the AEM and an external environment, such as a website, for electronic commerce purchases, upgrades, and other transactions. As described herein, the AEM may be used to monitor for failures of different components, such as different hardware component failures or signs of pending failure, and provide notification to the user. Pending failure may be determined, for example, by the AEM observing over time one or more types of errors of a component commonly known to indicate pending failure. The AEM may also be used to monitor data storage systems resources, such as data storage devices and components (e.g., batter backup power supply levels), in accordance with defined threshold levels and provide notification to the user when the resource levels falls below the specified threshold. For example, as illustrated herein, the AEM may monitor the amount of available disk storage and provide notification to the user when the amount falls below a threshold level. The threshold levels may be configurable, for example, by the partner as part of AEM configuration. The threshold levels may also be configurable by a user. By monitoring the data storage system for the occurrence of a threshold level, component failure, or other criteria, the AEM may provide notification of the particular event to the user, for example, via a user interface indicator 705 of FIG. 9. The user may then select the indicator and be connected by the AEM to a target location in an external environment, such as an online store at a vendor and/or partner website, to make a relevant purchase. Thus, the techniques herein with the AEM may be used to facilitate electronic commerce by, for example, ordering disk drives as before remaining storage capacity is used to a predetermined level, ordering replacement components on detection of failure and/or pending failure, renewing a license or support contract prior to expiration, and the like.

As described herein, the AEM may be used to facilitate a bi-directional information flow between the AEM and one or more external environments, such as one or more websites of a vendor and/or partner. The bi-directional information flow may be used in connection with performing a variety of different tasks and operations such as related to, for example, interactive automated support, electronic commerce, and/or virtual user communities. The AEM provides context information to enrich the task, operation, and the like, being facilitated using the bi-directional information flow. The context information is achieved in connection with data gathered regarding functions performed by an element manager as users manage and provision the storage. The AEM may use the data storage system to collect information as management operations are performed thereon (e.g., for data storage configuration, provisioning, monitoring and the like) for obtaining the context information provided by the AEM to an external environment. As described herein, the AEM may also receive information from one or more external environments, such as the websites of vendors and/or partners, as part of the bi-directional information flow to facilitate tasks such as interactive automated support and electronic commerce. The information received may be the user-relevant information provided to the AEM as well as other information exchanged as part of the bi-directional information flow. In connection with electronic commerce, the techniques herein may be used to facilitate interactions between the AEM and an external environment, such as the vendor or partner website, for initial purchase, renewal, extension, or upgrade for support agreements, warranties, and the like.

Described above is how an embodiment may utilize RSS (Really Simple Syndication) technology to provide information to the AEM and data storage system from one or more external websites or other external environments. What will now be described are different ways in which RSS, or another platform and technology, may be used by the AEM and data storage system, for example, to facilitate providing support to a customer or user, of a data storage system.

A syndication or publication platform, such as the RSS platform, may be used to manage, organize, notify, and/or provide for consumption of content or other information acquired from a source such as, for example, the Internet, intranet or other private network, device, or system. RSS is just one particular platform that may be used in connection with the techniques herein. As will be described herein, a syndication platform, such as RSS, may be used for publication of content and other information that may be consumed by a user logged into the AEM, such as by reading the published content. As will also be described herein, the publication of content or other information by the syndication platform may also be consumed by the data storage system and/or AEM (e.g., such as in the case of a software upgrade which is automatically applied). The syndication platform may be used to provide notification regarding information published by the data storage system itself so that the data storage system generates one or more RSS feeds. The same syndication platform may also be used to provide notification regarding RSS feeds generated by one or more external environments, or locations therein. For purposes of illustration, reference may be made to RSS in examples herein. However, it should be noted that other platforms and technologies may also be used in connection with the techniques herein.

RSS technology utilizes and provides for notifications regarding RSS feeds. One type of RSS feed is web feed providing notification of newly published web content or other types of published information. As an example, a website, such as a VAR website, may host one or more RSS feeds each associated with a different stream. A first RSS feed may be associated with a blog and a second feed may be associated with new product announcements or updates. The VAR may maintain a list of notifications or feed items for each RSS feed to which a user can subscribe. Software, as will be described herein in more detail, may be used to obtain and process newly added notifications or feed items for each RSS feed. The particular processing of an RSS feed item may vary as will be described in more detail in following paragraphs. As described above, one type of processing may include displaying information to a user via a GUI along with a link to a location, such as at a VAR website, to which the user can connect for further information. An embodiment may have the data storage system function as a feed aggregator and feed proxy server which collects feed items for one or more RSS feeds to which users of the AEM subscribe. This is also described in more detail in following paragraphs.

What will be set forth are some definitions used herein. A feed, such as an RSS feed, is list of feed items from a feed source or provider. A feed source or provider, such as a VAR website, may host one or more feeds. A feed list is a list of feeds to which a user, such as a user of the AEM, subscribes. An feed aggregator may aggregate or collect feed items from multiple feeds. The feed aggregator may serve as a proxy server which acts on behalf of multiple users subscribing to the multiple feeds. A subscription refers to a user signing up to receive notifications of new feed items for a feed. A feed item may represent a basic item from a feed such as a blog entry or news article abstract. A feed item may also include a link to the actual or complete blog entry, article, and the like. As an example, a feed source or provider may be a content provider such as a VAR or vendor website. One feed may be a first blog on the VAR website. A second feed may be a second blog on the same VAR website. Feed items may provide notification of newly added content or updated information for a particular feed. Each feed item may be in accordance with one or more publication formats.

Each user of the AEM may subscribe to different feeds as indicated in the user's feed list. The data storage system may include thereon a feed aggregator which may be characterized as a proxy feed server. The aggregator may serve as a single collection and retrieval point for the feeds to which all user subscribe. The aggregator may automatically obtain information from a series of feeds regarding any newly published feed items such as for example, by polling the different feeds for any new items. Such polling may be performed on a periodic basis. When a user logs into the AEM, the user's feed list may be examined to determine what notifications should be made to the GUI of the AEM regarding new feed items. The GUI may be accordingly updated in an ongoing fashion while the user is logged in as the data storage system and AEM receive notification regarding new feed items for those feeds included in the user's feed list.

In one embodiment as described herein, the RSS feed items may be in any one of a variety of different formats such as, for example RSS 0.90, 1.0, 2.0, various versions of ATOM. RSS is based on XML, a widely used standard for textual information exchange between applications on the Internet. It should be noted that RSS is just one standard for expressing feeds as XML and others may be used. Another well-known choice for expressing RSS feeds is ATOM. A feed reader may be characterized as a software component capable understanding and processing a feed item. The feed reader understands and is capable of processing feed items in one or more of the different feed formats.

Figure 21:
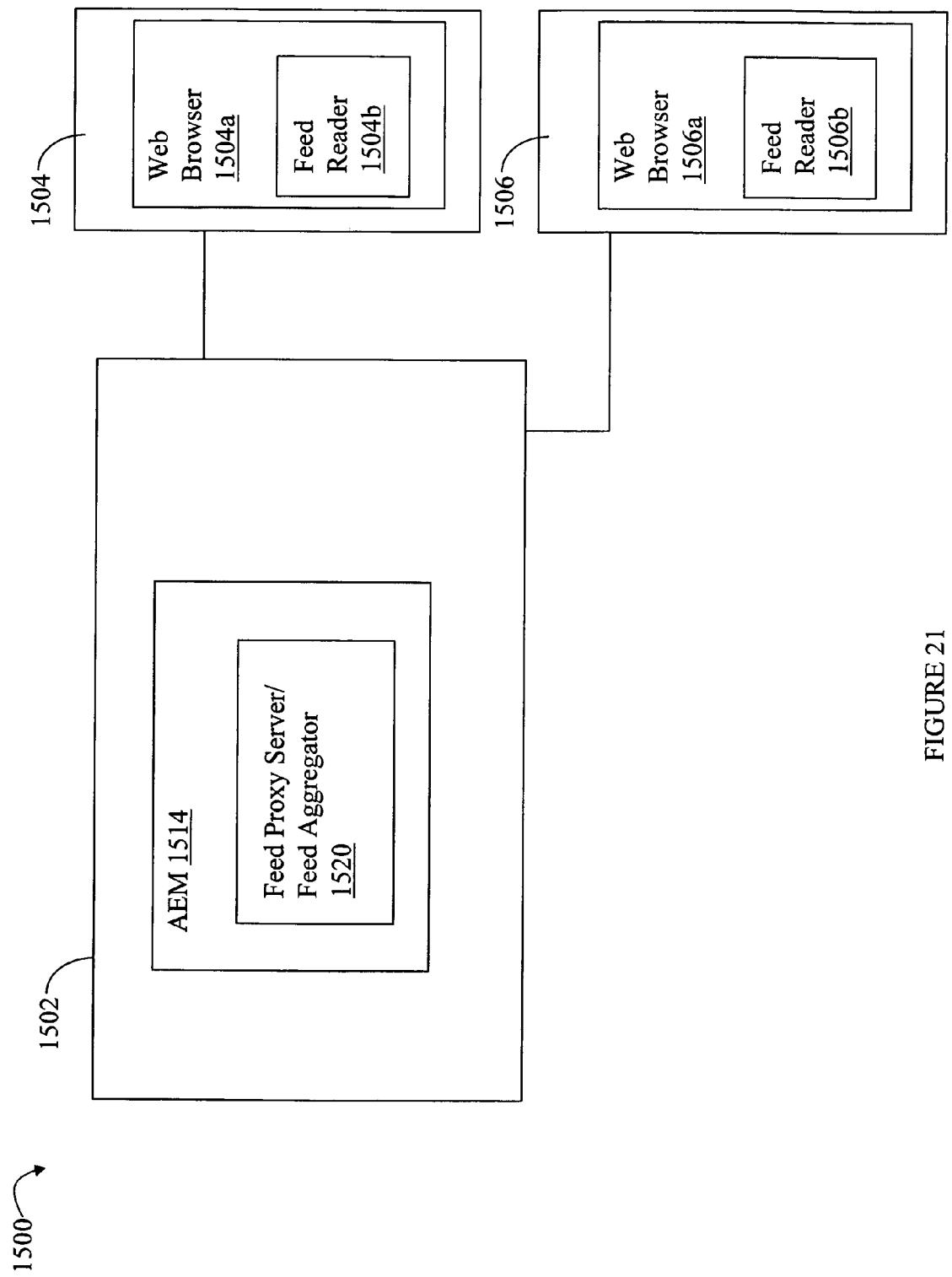
FIGS. 21 and 22 are examples of components that may be used in connection with the techniques herein in an embodiment.

Referring to FIG. 21, shown is an example of components that may be included in an embodiment in accordance with the techniques described herein. The example 1500 includes a data storage system 1502 with an AEM 1514 residing thereon. In one embodiment, the AEM 1514 may also include a feed proxy server or feed aggregator 1520 as a component included therein. Connected to the data storage system may be one or more workstations or management stations 1504 and 1506. Elements 1504 and 1506 may correspond, for example, to instances of element 16 of FIG. 2 described elsewhere herein. Management station 1504 may include thereon a web browser 1504a. A feed reader 1504b may be incorporated within the web browser 1504a. When a user logs in to use the AEM, the user may start a session via a GUI such as with web browser 1504a. Element 1506 may include components thereon similar to that as described in connection with 1504. The example 1500 illustrates one particular arrangement in which functionality of the component 1520 may be embodied in the AEM 1514. Similarly, functionality of feed reader may be integrated within the web browser or other GUI.

As will be described in more detail, the component 1520 may aggregate feed items for multiple feeds to which multiple users of the AEM may subscribe. A feed may be associated with a feed provider which is external to the data storage system, such as in an external environment like a VAR or vendor website. A feed may also be associated with the data storage so that the feed provider is the data storage system and the feed items are generated from within the data storage system. The component 1520 may poll each of one or more feeds to retrieve newly posted feed items on a periodic basis. As an alternative, newly posted feed items may also be pushed to the data storage system 1502. It should be noted that additional security considerations may be needed with pushing information from an external environment outside of the data storage system. The foregoing is described in more detail in following paragraphs.

When a user logs in to the AEM, such as with a session on 1504 or 1506, the feed reader may retrieve and process feed items from the component 1520 for the feeds to which the user subscribes. The feed reader may obtain an initial set of new feed items and then accordingly may any updates to the GUI for new feed items posted while the user is currently logged in with the current AEM session. The user may have specified a subscription for one or more feeds in a previous AEM session. As an example, a user may have specified a subscription to a feed associated with a URL of a VAR website location which provides a feed for a blog, publications on a particular VAR product or application, and the like. An embodiment may also specify default subscriptions for a user without a user having to specifically perform a subscription action. For example, it may be a configuration option set by a VAR providing the AEM 1514 and component 1520 to have each user subscribe to feeds on the VAR and/or vendor website for particular products the customer has purchased from the VAR. Such configuration options may be modifiable, or not, by a customer or user of the AEM.

It should be noted that the AEM 1514 and data storage system may include other components than as illustrated in the example 1500 and will be described in following paragraphs and figures.

Figure 22:
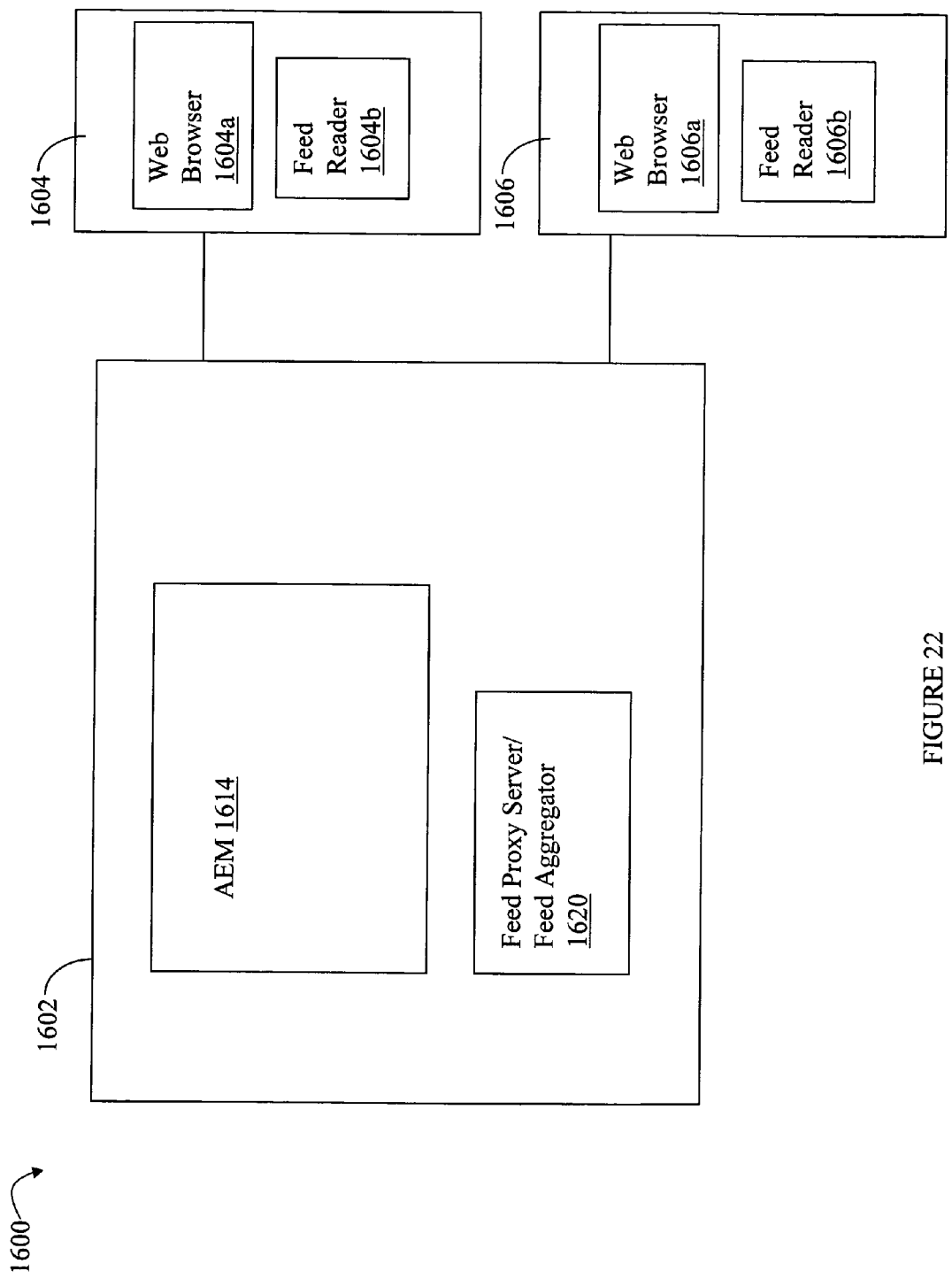

Referring to FIG. 22, shown is another example of components that may be included in an embodiment in accordance with the techniques described herein. The example 1600 includes a data storage system 1602 with an AEM 1614 residing thereon. In this embodiment, the feed proxy server or feed aggregator 1620 may be a component which resides on the data storage system 1602 but is not embodied as a component of the AEM 1614. Connected to the data storage system may be one or more workstations or management stations 1604 and 1606. Elements 1604 and 1606 may correspond, for example, to instances of element 16 of FIG. 2 described elsewhere herein. Management station 1604 may include thereon a web browser 1604a. A feed reader 1604b may reside on the management station 1604 as a component separate from the web browser 1604a. When a user logs in to use the AEM, the user may start a session via a GUI such as with web browser 1604a. Element 1606 may include components thereon similar to that as described in connection with 1604. The example 1600 illustrates one particular arrangement in which functionality of the component 1620 may be implemented as a component separate from the AEM 1614. Similarly, functionality of feed reader may be implemented as a component separate from the web browser or other GUI.

Figure 23:
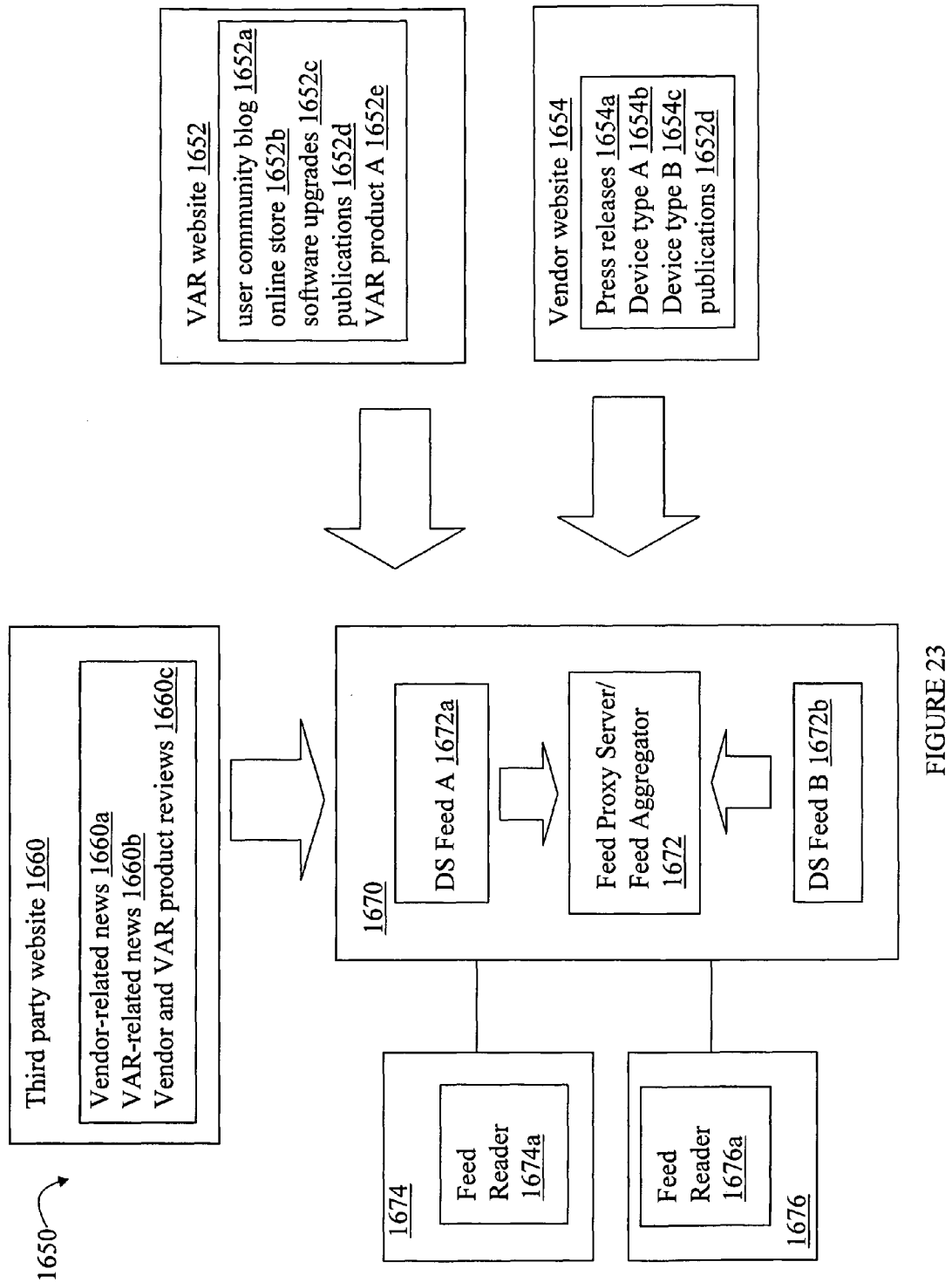
FIG. 23 illustrates an example of data flow for feeds in accordance with an embodiment using the techniques herein.

Referring to FIG. 23, shown is an example illustrating data flow with respect to the feeds in one embodiment using the techniques herein. The example 1650 includes a data storage system 1670 which communicates with external environments or websites 1652, 1654 and 1660. Elements 1674 and 1676 are management workstations as described herein. It should be noted that for the sake of simplicity of illustration, not all components of the embodiment are included in the example 1650. For example, each of 1674 and 1676 may include thereon a web browser in accordance with an embodiment as described in FIG. 21 or 22.

The example 1650 illustrates the data flow of feeds from websites 1652, 1654 and 1660. The VAR website 1652 may be a feed provider of 5 feeds for the following: user community blog 1652a, online store 1652b, software upgrades for VAR-supplied software components 1652c, publication 1652d, and VAR product A 1652e. A different URL may be used to indicate each of the foregoing 5 feeds hosted on the VAR website 1652. Element 1652a may include a feed item for each new blog posting. Element 1652b may include a feed item for each new item available in the online store, for different sales or online discounts for vendor products, and the like. Element 1652c may include a feed item for each software upgrade, such as a software patch, new version, and the like, for VAR-supplied software components. As will be described in more detail, in connection with 1652c, RSS may be used as the platform or technology for providing notification in the form of information displayed via the GUI to a user. Additionally, RSS may be used to facilitate automated download and installation of the foregoing software upgrades. Element 1652d may include a feed item for each electronic whitepaper or other publication that becomes available on the VAR website 1652. Element 1652e may include a feed item for each posting regarding VAR product A such as reported problems or corrections, recalls, ways to use or improve performance, best practices, new versions or upgrades, and the like.

The vendor website 1654 may be a feed provider of 4 feeds for the following: vendor press releases 1654a, information regarding device type A of the vendor 1654b, information regarding device type B of the vendor 1654c, and vendor publication 1652d. Element 1654a may include a feed entry for each press release regarding the vendor, its products, and the like. Element 1654b may include a feed entry for each posting or news item regarding vendor device type A such as related to a particular storage device model provided by the vendor. Element 1654c may include feed entries for device type B and include entries therein similar to as described for 1654b. Element 1654d may include a feed item for each electronic whitepaper or other publication that becomes available on the vendor website 1654.

The third party website 1660 may host three feeds supplying information regarding VAR and vendor products. The third party website 1660 may be under the control of the VAR or vendor. It may also be that the website 1660 is not under control of the VAR or vendor and is rather an independent source of information hosted, for example, by an industry-sponsored organization for customers of all data storage system vendors. The website 1660 may host three feeds: vendor-related news 1660a, VAR-related news 1660b, and vendor and VAR product reviews 1660c. Elements 1660a and 1660b may include press releases provided by, respectively, the vendor and VAR, as well as other new stories from newspapers, magazines, and the like, which may or may not be sponsored by the vendor and VAR. Element 1660c may be in the form of a blog and include a feed item for each new posting on a VAR or vendor product.

The data storage system 1670 may also host two internal feeds 1672a and 1672b. Feed 1672a may include a feed item for each new data storage system status message or a particular status class such as all error messages or messages of a particular severity level. Similarly, feed 1672b may include a feed item for data storage system status messages of a different type of class than those included in 1672a.

In one embodiment, the feed entries may be generated in an automated fashion by software programs executing on the data storage system and websites illustrated.

The foregoing are some examples of the types of data that may be included in the different feeds aggregated by the feed proxy server or feed aggregator 1672. In one embodiment, the aggregator 1672 may poll the websites 1652, 1654 and 1656 at various time intervals to determine whether any new feed entries have been added since the previous polling. If so, the aggregator 1672 may issue a request for such new feed entries which are downloaded to the data storage system 1670. Similarly, the aggregator 1672 may poll 1672*a* and 1672*b* to retrieve new feed entries as posted. As an alternative, one or more of the foregoing feeds may have new feed entries pushed to the data storage system 1670. In such a model in which the feed entries are pushed, the feed provider may maintain information to communicate with the data storage system (e.g., authentication information if feed is external to data storage system) and track feed entries which are pushed. As an example, in one embodiment, 1672*a* may be associated with errors occurring within the data storage system and new feed entries to 1672*a* may be pushed to the aggregator. Element 1672*b* may be associated with data storage system status messages and events having a lesser degree of severity than 1672*a* and feed entries of 1672*b* may be retrieved by the aggregator polling technique. New feed items to feed 1652*c* may also be pushed to the data storage system 1670 and other configuration options of the data storage system, AEM and/or aggregator 1672 may be set to provide for automatic download and installation thereof as will be described in more detail in following paragraphs. It may also be that only certain types of software upgrades, such as only critical or security software upgrades, are pushed to the data storage system and applied in the foregoing automated fashion depending on the configuration settings and agreement between the VAR and customer of the data storage system 1670. A user may log into the AEM using workstation 1674 or 1676 and the GUI associated with the session may be initially populated with new feed items for feeds to which the user subscribes. During the user session, the GUI may be appropriately updated in accordance with any new feed items to the feeds for the user's subscription.

Figure 24:
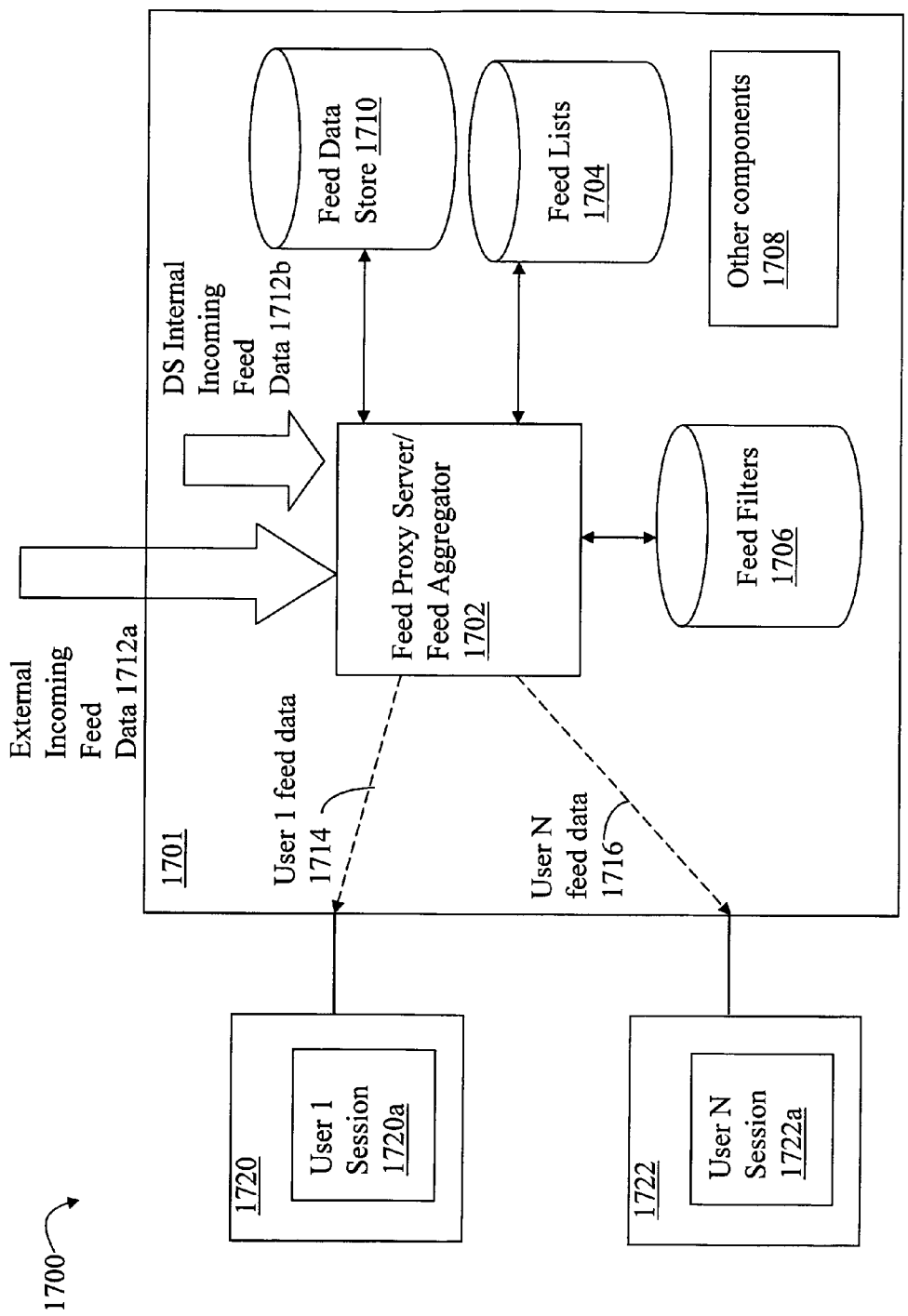
FIG. 24 provides an example with additional component detail and data flow in an embodiment using the techniques herein.

Referring to FIG. 24, shown is an example illustrating in more detail the data flow and components on a data storage system 1702 as may be used in connection with the techniques herein. The example 1700 includes a data storage system 1701 and illustrates the incoming feed data from external feeds 1712*a* and internal feeds 1712*b* received by the aggregator 1702 using polling or pushing models as described above. The aggregator 1710 may store the feed items in the feed data store 1710. The feed lists for the user subscriptions may be stored in the feed lists 1704. Additionally, an embodiment may also utilize one or more types of feed filters 1706 as will be described in more detail in following paragraphs to provide selected or customized information to a user and also limit the feeds to which a user can subscribe based on website location, feed within a website location, and the like. The other components 1708 may logically represent other components included on the data storage system 1701 for use with the techniques herein. For example, as will be described in following paragraphs, a script may be used in connection with performing a software upgrade to the data storage system and a script engine may be used to interpret and process the instructions of the script. The components of the example 1700 may be included, in whole or in part, as an integrated component of the AEM as well as reside as a separate component on the data storage system. Element 1714 represents the feed data retrieved by the workstation 1720 in connection with user session 1720*a* for user1 logged into and using the AEM of the data storage system 1701. Element 1716 represents the feed data retrieved by the workstation 1722 in connection with user session 1722*a* for user N logged into and using the AEM of the data storage system 1701. Each of 1720 and 1722 may include components to perform the functionality described herein for a GUI with feed reader capabilities for the different feeds to which each user subscribes. The feed data 1714 ad 1716 may be provided initially when the user starts the session as well as in an ongoing, periodic basis as the feed reader and/or web browser retrieves any new feed items in accordance with the user's feed list.

It should be noted that the different data items included in FIG. 24 and elsewhere herein may be stored in any one of a variety of different types of data containers such as, for example, a database, file, directory, and the like, that may vary with data type and embodiment.

Figure 25:
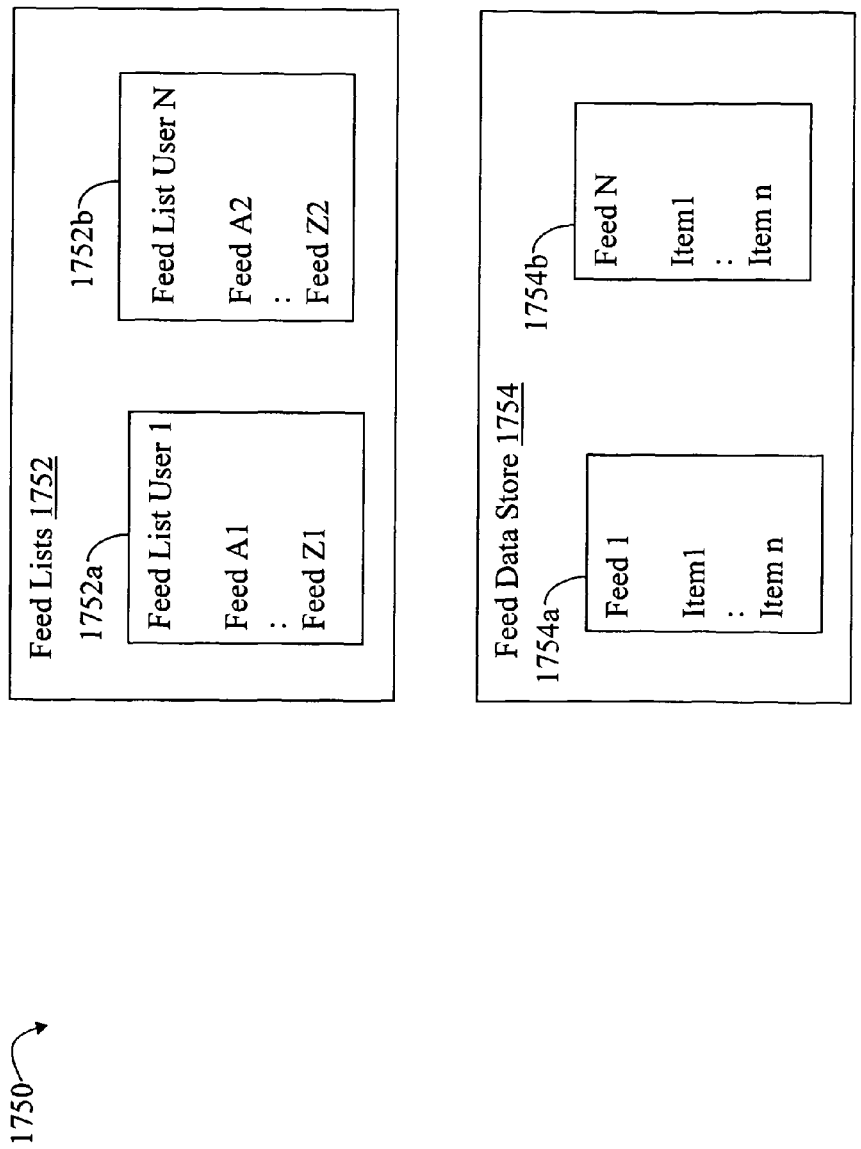
FIG. 25 is a representation of feed lists and a feed data store as may be included in an embodiment.

Referring to FIG. 25, shown is an example logically representing information of the feed lists and feed data store as may be used in an embodiment with the techniques herein. The feed lists 1752 may include a feed list for each user with an entry for each feed to which the user subscribes. Each entry in the feed list may also include other information, such as authentication information to access the feed, information indicating the last feed item displayed or processed for the user, and the like. In the example 1750, the feed list 1752*a* may include the feeds subscribed to by user 1 and the feed list 1752*b* may include the feeds subscribed to by user N. The feed data store 1754 may include a list of feed items for each feed. Element 1754*a* represents the feed items for feed 1 and element 1754*b* represents the feed items for feed N. Associated with each feed item is information so that the aggregator is able to synchronize with the feed items posted by the feed provider. For example, an embodiment may include feed item information with each entry including a unique feed item identifier. As an alternative, the feed data storage 1754 may maintain a time stamp for each feed indicating the last time the data storage system received feed items for that feed source. Any new feed entries posted by a feed provider having a later posting time stamp than that in the feed store 1754 may be determined as new and retrieved by the aggregator. The aggregator may then update the timestamp associated with the feed each time the aggregator performs polling or otherwise obtains a feed item for a feed.

It should be noted that an embodiment may include other information in 1752 and 1754 than as described and illustrated for use with the techniques herein.

Figure 26:
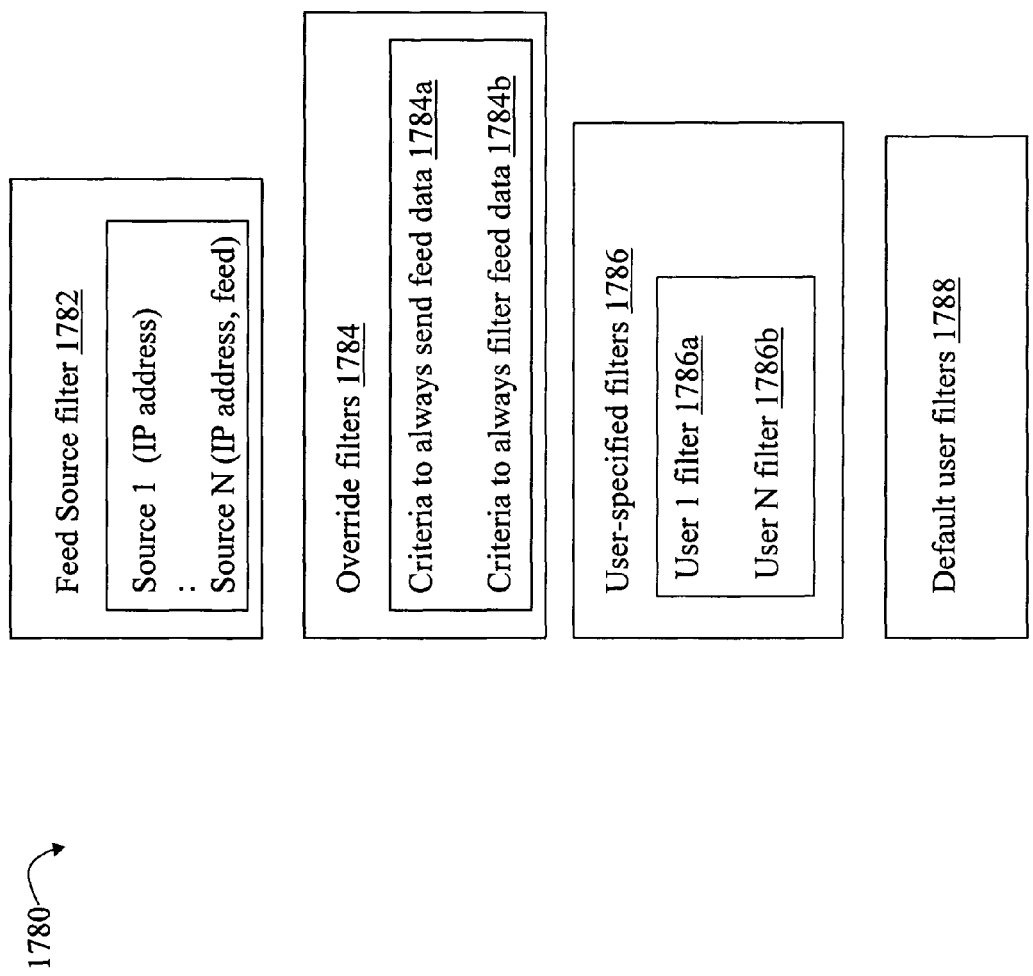
FIG. 26 is an example of the different filters that may be used in an embodiment in connection with techniques herein.

Referring to FIG. 26, shown is an example of different types of filters that may be used in an embodiment in connection with the techniques herein. The example 1780 includes feed one or more source filters 1782, one or more override filters 1784, one or more user-specified filters 1786, and one or more default user filters 1788. Each of the filters may be implemented in a variety of different ways known in the art. For example in one embodiment, filters may define rules in accordance with a rule syntax specifying the filtering criteria.

The feed source filter 1782 may be used to indicate those feeds as well as particular feed sources or feed providers that can provide feed items to the aggregator. The filter 1782 may indicate particular websites, such as a VAR website having a particular IP address, to which a user can subscribe and for which the aggregator obtains feed items. The filter 1782 may also identify a particular feed within a website as well as the website itself. The filter 1782 may indicate the websites, or feeds therein, which are allowed or excluded. In other words, depending in the implementation, the filter 1782 may enumerate the allowed feeds or the disallowed feeds. The filter 1782 may also be implemented, for example, using rules which provide a syntax allowing expression of either or both of the foregoing. As an example, the VAR may indicate the one or more feed sources in filter 1782 to which a user can subscribe. Filter 1782, as well as other filters herein, may or may not be configurable depending on the implementation, VAR, and the like. The customer may be able to modify any one or more of the foregoing as appropriate or otherwise allowed by the vendor and/or VAR. As an example, the filter 1782 may include VAR-related websites, vendor-related websites and other storage-related websites.

Filters 1784, 1786 and 1788 may be used in connection with filtering retrieved feed items from those sources and feeds allowed by 1782 which are presented to a user or otherwise processed by the AEM and/or data storage system.

Override filters 1784 may be characterized as those filters which override any other criteria of filters 1786 and 1788. The override filters 1784 may indicate criteria as to what feed items are suppressed/not suppressed or processed/not processed regardless of what is specified in the filters 1786 and 1788. For example, override filters 1784 may include criteria 1784a indicating conditions of when feed items are always processed such as, for example, always posting for display with a GUI indicator feed items related to VAR and/or vendor recalls or problems for hardware and/or software in the data storage system, software upgrades classified as critical or related to security, and the like. Criteria 1784b may indicate conditions of when feed items are always filtered or always suppressed such as, for example, for feed items related to hardware and/or software not installed or in use on the data storage system. The override filters may specify filtering criteria in the form of a rule which allows or disallows application and processing of a feed item depending on a configuration option. As an example, a configuration option may indicate that a customer has a prescribed level of service from a VAR or vendor. Criteria of 1784 may include a rule which compares a the current level of service in the configuration option to a required service level that may be indicated in the feed item. The rule may state that if the current level of service does not match a service level indicated as required in the feed item service level criteria, then the feed item may not be posted or otherwise processed. As a further example, a service support level may be indicated in a feed item including a software upgrade. The configuration option may include a setting made by the VAR in accordance with a level of service, such as LOW, provided to the customer per agreement with the VAR and such configuration information may not be modifiable by the customer. The feed item for the software upgrade may include an indicator that MEDIUM or HIGH service level is required in order for the feed item to be processed by the data storage system or otherwise posted to the subscriber's GUI. The override filters 1784 may include criteria in the form of a rule comparing the current service level of the data storage system (e.g., LOW) with that required by the feed item (e.g., MEDIUM or HIGH) and only allow the feed item to be processed further if the customer has the proper level of service. As another example regarding use of the override filters, a data storage system may be configured to allow/disallow automated processing of a feed item as described in more detail herein. Override filters 1784 may include a rule which examines one or more fields of a feed item (e.g., fields 1804 and 1808 as described in connection with FIG. 27) to see if the feed item may be processed in an automated fashion. If so, the rule may determine whether the current configuration options allow for automated processing of a feed item.

User-specified filters 1786 may include a customized filter for a particular user or group of users. For example, a user may subscribe to a feed for a VAR online store. The user may select to have such feed items filtered so that the user only receives feed items related to a particular product, including user-specified keywords, including predefined keywords or terms selected from a menu, and the like. As such, each user filter may specify filter terms applied to all the feeds in the user's feed list or selected feeds. The default user filters 1788 may define a default filter used if the user does not provide a customized filter in 1786. The default filter 1788 may include default criteria defined by the VAR, vendor and/or may be configured by the customer.

What will now be described are some additional examples as may be applied for use with one or more of the foregoing filters of the example 1780. The user specified filters 1786 may be used to provide user-customized filtering based on a particular application. For example, a feed may include feed items applicable to different types of applications include email applications, database applications, and the like. The user may specify criteria which filters the feed based on interest in a particular application type (e.g., email application) or instance of a particular application type (e.g., Microsoft Exchange™.) one or more device attributes (e.g., manufacturer, device characteristics such as device type, capacity, speed), and the like. The foregoing may be specified through user selection of keywords from a pull down menu in combination with user-supplied terms.

The filters described in connection with 1780 may be used to filter out feed items that the user does not want to see (e.g., user-specified filters 1786) as well as not allow users to inadvertently or otherwise filter out feed items that a VAR, vendor, or other party does not want filtered out (e.g., via override filter 1784).

Figure 27:
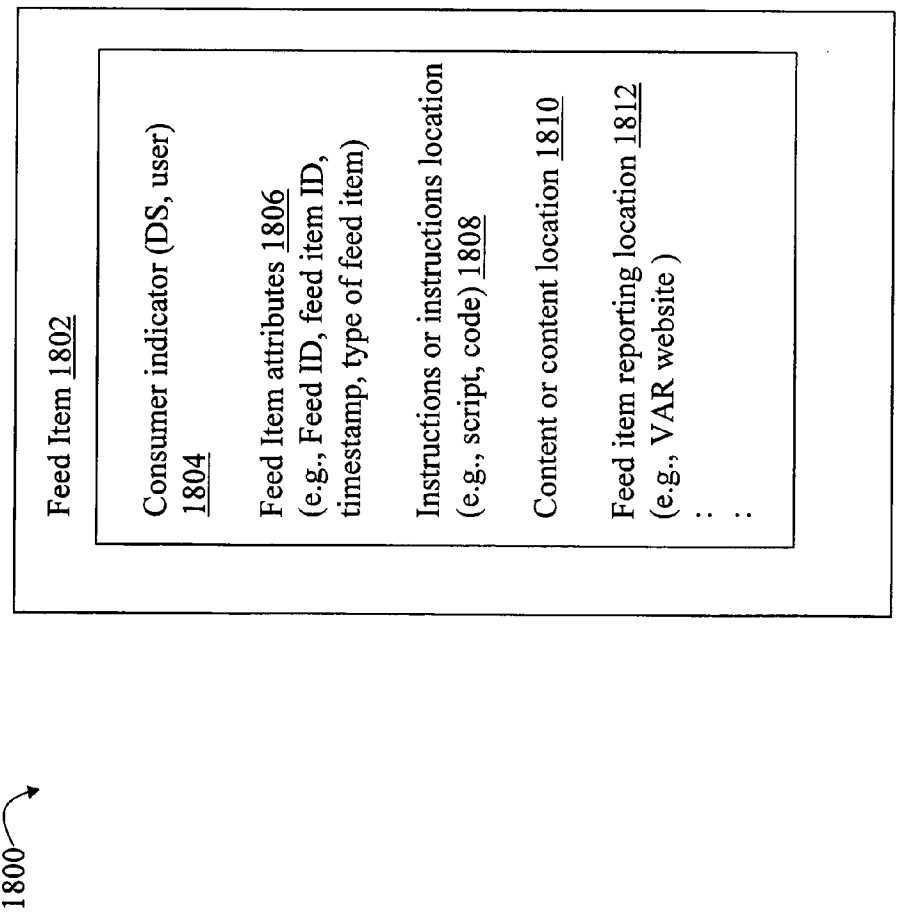
FIG. 27 is an example representing information that may be included in a feed item as used in an embodiment.

Referring to FIG. 27, shown is an example illustrating what may be logically included in a feed item in accordance with the techniques herein. A feed item 1802 may include a consumer indicator 1804, one or more feed item attributes 1806, instructions or an instruction location 1808, content or content location 1810, a feed item reporting location 1812, and other information as may vary with feed item and implementation. It should be noted that a feed item may also omit one or more of the items in 1802 depending on the particular feed item as will be illustrated in more detail in following paragraphs.

The consumer indicator 1804 may indicate what one or more components are the consumers of the feed item. As described herein, a feed item may be a notice, for example, regarding a newly posted blog entry, advertisement for hardware, software, and/or service, and the like. Such feed items may provide information or notice to a user which may be posted via a GUI indicator as described elsewhere herein. In such instances, the consumer may be indicated as the user or GUI. As also described herein, a feed item may be consumed by the AEM and/or data storage system in addition to, or rather than being, passed to the GUI for display in connection with a GUI indicator. In this latter instance, the feed item may be characterized as providing data which may be processed by the AEM and/or data storage system such as, for example, to facilitate automated software upgrades, online documentation or help upgrades, automated execution of commands to collect and report data on the data storage system per a service level agreement with the VAR, and the like. In other words, a user may never see a GUI posting or indicator for such a feed item. Rather, RSS may be used as the platform to facilitate downloading, installing, and/or execution of the foregoing without requiring explicit user invocation and interaction. The customer of the data storage system may have an agreement with the VAR and/or vendor so that the AEM and/or data storage system is appropriately configured to allow such processing to occur without user interaction. When the aggregator receives the feed item, the aggregator (and also the AEM and/or data storage system) may be configured to operate in a mode to automatically apply such feed items without any user being logged on or using the AEM. Alternatively, in a data storage system in which such configuration options are not appropriately set for automated processing, other processing may occur. As an example in which the configuration options do not allow for automated processing of feed items, a GUI indicator may alternatively be presented to a user (e.g. via a GUI of the AEM) in which the user may select a link causing further processing of the feed item to be performed. Further examples of a consumer indicator 1804 for the data storage system and/or AEM are described in following paragraphs. In order to operate in a mode to automatically apply a feed item, the configuration options are appropriately set and, the feed item includes a consumer indicator 1804 indicating the data storage system or AEM as one of the consumers. Additionally, the feed item includes information therein, such as in field 1808 described herein, to provide instructions facilitating such automated processing. Applying a feed item may include processing to perform any such instructions indicated by field 1808.

The feed item attributes 1806 may include one or more attributes characterizing this feed and feed item. For example, the attributes 1806 may include a feed identifier (e.g., used to distinguish between different feeds), a feed item identifier (e.g., used to uniquely distinguish this feed item from others of the same feed), a timestamp (e.g., associated with the time at which the feed item was posted), a type indicator (e.g., is this feed item a software patch, documentation update, help file update, monitoring script, blog update, publication, advertisement), and the like. Element 1806 may also indicate the required level of service in order for the feed item to be processed or otherwise allow the feed item to be posted via a GUI indicator for each subscriber.

Element 1808 may include instructions or a location from which the instructions associated with this feed item may be obtained. Element 1808 may include an embedded script or code as well as identify a location at a website or internal location on the data storage system where such instructions may be obtained. Element 1810 may include the actual embedded content (e.g., the actual help file or documentation update) or may reference a location (e.g., URL, directory/file, etc.) at which the content may be retrieved by the aggregator. As an example, the feed item 1802 may be for a software patch. The feed item may include script instructions embedded in the feed item as part of 1808. When the aggregator receives the feed item, the aggregator may determine that this feed item is for consumption by the data storage system and/or AEM via element 1804. The aggregator may examine current configuration options and determine that the current configuration allows for automated installation of the software patch. The aggregator may then retrieve the embedded script from 1808 and execute the script using a script engine included on the data storage system. Application of the software patch may include executing the script and also downloading content from a location, such as a VAR website location indicated by 1810. The script may indicate that the content is to be retrieved from the location indicated in 1810 (e.g., may be a URL or IP address with authentication information).

Element 1812 may indicate a feed item reporting location 1812 to which the aggregator may submit information regarding processing of the feed item. The location 1812 may be, for example, a VAR website location with authentication information, a data storage internal location (e.g., directory, log or other file) to which information is copied or reported, and the like. As an example of when 1812 may be used, the script indicated by 1808 may be executed to collect information regarding the data storage system. Such information may relate to status, configuration, utilization of available device capacity, when maintenance activities of the data storage system were last performed, data included in error logs, software and/or hardware versions and other configuration information and state of the data storage system and the like. After such a script is executed, the collected information may be posted to a location on the VAR website. The script may be executed as part of a service level agreement between the customer and the VAR to monitor the data storage system status.

In connection with processing a feed item, the processing may be performed by the aggregator, AEM, and/or other component of the data storage system. The different processing steps may be partitioned in any manner as appropriate among the foregoing for a particular embodiment. For example, the aggregator may be a separate component from the AEM so that the aggregator may parse a feed item and provide the portions thereof to the AEM. In an embodiment in which the aggregator is included as a component of the AEM, the aggregator may handle processing of scripts, etc., included in the feed item and interact with the script engine or other components to complete feed item processing.

Figure 28:
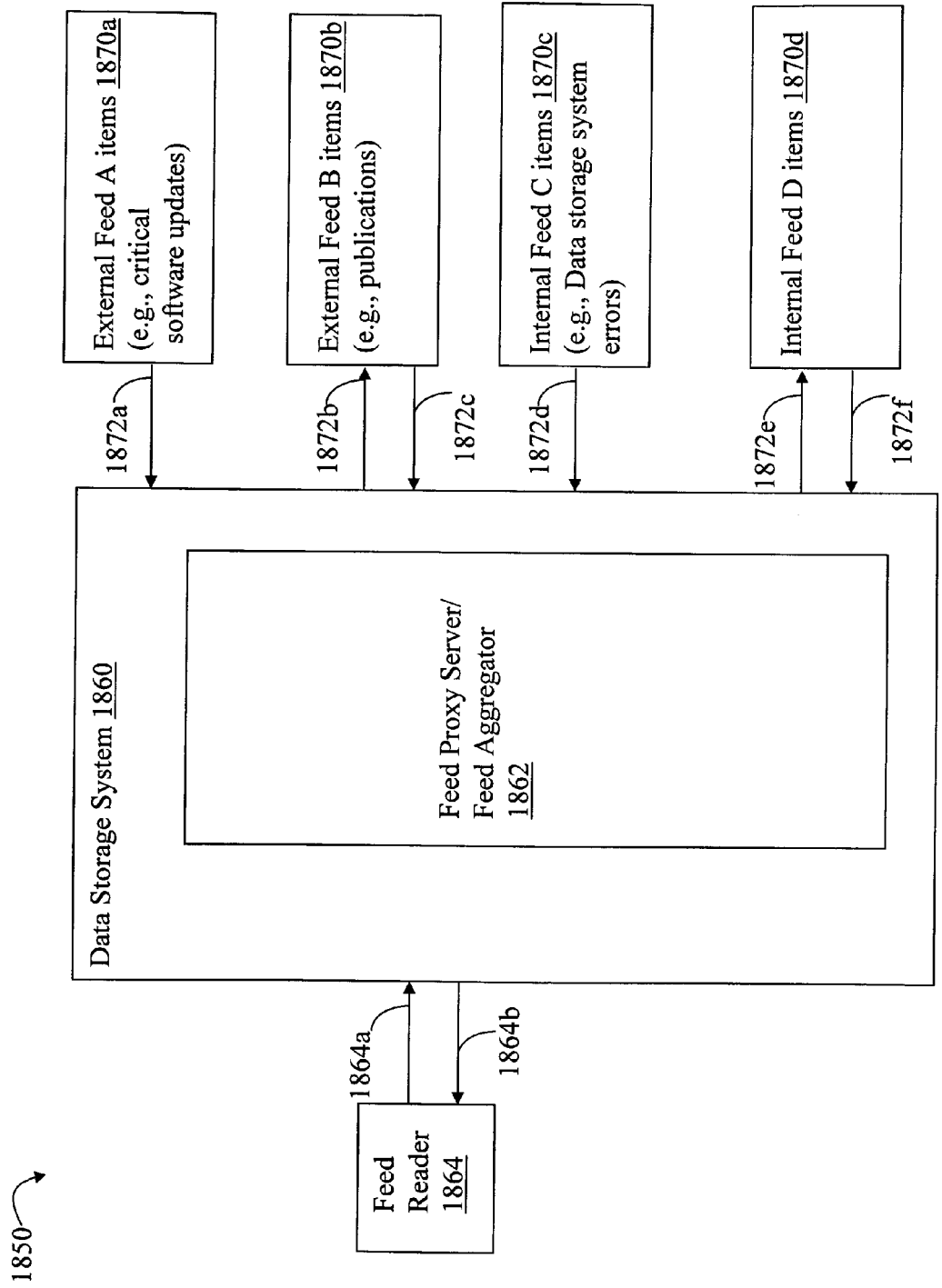
FIG. 28 is an example illustrating different methods by which feed items may be obtained by the data storage system in an embodiment.

Referring to FIG. 28, shown is an example 1850 of data flow that may be occur in an embodiment using the techniques herein. The example 1850 may include a data storage system 1860 with an aggregator component 1862 (included as a separate component or part of the AEM). The data storage system, AEM, and/or aggregator may be configured to obtain feed items for external feed A 1870a, external feed B 1870b, internal feed C 1870c and internal feed D 1870D. The foregoing may also be configured to that feed items included in 1870a are pushed to the data storage system as illustrated by 1872a. Element 1870a may include critical software updates provided by the vendor and/or VAR, for example. Element 1870b may include feed items that are obtained by the aggregator polling the feed at periodic intervals to determine whether any new feed items have been posted since the previous polling. Element 1870b may include vendor and/or VAR electronic publications. Arrow 1872b indicates the polling request from the aggregator for any new feed items since a particular time, for example. Element 1872c may indicate the polling response with the new feed items, a list of new feed items for which the aggregator may issue additional requests, and the like. The foregoing may also be configured to that feed items included in 1870c are pushed to the data storage system as illustrated by 1872d. Element 1870c may include data storage system events generating error conditions, for example. Element 1870d may include feed items that are obtained by the aggregator polling the feed at periodic intervals to determine whether any new feed items have been posted since the previous polling. Element 1870d may include other internally generated data storage system feed items as may be included in an embodiment. The polling messages as may be exchanged are illustrated by 1872e and 1872f and as described above in connection with other polling that may be performed.

The feed items from 1870a may be for consumption by the data storage system or AEM. If the foregoing are appropriately configured to allow automated download and installation of software updates, the software updates indicated by 1870a may be applied to the data storage system in response to retrieving the associated feed item. Additionally, the feed items of 1870c may be for consumption by a user or GUI as well as the AEM/data storage system. If a user of the AEM is currently logged on, an GUI indicator may be displayed. Additionally, the AEM and/or data storage system may perform processing to log or report the error in an automated fashion. As such, the consumer indicator may specify both the data storage system or AEM and the user or GUI.

Figure 29:
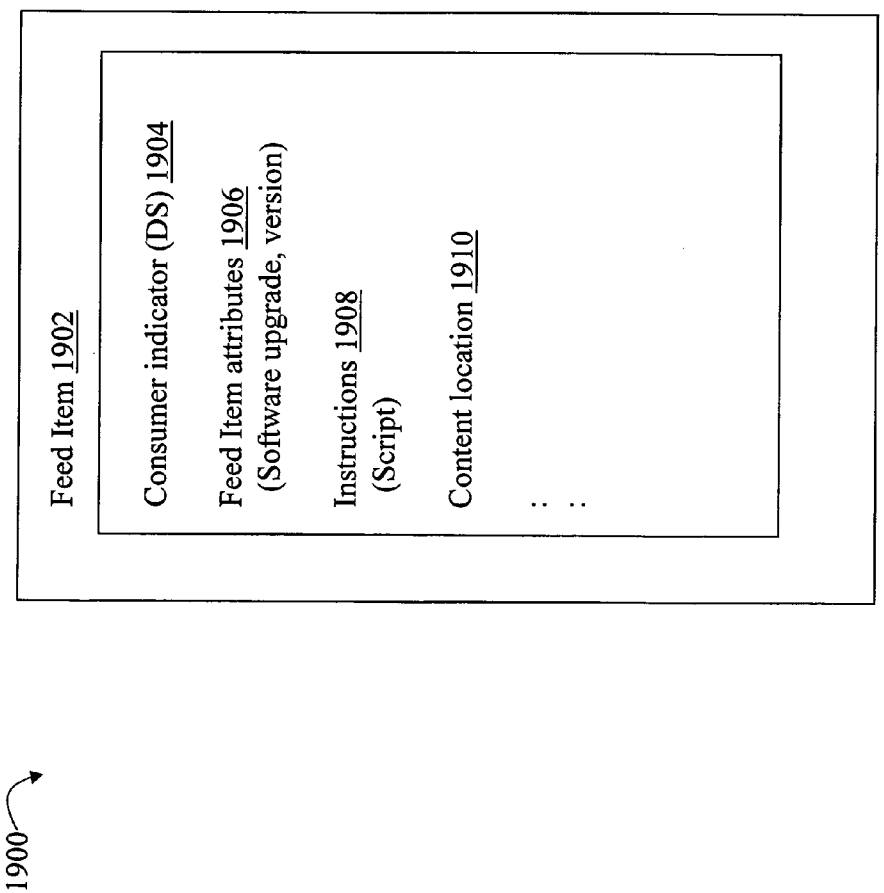
FIGS. 29 and 30 are further examples of information that may be included in feed items used in an embodiment.

Referring to FIG. 29, shown is an example representation of what may be included in a feed item for a software upgrade. Feed item 1902 may include a consumer indicator 1904 of DS indicating the data storage system or AEM as the consumer. Feed item attributes 1906 may include information identifying this as a software patch or other type of software upgrade, the related software product, an associated version number, as well as other information. Instructions 1908 may include an embedded script 1908 which is retrieved and processed to download and install the software upgrade content indicated by 1910.

Figure 30:
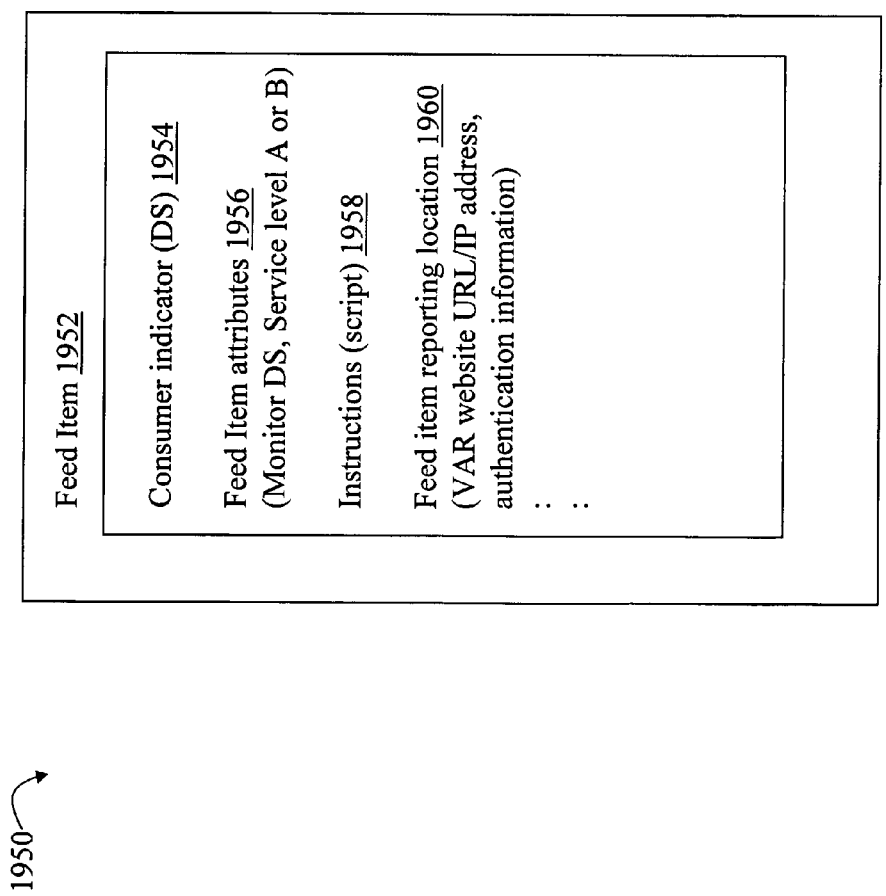

Referring to FIG. 30, shown is an example representation of what may be included in a feed item for collecting and reporting information about the data storage system. Feed item 1952 may include a consumer indicator 1954 of DS indicating the data storage system or AEM as the consumer. Feed item attributes 1956 may include information identifying this as a feed item to collect or monitor the status of the data storage system for one or more defined service levels (e.g., A and B). Element 1956 may be used to indicate the required level of service (e.g. A or B) in order for the feed item to be processed further and applied. Element 1958 may include an embedded script. Element 1960 may include feed item reporting location information such as a VAR website URL or IP address, and any needed authentication information.

An override filter may be defined which does not allow for this feed item to be applied to a data storage system/AEM unless the current configuration information indicates that the customer has a service level A or B agreement with a VAR supplying the feed item. In this example, the script may be embedded in the feed item 1952 in field 1958 and include commands to gather and report information regarding the current state and configuration of the data storage system. The VAR may provide services to a customer of the data storage system per a previous agreement so that the VAR has configured the data storage system and components to obtain services for the service level A. In this example, the customer may have also agreed to automated application and reporting related to such data collection and monitoring scripts so the data storage system and components thereon may be appropriately configured. In accordance with a rule of the override criteria, if current configuration information does not indicate the appropriate service level, the override filter will not allow the feed item to be processed and may quietly ignore the feed item. If the current configuration information does indicate the appropriate service level (e.g., as required by the feed item attributes of 1956) but does not have the appropriate configuration for automatic feed item processing, the feed item may be posted via a GUI indicator to one or more appropriate users when logged on. From the GUI indicator, the user may elect to perform the feed item processing and collect and report the associated information. Instructions 1958 may include an embedded script which is extracted from the feed item 1952 and executed by a script engine to collect the requested information. The script 1958 may also include instructions to report the collected information to a data storage system internal (e.g., file or directory) and/or external location (e.g., VAR website location).

Figure 31:
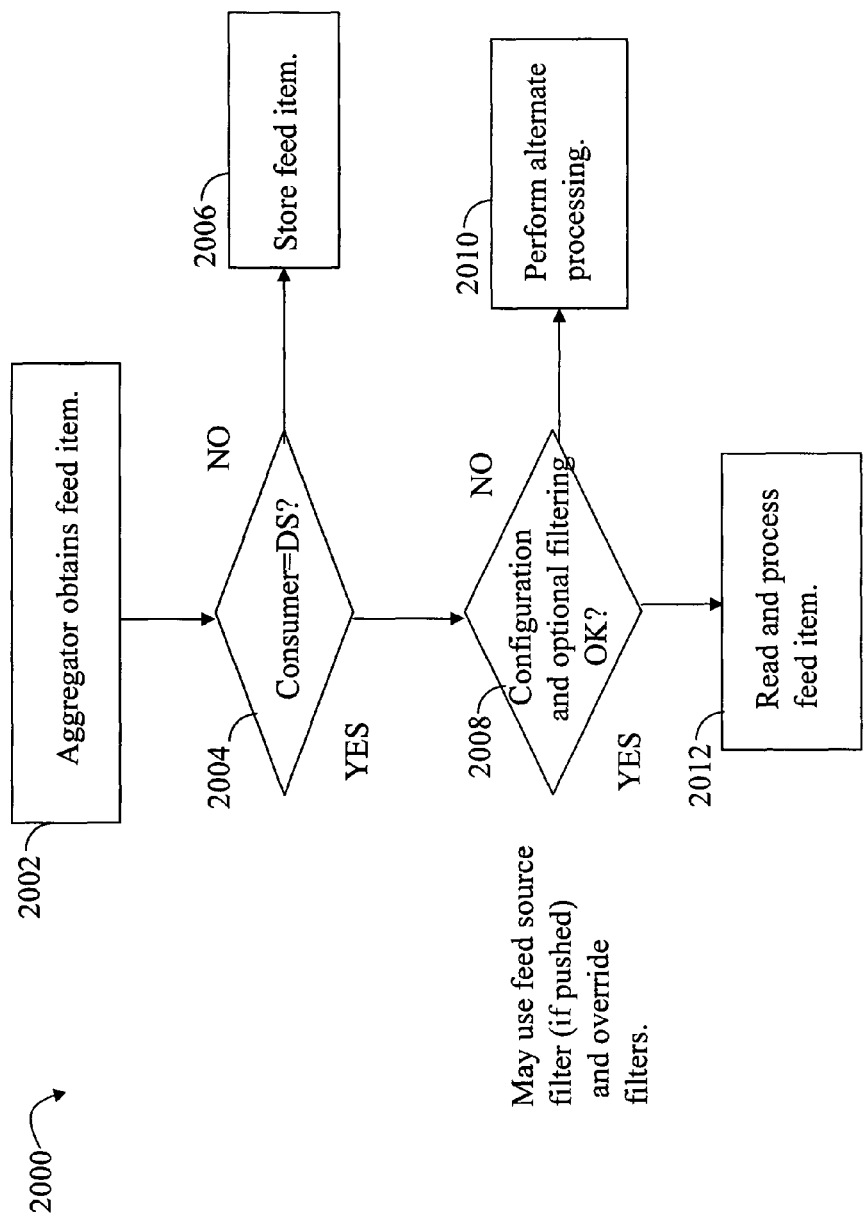
FIGS. 31 and 32 are flowcharts of processing steps that may be performed in an embodiment in accordance with the techniques described herein.

Referring to FIG. 31, shown is a flowchart summarizing processing as may be performed in an embodiment using RSS or another publication platform in accordance with the techniques herein to process a feed item. At step 2002, the aggregator obtains a feed item such as by polling or by having the feed item pushed to the aggregator as described above. At step 2004, the aggregator may determine whether the feed item is to be consumed by the data storage system or AEM. If not, control may proceed to step 2006 where the feed item may be stored and retrieved at a later point time, such as by a feed reader, for display via a GUI indicator. If step 2004 evaluates to yes, control proceeds to step 2008 where a determination may be made, such as by the aggregator, AEM, or other component of the data storage system, as to whether the configuration options and optional filtering indicate that this feed item may be processed by the data storage system at the current time in an automated fashion without user interaction. Step 2008 may include examining the current configuration options to determine whether they are appropriately set for automated processing of the feed item. Step 2008 may also include examining one or more filters, such as an override filter, to determine whether the feed item may be processed. In other words, any requirements specified in the feed item are examined in accordance with the filters and current configuration options to make a determination as to whether to allow further processing of the feed item. (e.g., are the current configuration settings in accordance with the override filtering criteria and any requirements as indicated in the feed item). As an example, step 2008 may include making a determination, using the override filter criteria, as to whether the service level of the current configuration is in accordance with the service level required as indicated in the feed item. Step 2008 may also include making a determination, using the override filter, as to whether the current configuration is set to allow automated feed item processing. Step 2008 may also include additional checks such as, for example, insuring that a script or other instructions are specified by the feed item. If step 2008 evaluates to yes, the feed item is read and processed accordingly. If step 2008 evaluates to no, control proceeds to step 2010 to perform alternate processing. Step 2010 may vary with the feed item, current configuration and/or filtering in an embodiment. For example, if the configuration options indicate a service level in accordance with the feed item (e.g., the customer has the appropriate level of support allowing the script, software update, and the like to be applied), but the configuration options are not set for automated execution without user interaction, step 2010 may include displaying a GUI indicator for a user AEM session via a GUI where a user (e.g., such as a subscriber to the feed including the feed item) may select to manually perform the action of the feed item. If the configuration options do not indicate an appropriate level of support, the feed item may be silently disregarded. The foregoing are just some examples of processing that may be included in step 2010 in an embodiment.

Figure 32:
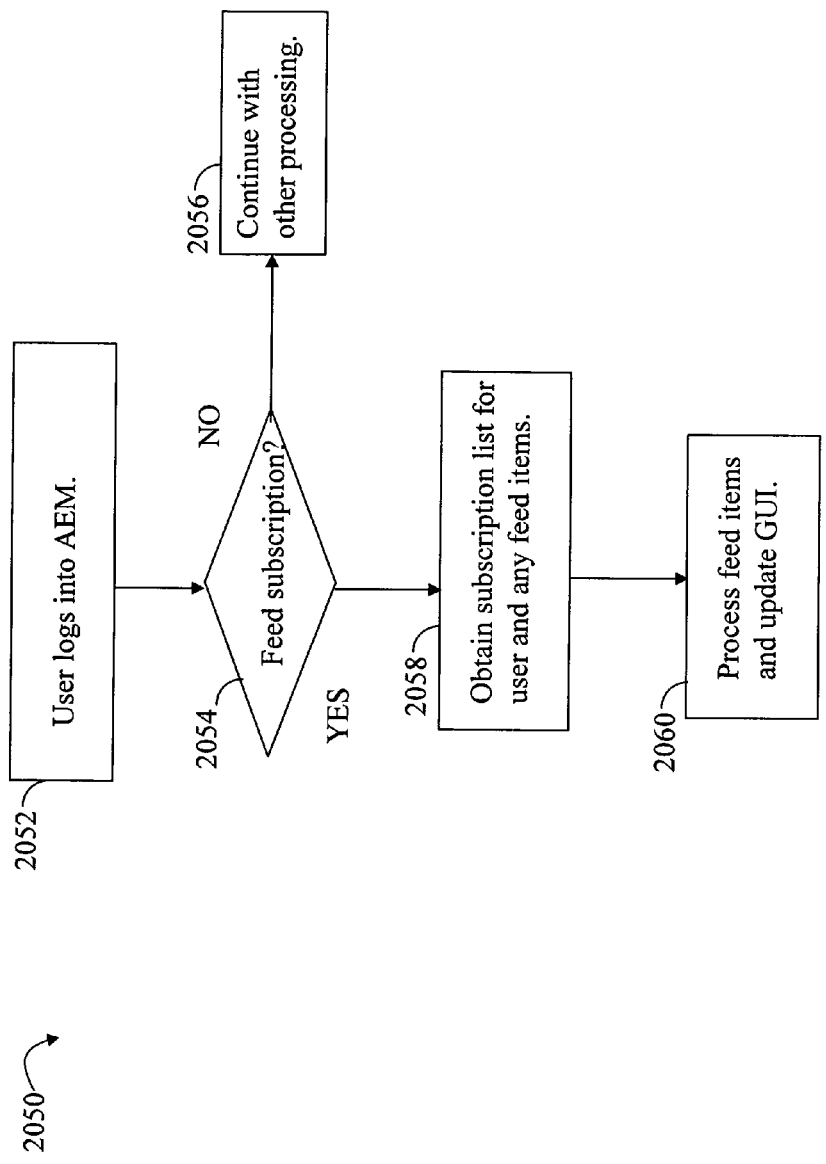

Referring to FIG. 32, shown is a flowchart summarizing processing as may be performed in an embodiment using RSS or another publication platform in accordance with the techniques herein as part of commencing a user session of the AEM such as when logging in via a management station. At step 2052, a user may log into the AEM causing processing of the user session to be performed. Such processing may include performing steps as indicated in the flowchart 2050 as well as others to process feed items. At step 2054, the AEM determines whether the user has any feed subscriptions. If not, control continues with step 2056 with other processing. If step 2054 evaluates to yes, control proceeds to step 2058 to obtain the subscription list of feeds for the user and any new feed items. The information used in step 2058 may be retrieved from the feed data store and feed lists as may be stored on the data storage system. At step 2060, the feed items retrieved in step 2058 may be proceeds and the GUI of the AEM session may be accordingly updated. Step 2060 may include, for example, applying any filters as described herein.

As described herein RSS or another platform may be used to provide notification in the GUI of an AEM session as well as to log other information regarding data storage system generated feeds, such as for data storage system internal notifications or errors, as well as for those feeds which are external with respect to the data storage system. RSS and other notification and publication platforms may be used to provide asynchronous notification of internal data storage system events published as RSS or other feed updates. Such notifications may be provided to an aggregator or proxy server on the data storage system. Also described herein is use of the foregoing platform, such as RSS, to process a feed item in a first mode where a GUI indicator may be displayed to facilitate notification of newly posted feed data (e.g., advertisements, notices regarding training, products, new online publications, and the like). A feed item may also be processed in a second mode to facilitate automatic downloading and processing of data that may be included, referenced in, or otherwise associated with, the feed item. For example, the feed item may include data such as a script, which may be processed by the data storage system, AEM and/or other components. In other words, the feed item may include data which is for consumption in a manner other than for display on a GUI. Such data may be consumed in an automated fashion if the current configuration options are properly set, the feed item includes the data storage system or AEM as a consumer, and the feed item includes or references processing instructions. Additionally, processing a feed item, in an automated fashion or otherwise, may proceed only if the current configuration meets any filtering criteria. In an embodiment, if the data cannot be processed in an automated fashion without user interaction, such as due to configuration settings not allowing for automated feed item processing, a GUI indicator may be presented to the user when logged in so that the user may select to further process the data associated with the feed item. The data of the feed item may also vary with type of feed item. For example, with reference to FIG. 27, a feed item may include the data of 1808 and 1810. Element 1808 may include embedded instructions in the feed item or otherwise identify a location where such instructions can be obtained. The content or content location 1810 may refer to code to be installed as part of the software upgrade, a help file or online documentation file to be installed, and the like. Such content may be embedded in the feed item or referenced by specifying a content location in 1810. Element 1810 may also identify a location at which an electronic publication may be obtained. Using the techniques herein, such electronic publication may also be automatically downloaded to the data storage system through execution of the instructions of 1808. Data of element 1808 may be processed, in an automated fashion without requiring explicit user selection and invocation to proceed, as well as, alternatively, with such explicit user selection and invocation. When processed in an automated fashion without user selection and invocation, the feed item may be processed without being consumed by the GUI (e.g., without having a corresponding GUI indicator displayed on the GUI for the feed item).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A data storage system comprising:
an active element manager component used to perform data storage management operations for a data storage system, wherein said data storage management operations include a first operation to provision storage of the data storage system for data of an application; and
a feed aggregator for aggregating feed items from one or more feeds, each of said one or more feed items being associated with one of said feeds and indicating a publication notification for data associated with said one feed, said one or more feeds including a first feed provided by the data storage system about events occurring on the data storage system, wherein said first feed provides a first feed item regarding status of the data storage system in response to performing said first operation to provision storage, wherein said first feed item is processed by said data storage system in accordance with one or more criteria included in one or more filters and each of said one or more filters is one of an override filter, a user-specified filter, and a default filter.

2. The data storage system of claim 1, wherein the data storage system is connected to one or more workstations each including code stored on a computer readable medium for retrieving and processing feed items for a user session having a user identifier, said user identifier being associated with one or more feed subscriptions for one or more feeds including said feed items.

3. The data storage system of claim 1, wherein at least one of said feeds is provided from a source external to said data storage system.

4. The data storage system of claim 3, wherein a feed item of said first feed provided by the data storage system is sent to the feed aggregator from another location in the data storage system without a request for the first feed from the feed aggregator, and wherein a feed item of a second feed provided for a source external to said data storage system is sent to the feed aggregator in response to a request from the feed aggregator for new feed items from the second feed.

5. The data storage system of claim 1, wherein one of said feeds includes a feed item for a notification, said feed item indicating instructions to be executed in connection with said notification.

6. The data storage system of claim 5, wherein said instructions are included in the feed item and executed by a component on the data storage system.

7. The data storage system of claim 5, wherein said criteria includes a condition indicating whether said data storage system is configured to automatically process said feed item.

8. The data storage system of claim 7, wherein said criteria includes a condition requiring a configuration of the data storage system to indicate a specified service level in accordance with a service level requirement of said feed item in order for said feed item to be processed by the data storage system.

9. The data storage system of claim 5, wherein said feed item provides for notification regarding one or more of: a software upgrade, processing to perform data collection and reporting for the data storage system, and an online documentation update, and a help file update.

10. The data storage system of claim 1, wherein said one or more feeds are indicated in a feed source filter defining allowable feeds and feed providers for access by the feed aggregator.

11. The data storage system of claim 1, wherein one of said filters is a user-specified filter including one or more of user-defined keywords or selected predefined keywords.

12. A method for providing a publication notification in a data storage system comprising:
   providing an active element manager component used to perform data storage management operations for the data storage system;
   providing a feed aggregator in the data storage system for aggregating feed items from one or more feeds, each of said one or more feed items being associated with one of said feeds and indicating a publication notification for data associated with said one feed, said one or more feeds including a first feed provided by the data storage system about events occurring on the data storage system; and
   performing a first data storage management operation provisioning storage of the data storage system for data of an application, wherein said first feed provides a first feed item regarding status of the data storage system in response to performing said first data storage management operation provisioning storage, wherein said first feed item is processed by said data storage system in accordance with one or more criteria included in one or more filters and each of said one or more filters is one of an override filter, a user-specified filter, and a default filter.

13. The method of claim 12, wherein at least one of said feeds is provided from a source external to said data storage system, and wherein a feed item of the first feed provided by the data storage system is sent to the feed aggregator from another location in the data storage system without a request for the first feed from the feed aggregator, and wherein a feed item of a second feed provided for a source external to said data storage system is sent to the feed aggregator in response to a request from the feed aggregator for new feed items from the second feed.

14. The method of claim 12, wherein one of said feeds includes a feed item for a notification, said feed item indicating instructions to be executed in connection with said notification.

15. The method of claim 14, wherein said criteria includes a condition indicating whether said data storage system is configured to automatically process said feed item, and wherein said criteria includes a condition requiring a configuration of the data storage system to indicate a specified service level in accordance with a service level requirement of said feed item in order for said feed item to be processed by the data storage system.

16. The method of claim 14, wherein said feed item includes instructions to be executed by a component of the data storage system in connection with said notification and said feed item provides for notification regarding one or more of: a software upgrade, processing to perform data collection and reporting for the data storage system, and an online documentation update, and a help file update.

* * * * *